(12) United States Patent
Watanabe et al.

(10) Patent No.: US 12,059,886 B2
(45) Date of Patent: Aug. 13, 2024

(54) PRINTING PLATE PRECURSOR, PRINTING PLATE PRECURSOR LAMINATE, METHOD FOR MAKING PRINTING PLATE, AND PRINTING METHOD

(71) Applicant: FUJIFILM Corporation, Tokyo (JP)

(72) Inventors: Shumpei Watanabe, Shizuoka (JP); Shuji Shimanaka, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 727 days.

(21) Appl. No.: 17/214,452

(22) Filed: Mar. 26, 2021

(65) Prior Publication Data

US 2021/0221117 A1    Jul. 22, 2021

Related U.S. Application Data

(63) Continuation of application No. PCT/JP2019/038029, filed on Sep. 26, 2019.

(30) Foreign Application Priority Data

Sep. 28, 2018  (JP) .................................. 2018-185921
Apr. 19, 2019  (JP) .................................. 2019-080418
Jun. 12, 2019  (JP) .................................. 2019-109673

(51) Int. Cl.
  *B41C 1/10*   (2006.01)
  *B41N 1/08*   (2006.01)
  *B41N 3/03*   (2006.01)

(52) U.S. Cl.
  CPC .......... *B41C 1/1025* (2013.01); *B41C 1/1016* (2013.01); *B41N 1/083* (2013.01);
  (Continued)

(58) Field of Classification Search
  CPC . B41C 1/1025; B41C 1/1016; B41C 2201/02; B41C 2201/10; B41C 2210/02;
  (Continued)

(56) References Cited

U.S. PATENT DOCUMENTS 6,093,509 A   7/2000  Isono et al.
6,096,476 A   8/2000  Yanagida et al.
(Continued)

FOREIGN PATENT DOCUMENTS

CN     1152278 A    6/1997
CN     1177947 A    4/1998
(Continued)

OTHER PUBLICATIONS

Communication dated Mar. 15, 2022 issued by the Chinese Patent Office in counterpart Chinese Application No. 201980063665.8.
(Continued)

*Primary Examiner* — Christopher E Mahoney
*Assistant Examiner* — Marissa Ferguson-Samreth
(74) *Attorney, Agent, or Firm* — Sughrue Mion, PLLC

(57) ABSTRACT

The present invention provides a printing plate precursor including a layer which includes a polymer and is provided on a printing surface side of an aluminum support, and a layer which includes particles and is provided on a side opposite to the printing surface side, in which a modulus of elasticity of the particles is 0.1 GPa or more, and in a case where a Bekk smoothness of an outermost layer surface on the side opposite to the printing surface side is denoted by b second, a specific expression (1) is satisfied; a printing plate precursor laminate; a method for making a printing plate; and a printing method.

20 Claims, 4 Drawing Sheets

(52) U.S. Cl.
CPC .......... *B41N 3/034* (2013.01); *B41C 2201/02* (2013.01); *B41C 2201/10* (2013.01); *B41C 2210/02* (2013.01); *B41C 2210/12* (2013.01); *B41C 2210/24* (2013.01)

(58) Field of Classification Search
CPC . B41C 2210/12; B41C 2210/24; B41N 1/083; B41N 3/034
See application file for complete search history.

(56) References Cited

U.S. PATENT DOCUMENTS

| | | | |
|---|---|---|---|
| 2007/0077518 A1 | 4/2007 | Kawauchi | |
| 2007/0231740 A1* | 10/2007 | Yanaka | B41C 1/1016 430/270.1 |
| 2008/0107895 A1 | 5/2008 | Chen | |
| 2008/0268372 A1* | 10/2008 | Taguchi | G03F 7/029 430/270.1 |
| 2015/0040681 A1 | 2/2015 | Sarchi et al. | |
| 2016/0199230 A1 | 7/2016 | Doshi et al. | |
| 2018/0117942 A1 | 5/2018 | Shimanaka | |
| 2019/0023052 A1 | 1/2019 | Oshima et al. | |

FOREIGN PATENT DOCUMENTS

| | | | |
|---|---|---|---|
| CN | 1952780 A | | 4/2007 |
| EP | 1 629 976 A2 | | 3/2006 |
| EP | 1790492 A1 | | 5/2007 |
| EP | 3 318 414 A1 | | 5/2018 |
| EP | 3 831 613 A1 | | 6/2021 |
| JP | 3-71135 A | | 3/1991 |
| JP | 5-45888 A | | 2/1993 |
| JP | 2007122003 A | | 5/2007 |
| JP | 2007148040 A | | 6/2007 |
| JP | 2007268993 A | | 10/2007 |
| JP | 2011215234 | * | 3/2010 |
| WO | 2017/002641 A1 | | 1/2017 |
| WO | 2017/170391 A1 | | 10/2017 |
| WO | 2018162333 A1 | | 9/2018 |

OTHER PUBLICATIONS

Communication dated Aug. 30, 2021 issued by the European Intellectual Property Office in counterpart European Application No. 19866635.6.
Office Action issued Apr. 24, 2023 by the China National Intellectual Property Administration in counterpart Chinese Patent Application No. 201980063665.8.
Office Action issued Jun. 12, 2023 by the European patent Office in counterpart European patent Application No. 19866635.6.
Office Action issued Aug. 16, 2022, by the Japan Patent Office in counterpart Application No. 2020-549405.
International Search Report (PCT/ISA/210) dated Dec. 11, 2019 issued by the International Searching Authority in International Application No. PCT/JP2019/038029.
Written Opinion (PCT/ISA/237) dated Dec. 11, 2019 issued by the International Searching Authority in International Application No. PCT/JP2019/0380029.
International Preliminary Report on Patentability International Application No. PCT/JP2019/038029, issued on Mar. 23, 2021.
Communication issued Jan. 24, 2023 by the Japanese Patent Office for Japanese Patent Application No. 2020-549405.
Communication dated Feb. 22, 2022 issued by the Japanese Patent Office in counterpart Japanese Application No. 2020-549405.
Communication dated Nov. 7, 2022 issued by the State Intellectual Property Office of P.R. China in counterpart Chinese Application No. 201980063665.8.

* cited by examiner

PRINTING PLATE PRECURSOR, PRINTING PLATE PRECURSOR LAMINATE, METHOD FOR MAKING PRINTING PLATE, AND PRINTING METHOD

CROSS REFERENCE TO RELATED APPLICATION

This is a continuation of International Application No. PCT/JP2019/038029 filed on Sep. 26, 2019, and claims priority from Japanese Patent Application No. 2018-185921 filed on Sep. 28, 2018, Japanese Patent Application No. 2019-080418 filed on Apr. 19, 2019, and Japanese Patent Application No. 2019-109673 filed on Jun. 12, 2019, the entire disclosures of which are incorporated herein by reference.

BACKGROUND OF THE INVENTION

1. Field of the Invention

The present invention relates to a printing plate precursor, printing plate precursor laminate, a method for making a printing plate, and a printing method.

2. Description of the Related Art

A printing plate precursor, for example, a planographic printing plate precursor is frequently stored and transported as a laminate formed by laminating a plurality of sheets thereof. In this laminate, interleaving paper is typically inserted into the space between planographic printing plate precursors for the purpose of preventing dislocation in stacking of planographic printing plate precursors, preventing adhesion between planographic printing plate precursors, and preventing scratches on a surface of a planographic printing plate precursor on an image recording layer side. However, in a case where interleaving paper is used, problems of cost increase, a disposal treatment, and the like may occur, and thus the interleaving paper needs to be removed before an exposure step. Therefore, this may also result in risk of occurrence of a load on a plate-making step and occurrence of interleaving paper peeling failure. Furthermore, in a case of removing the interleaving paper, it is necessary to give consideration so that the surface of the planographic printing plate precursor on the image recording layer side is not damaged. Accordingly, development of a planographic printing plate precursor that enables lamination without the interleaving paper has been required.

As a planographic printing plate precursor that enables lamination without the interleaving paper, JP2007-148040A discloses an infrared photosensitive planographic printing plate precursor including a recording layer which is disposed on a surface of a support and is capable of forming an image by infrared irradiation, the recording layer including a water-insoluble and alkali-soluble resin and an infrared absorbent; and an organic polymer layer which is disposed on a surface of the support, opposite to the surface having the recording layer, the organic polymer layer containing crosslinked polymer particles having a number average particle diameter of 1 to 100 μm. JP2007-122003A discloses an infrared photosensitive planographic printing plate precursor including a recording layer which is disposed on a surface of a support and is capable of forming an image by infrared irradiation, the recording layer including a water-insoluble and alkali-soluble resin and an infrared absorbent; and an organic polymer layer which is disposed on a surface of the support, opposite to the surface having the recording layer, in which an arithmetic average roughness Ra is in a range of 0.05 to 0.40 μm.

SUMMARY OF THE INVENTION

In a planographic printing plate precursor (hereinafter, also referred to as a "precursor"), the precursors are usually laminated with the interleaving paper sandwiched between the precursors, in order to prevent dislocation in stacking plates in a case of making the precursors, prevent adhesion between the precursors, prevent multiple-plate feeding in a plate-making step of taking out precursors from the laminate one by one, and prevent scratches in a series of steps such as precursor making, stacking, transporting, user plate-making, and before printing. However, in some cases, for the purpose of preventing troubles such as poor peeling of the interleaving paper during the user plate-making, improving plate-making speed, and reducing cost, an aspect in which the interleaving paper is not included (also referred to as an "eliminating interleaving paper") may be adopted.

In a case of eliminating the interleaving paper, as described above, a method of providing a layer (outermost layer) containing resin particles on the surface of the support, opposite to the surface having the recording layer may be adopted. However, in a case where the resin particles are contained in the outermost layer to provide a convex portion on the outermost layer surface, a new problem arises. For example, the convex portion may fall off during precursor making, stacking, and transporting, scratches may occur due to the convex portion, or development delay may occur due to the convex portion.

That is, the planographic printing plate precursor is required to have characteristics such as preventing property of multiple-plate feeding in a step of taking out the precursor from the laminate, falling-preventing property of the convex portion provided on the outermost layer surface of the precursor, scratch-preventing property due to the convex portion provided on the outermost layer surface of the precursor, and development delay-preventing property due to the convex portion provided on the outermost layer surface of the precursor. However, in the techniques disclosed in JP2007-148040A and JP2007-122003A, the development delay-preventing property is inferior, and all of the above-described characteristics cannot be satisfied.

An object to be achieved by the present invention is to provide a printing plate precursor which have, even in a case of eliminating an interleaving paper, excellent characteristics such as preventing property of multiple-plate feeding in a step of taking out a precursor from a laminate, falling-preventing property of a convex portion provided on an outermost layer surface of the precursor, scratch-preventing property due to the convex portion provided on the outermost layer surface of the precursor, and development delay-preventing property due to the convex portion provided on the outermost layer surface of the precursor; and a printing plate precursor laminate, a method for making a printing plate, and a printing method, in which the printing plate precursor is used.

The methods for achieving the above-described objects include the following aspects.

<1> A printing plate precursor comprising:
  a layer which includes a polymer and is provided on a printing surface side of an aluminum support; and
  a layer which includes particles and is provided on a side opposite to the printing surface side, in which a modulus of elasticity of the particles is 0.1 GPa or more, and in a case where a Bekk smoothness of an outermost layer surface on the side opposite to the printing surface side is denoted by b second, the following expression (1) is satisfied, $$b \leq 1{,}000 \quad (1).$$

<2> The printing plate precursor according to <1>,
in which the Bekk smoothness b second of the outermost layer surface on the side opposite to the printing surface side satisfies the following expression (2), $$b \leq 300 \quad (2).$$

<3> The printing plate precursor according to <1> or <2>,
in which, in a case where a Bekk smoothness of an outermost layer surface on the printing surface side is denoted by a second and the Bekk smoothness of the outermost layer surface on the side opposite to the printing surface side is denoted by b second, the following expressions (1) and (3) are satisfied, $$a \leq 1{,}000 \quad (1)$$

$$1/a + 1/b \geq 0.002 \quad (3).$$

<4> The printing plate precursor according to any one of <1> to <3>,
in which an arithmetic average height Sa of the outermost layer surface on the side opposite to the printing surface side is in a range of 0.3 μm to 20 μm.

<5> The printing plate precursor according to any one of <1> to <4>,
in which an arithmetic average height Sa of an outermost layer surface on the printing surface side is in a range of 0.1 μm to 20 μm.

<6> The printing plate precursor according to any one of <1> to <5>,
in which a total value of an arithmetic average height Sa of an outermost layer surface on the printing surface side and an arithmetic average height Sa of the outermost layer surface on the side opposite to the printing surface side is more than 0.3 μm and 20 μm or less.

<7> The printing plate precursor according to any one of <1> to <6>,
in which an average particle diameter of the particles is in a range of 0.5 μm to 20 μm, and
an in-plane density of the particles is 10,000 particle/mm$^2$ or less.

<8> The printing plate precursor according to any one of <1> to <7>,
in which the modulus of elasticity of the particles is 0.7 GPa or more.

<9> The printing plate precursor according to any one of <1> to <8>,
in which the layer which includes the polymer is an image recording layer.

<10> The printing plate precursor according to <9>,
in which the image recording layer includes an infrared absorbent, a polymerization initiator, a polymerizable compound, and a polymer compound.

<11> The printing plate precursor according to <10>,
in which the polymer compound is a polymer compound including styrene and/or acrylonitrile as a constitutional unit.

<12> The printing plate precursor according to <10> or <11>,
in which two or more of the polymerizable compounds are included.

<13> The printing plate precursor according to any one of <9> to <12>,
in which a protective layer is provided on the printing surface side.

<14> The printing plate precursor according to <13>,
in which the protective layer includes a water-soluble polymer.

<15> The printing plate precursor according to <14>,
in which the water-soluble polymer is polyvinyl alcohol having a saponification degree of 50% or more.

<16> The printing plate precursor according to any one of <13> to <15>,
in which a thickness of the protective layer is less than 0.2 μm.

<17> The printing plate precursor according to any one of <1> to <8>,
in which the layer which includes the polymer is a non-photosensitive resin layer.

<18> The printing plate precursor according to <17>,
in which a protective layer is provided on the printing surface side.

<19> The printing plate precursor according to <18>,
in which the protective layer includes a water-soluble polymer.

<20> The printing plate precursor according to <19>,
in which the water-soluble polymer is polyvinyl alcohol having a saponification degree of 50% or more.

<21> The printing plate precursor according to any one of <18> to <20>,
in which a thickness of the protective layer is less than 0.2 μm.

<22> A printing plate precursor laminate which is obtained by laminating a plurality of the printing plate precursors according to any one of <1> to <21>,
in which an outermost layer on the printing surface side is directly brought into contact and laminated with an outermost layer on the side opposite to the printing surface side.

<23> A method for making a printing plate, comprising:
a step of image-wise exposing the printing plate precursor according to any one of <9> to <16> to light; and
a step of supplying at least one of printing ink or dampening water to remove an unexposed area of the image recording layer on a printing machine, thereby making a printing plate.

<24> A method for making a printing plate, comprising:
a step of image-wise exposing the printing plate precursor according to any one of <9> to <16> to light; and
a step of supplying a developer having a pH of 2 to 12 to remove an unexposed area of the image recording layer, thereby making a printing plate.

<25> A method for making a printing plate, comprising:
a step of image-wise exposing the printing plate precursor according to any one of <9> to <16> to light; and
a step of supplying a developer having a pH of 2 to 10 to remove an unexposed area of the image recording layer,
in which a water-washing step after the unexposed area-removing step is not included.

<26> A printing method comprising:
a step of image-wise exposing the printing plate precursor according to any one of <9> to <16> to light;
a step of supplying at least one of printing ink or dampening water to remove an unexposed area of the image recording layer on a printing machine, thereby making a printing plate; and
a step of printing with the obtained printing plate.
<27> A printing method comprising:
a step of image-wise exposing the printing plate precursor according to any one of <9> to <16> to light;
a step of supplying a developer having a pH of 2 to 12 to remove an unexposed area of the image recording layer, thereby making a printing plate; and
a step of printing with the obtained printing plate.
<28> A printing method comprising:
a step of image-wise exposing the printing plate precursor according to any one of <9> to <16> to light;
a step of making a printing plate, which includes a step of supplying a developer having a pH of 2 to 10 to remove an unexposed area of the image recording layer and does not include a water-washing step after the unexposed area-removing step; and
a step of printing with the obtained printing plate.
<29> A method for making a printing plate, comprising:
a step of, without image-wise exposing the printing plate precursor according to any one of <17> to <21> to light, supplying at least one of printing ink or dampening water to remove the non-photosensitive resin layer on a printing machine, thereby making a printing plate.
<30> A method for making a printing plate, comprising:
a step of, without image-wise exposing the printing plate precursor according to any one of <17> to <21> to light, supplying a developer having a pH of 2 to 12 to remove the non-photosensitive resin layer, thereby making a printing plate.
<31> A printing method comprising:
a step of, without image-wise exposing the printing plate precursor according to any one of <17> to <21> to light, supplying at least one of printing ink or dampening water to remove the non-photosensitive resin layer on a printing machine, thereby making a printing plate; and
a step of printing with the obtained printing plate.
<32> A printing method comprising:
a step of, without image-wise exposing the printing plate precursor according to any one of <17> to <21> to light, supplying a developer having a pH of 2 to 12 to remove the non-photosensitive resin layer, thereby making a printing plate; and
a step of printing with the obtained printing plate.

According to the present invention, it is possible to provide a printing plate precursor which have, even in a case of eliminating an interleaving paper, excellent characteristics such as preventing property of multiple-plate feeding in a step of taking out a precursor from a laminate, falling-preventing property of a convex portion provided on an outermost layer surface of the precursor, scratch-preventing property due to the convex portion provided on the outermost layer surface of the precursor, and development delay-preventing property due to the convex portion provided on the outermost layer surface of the precursor; and a printing plate precursor laminate, a method for making a printing plate, and a printing method, in which the printing plate precursor is used.

DESCRIPTION OF THE PREFERRED EMBODIMENTS

Figure 1:
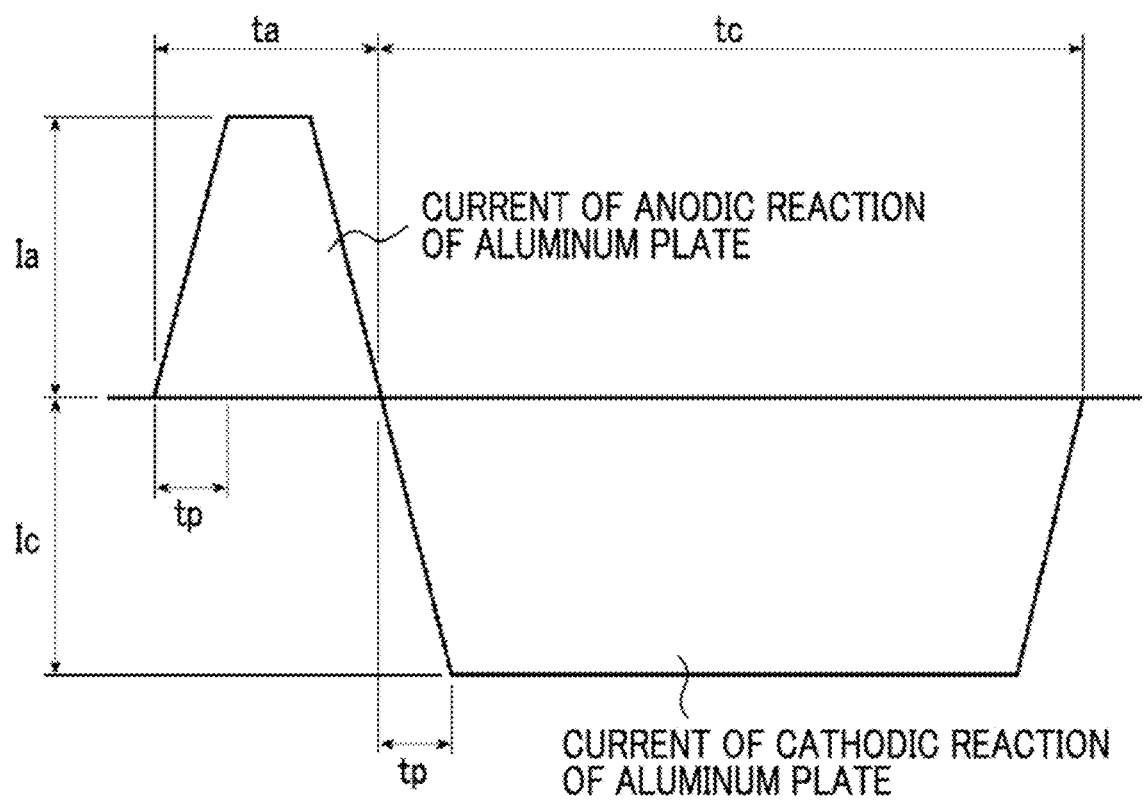
FIG. 1 is a graph showing an example of an alternating waveform current waveform diagram used for an electrochemical roughening treatment.

The description of the constitutional requirements described below is made on the basis of representative embodiments of the present invention, but it should not be construed that the present invention is limited to those embodiments.

In the present specification, the numerical ranges shown using "to" indicate ranges including the numerical values described before and after "to" as a lower limit value and an upper limit value.

In a case where substitution or unsubstitution is not noted in regard to the notation of a "group" (atomic group) in the present specification, the "group" includes not only a group not having a substituent but also a group having a substituent. For example, the concept of an "alkyl group" includes not only an alkyl group not having a substituent (unsubstituted alkyl group) but also an alkyl group having a substituent (substituted alkyl group).

In the present specification, the concept of "(meth)acryl" includes both of acryl and methacryl, and the concept of "(meth)acryloyl" includes both of acryloyl and methacryloyl.

The term "step" in the present specification indicates not only an independent step but also a step which cannot be clearly distinguished from other steps as long as the intended purpose of the step is achieved.

In the present invention, a combination of two or more preferred embodiments is a more preferred embodiment.

Further, the weight-average molecular weight (Mw) and the number-average molecular weight (Mn) in the present invention are molecular weights in terms of polystyrene used as a standard substance, which are detected by using a solvent tetrahydrofuran (THF), a differential refractometer, and a gel permeation chromatography (GPC) analyzer using TSKgel GMHxL, TSKgel G4000HxL, and TSKgel G2000HxL (all trade names manufactured by Tosoh Corporation) as columns, unless otherwise specified.

In the present specification, the term "printing plate precursor" includes not only a planographic printing plate precursor but also a printing key plate precursor. Further, the term "printing plate" includes not also a planographic printing plate, which is produced by performing operations of exposure, development, and the like on the printing plate precursor as necessary, but also a printing key plate. In a case of the printing key plate precursor, operations of exposure and development are not necessarily required. The printing key plate is a printing plate precursor for attachment to a plate cylinder which is not used, for example, in a case where printing is performed on a part of a paper surface with one or two colors in color newspaper printing. The printing key plate may be also called as a water plate, a dummy plate, a blank plate, or the like.

Hereinafter, the present invention will be described in detail.

[Printing Plate Precursor]

A printing plate precursor according to an embodiment of the present invention is a printing plate precursor including a layer which includes a polymer and is provided on a printing surface side of an aluminum support (hereinafter, simply referred to as a "support"), and a layer which includes particles and is provided on a side opposite to the printing surface side, in which a modulus of elasticity of the particles is 0.1 GPa or more, and in a case where a Bekk smoothness of an outermost layer surface on the side opposite to the printing surface side is denoted by b second, the following expression (1) is satisfied.

$$b \leq 1{,}000 \tag{1}$$

As a result of intensive studies, the present inventors have found that, by such a configuration, the printing plate precursor according to the embodiment of the present invention is capable of providing a printing plate precursor which have, even in a case of eliminating an interleaving paper, excellent characteristics such as preventing property of multiple-plate feeding in a step of taking out a precursor from a laminate, falling-preventing property of a convex portion provided on an outermost layer surface of the precursor, scratch-preventing property due to the convex portion provided on the outermost layer surface of the precursor, and development delay-preventing property due to the convex portion provided on the outermost layer surface of the precursor.

The mechanism by which the above-described excellent effects are obtained is not clear, but is presumed as follows. In the printing plate precursor according to the embodiment of the present invention, since a convex portion is provided on the outermost layer surface on the side opposite to the printing surface side so that the Bekk smoothness b second of the outermost layer surface satisfies the expression (1), in a case of configuring a laminate, a gap through which air can flow is formed between the precursors contacted with each other, which is considered to have an effect of preventing multiple-plate feeding. Further, since the contained particles have a high modulus of elasticity of 0.1 GPa or more, it is possible to prevent the particles from being deformed by pressure during lamination and the like, and reduce pressure-bonding area of an image recording layer (or a non-photosensitive resin layer). Since development is more difficult as the pressure-bonding area is larger, the printing plate precursor according to the embodiment of the present invention having a small pressure-bonding area is considered to have an effect of preventing development delay.

The printing plate precursor according to the embodiment of the present invention includes a layer which includes a polymer and is provided on a printing surface side of an aluminum support (hereinafter, also referred to as a "support").

Here, the "printing surface side" of the aluminum support means a side to which printing ink is applied during printing. The printing surface side is a side having an image recording layer in the planographic printing plate precursor, and is a side having a non-photosensitive resin layer in the printing key plate precursor.

Further, the "side opposite to the printing surface side" means a side (non-printing surface side) opposite to the printing surface side of the aluminum support, and means a side in contact with a plate cylinder of a printing machine during printing.

The printing plate precursor according to the embodiment of the present invention includes the layer which includes a polymer and is provided on the printing surface side of the support. The layer, which includes a polymer and is provided on the printing surface side of the support, is preferably an image recording layer or a non-photosensitive resin layer. The printing plate precursor according to the embodiment of the present invention may include an undercoat layer between the support and the image recording layer. Further, a protective layer may be provided on the image recording layer or the non-photosensitive resin layer.

The printing plate precursor according to the embodiment of the present invention may be a printing plate precursor used for on-press development, or may be a printing plate precursor used for development with a developer.

The printing plate precursor according to the embodiment of the present invention includes the layer which includes particles and is provided on the side opposite to the printing surface side of the support.

The particles included in the layer (hereinafter, also referred to as a particle-containing layer) which includes particles is preferably at least one kind of particles selected from organic resin particles and inorganic particles.

Preferred examples of the organic resin particles include particles formed of synthetic resins such as poly(meth) acrylic acid esters, polystyrene and a derivative thereof, polyamides, polyimides, polyolefins such as low-density polyethylene, high-density polyethylene, and polypropylene, and polyesters; and particles formed of natural polymers such as chitin, chitosan, cellulose, crosslinked starch, and crosslinked cellulose.

Among these, synthetic resin particles have advantages of easily controlling the particle size and easily controlling desired surface characteristics through surface modification.

With regard to a method of producing the organic resin particles, relatively hard resins such as polymethylmethacrylate (PMMA) can also be micronized according to a crushing method, but a method of synthesizing particles according to an emulsification and suspension polymerization method is preferably adopted from the viewpoint of ease of controlling the particle diameter, and precision.

The method of producing organic resin particles is described in detail in "Ultrafine Particles and Materials" edited by Materials Science Society of Japan, published by SHOKABO Co., Ltd., published in 1993, "Manufacturing & Application of Microspheres & Powders" supervised by Haruma Kawaguchi, published by CMC Publishing Co., Ltd., published in 2005, and the like.

The organic resin particles are also available as commercially available products, and examples thereof include crosslinked acrylic resins such as MX-40T, MX-80H3wT, MX-150, MX-180TA, MX-300, MX-500, MX-1000, MX-1500H, MR-2HQ MR-7HQ MR-1OHQ MR-3GSN, MR-5GSN, MR-7Q MR-1OQ MR-5C, and MR-7GC and styryl resins such as SX-350H and SX-500H (all manufactured by Soken Chemical & Engineering Co., Ltd.); acrylic resins such as MBX-5, MBX-8, MBX-12, MBX-15, MBX-20, MB20X-5, MB30X-5, MB30X-8, MB30X-20, SBX-6, SBX-8, SBX-12, and SBX-17 (all manufactured by Sekisui Plastics Co., Ltd.); and polyolefin resins such as CHEMIPEARL W100, W200, W300, W308, W310, W400, W401, W405, W410, W500, WF640, W700, W800, W900, W950, and WP100 (all manufactured by Mitsui Chemicals, Inc.).

Examples of the inorganic particles include silica, alumina, zirconia, titania, carbon black, graphite, $BaSO_4$, ZnS, $MgCO_3$, $CaCO_3$, ZnO, CaO, $WS_2$, $MoS_2$, MgO, $SnO_2$, $\alpha$-$Fe_2O_3$, $\alpha$-FeOOH, SiC, $CeO_2$, BN, SiN, MoC, BC, WC, titanium carbide, corundum, artificial diamond, garnet, silica stone, triboli, diatomaceous earth, and dolomite.

The above-described particles are preferably particles having a hydrophilic surface. The particles having a hydrophilic surface include organic resin particles having a hydrophilic surface and inorganic particles having a hydrophilic surface.

As the organic resin particles having a hydrophilic surface, organic resin particles coated with at least one inorganic compound selected from the group consisting of silica, alumina, titania, and zirconia are preferable, and organic resin particles coated with silica are particularly preferable.

As an organic resin constituting the organic resin particles having a hydrophilic surface, at least one resin selected from the group consisting of polyacrylic resin, polystyrene-based resin, polyester-based resin, epoxy-based resin, phenol-based resin, and melamine resin is preferable.

Hereinafter, with regard to the organic resin particles having a hydrophilic surface, organic resin particles coated with silica (hereinafter, also referred to as "silica-coated organic resin particles") will be described in detail as an example, but in the present invention, the organic resin particles having a hydrophilic surface are not limited thereto.

The silica-coated organic resin particles are particles which are formed of an organic resin and have a surface coated with silica. It is preferable that the organic resin particles constituting a core are not softened or are sticky due to the moisture in the air or the temperature.

Examples of the organic resin constituting the organic resin particles in the silica-coated organic resin particles include a polyacrylic resin, a polystyrene-based resin, a polyester-based resin, an epoxy-based resin, a phenol resin, and a melamine resin.

As a material forming a silica layer covering the surface of the silica-coated organic resin particles, a compound having an alkoxysilyl group, such as a condensate of an alkoxysiloxane-based compound, particularly, a siloxane-based material, and specifically, silica particles such as silica sol, colloidal silica, and silica nanoparticles are preferably exemplified.

The configuration of the silica-coated organic resin particles may be a configuration in which a silica particle adheres to a surface of an organic resin particle as a solid component, or a configuration in which a siloxane-based compound layer is formed on a surface of an organic resin particle by performing a condensation reaction on the alkoxysiloxane-based compound.

Silica does not necessarily cover the entire surface of the organic resin particles, and it is preferable that the surface thereof is coated with at least 0.5% by mass or more of silica with respect to the total mass of the organic resin particles. That is, in a case where silica is present on at least a part of the surface of the organic resin particles, improvement in affinity in the surface of the organic particles for a coexisting water-soluble polymer such as polyvinyl alcohol (PVA) can be achieved, falling of the particles can be suppressed even in a case where external stress is applied thereto, and excellent scratch resistance and ease of peeling during laminating without the interleaving paper can be maintained. Accordingly, the "coated with silica" in the present invention includes a state in which silica is present on at least a part of the surface of the organic resin particles as described above.

The state of the surface being coated with silica can be confirmed by morphological observation using a scanning electron microscope (SEM) or the like. Further, the coating amount of silica can be confirmed by detecting Si atoms through elemental analysis such as fluorescent X-ray analysis and calculating the amount of silica present therein.

A method of producing silica-coated organic resin particles is not particularly limited, and examples thereof include a method of forming a silica surface coating layer simultaneously with formation of organic resin particles by allowing silica particles or a silica precursor compound to coexist with a monomer component which is a raw material of the organic resin particles; and a method of forming organic resin particles, physically adhering silica particles to the surface of the organic resin particles, and then fixing the silica particles thereto.

Hereinafter, an example of the method of producing the silica-coated organic resin particles will be described. First, silica and a raw material resin (more specifically, a raw material resin such as a monomer capable of suspension polymerization, a pre-polymer capable of suspension crosslinking, a resin liquid, or the like, constituting the above-described organic resin) are added to water including a suspension stabilizer appropriately selected from a water-soluble polymer such as polyvinyl alcohol, methyl cellulose, and polyacrylic acid, or an inorganic suspending agent such as calcium phosphate and calcium carbonate, and stirred and mixed with the water to prepare a suspension in which the silica and the raw material resin are dispersed. In this case, a suspension having a target particle diameter can be formed by adjusting the type, the concentration, and the stirring rotation speed of the suspension stabilizer. Next, the suspension is heated to initiate the reaction, and resin particles are generated by performing suspension polymerization or suspension crosslinking of the resin raw material. In this case, the coexisting silica is fixed to the resin particles cured by the polymerization or the crosslinking reaction, particularly, to the vicinity of the surface of the resin particles due to the physical properties thereof. Thereafter, the suspension is subjected to solid-liquid separation, the suspension stabilizer adhering to the particles is removed by washing, and the particles are dried. In this manner, silica-coated organic resin particles to which silica is fixed and which have a desired particle diameter and a substantially spherical shape can be obtained.

Silica-coated organic resin particles having a desired particle diameter may be obtained by controlling conditions during the suspension polymerization or suspension crosslinking as described above, or silica-coated organic resin particles may be generated without strict control and then silica-coated organic particles having a desired size is obtained by a mesh filtration method or the like.

Examples of the amount of the raw material to be added to the mixture during the production of the silica-coated organic particles according to the above-described method include an aspect in which, in a case where the total amount of the raw material resin and the silica is 100 parts by mass, first, 0.1 parts by mass to 20 parts by mass of the suspension stabilizer is added to 200 parts by mass to 800 parts by mass of water as a dispersion medium, and sufficiently dissolved or dispersed therein, 100 parts by mass of a mixture of the raw material resin and the silica is put into the solution, the solution is stirred while the stirring speed is adjusted such that the dispersed particles have a predetermined particle size, the solution temperature is increased to 30° C. to 90° C. after the adjustment of the particle size, and then a reaction is performed for 1 hour to 8 hours.

The above-described method is merely an example of the method of producing silica-coated organic resin particles, and silica-coated organic resin particles obtained by methods described in detail in JP2002-327036A, JP2002-173410A, JP2004-307837A, JP2006-038246A, and the like can be also suitably used in the present invention.

Further, the silica-coated organic resin particles are also available as commercially available products, and specific examples thereof include silica-acrylic composite particles such as ART PEARL G-200 transparent, ART PEARL G-400 transparent, ART PEARL G-800 transparent, ART PEARL GR-400 transparent, ART PEARL GR-600 transparent, ART PEARL GR-800 transparent, and ART PEARL J-7P (all manufactured by Negami Chemical Industrial Co., Ltd.).

Hereinbefore, the organic resin particles used in the present invention have been described using the example of the silica-coated organic resin particles, but the same also applies to organic resin particles coated with alumina, titania, or zirconia by using alumina, titania, or zirconia in place of silica.

The shape of the above-described particles is preferably perfectly spherical shape, by may be a flat plate shape or a so-called spindle shape such that the projection view has an elliptical shape.

The particles included in the particle-containing layer are not particularly limited as long as the particles have a modulus of elasticity of 0.1 GPa or more.

From the viewpoint of development delay-preventing property, a high modulus of elasticity of the particles included in the particle-containing layer is desirable. The modulus of elasticity is preferably 0.7 GPa or more and more preferably 1.25 GPa or more.

The modulus of elasticity of the particles included in the particle-containing layer is calculated by pushing and measuring a plane indenter (50 mm×50 mm) with a load of 1 mN/2 sec using a microhardness tester (PICODETO-RHM500, manufactured by FISCHER INSTRUMENTS K. K.), and fitting the obtained load displacement curve to the following contact equation (Hertz equation) of a flat plate and a sphere.

$$\delta^3 = \frac{9}{16} R_0 \left( \frac{1-v_1^2}{E_1} \right)^2 P^2$$

$E_1$:modulus of elasticity of sphere
$\delta$:displacement
$R_0$:particle radius
$v_1$:Poisson's ratio of sphere
P:load Examples of the particles having a modulus of elasticity of 0.1 GPa include the above-described ART PEARL G-200 transparent, ART PEARL G-400 transparent, ART PEARL G-800 transparent, ART PEARL GR-400 transparent, ART PEARL GR-600 transparent, ART PEARL GR-800 transparent, and ART PEARL J-7P, and ART PEARL J-4P, ART PEARL J-5P, ART PEARL J-6P, ART PEARL J-3PY, ART PEARL J-4PY, ART PEARL J-6PF, and ART PEARL J-7PY (all manufactured by Negami Chemical Industrial Co., Ltd.); and Tospearl 120, Tospearl 130, Tospearl 145, and Tospearl 2000B (all manufactured by Momentive Performance Materials Inc.).

The average particle diameter of the particles included in the particle-containing layer is preferably in a range of 0.5 μm to 20 μm. The average particle diameter thereof is more preferably in a range of 0.5 μm to 10 μm and still more preferably in a range of 0.5 μm to 7 μm.

The average particle diameter of the particles included in the particle-containing layer is a volume average particle diameter, and the volume average particle diameter can be measured using a laser diffraction scattering particle size distribution meter. Specifically, the volume average particle diameter is measured using, for example, a particle size distribution measuring device "Microtrac MT-33001I" (manufactured by Nikkiso Co., Ltd.).

Further, in the present invention, unless otherwise specified, the average particle diameter of other particles is measured by the above-described measuring method.

The in-plane density of the particles included in the particle-containing layer is preferably 10,000 particles/mm$^2$ or less. The in-plane density thereof is more preferably in a range of 100 to 5000 particles/mm$^2$ and still more preferably in a range of 100 to 3000 particles/mm$^2$.

The in-plane density of the particles included in the particle-containing layer can be determined by observing the surface of the printing plate precursor using a scanning electron microscope (SEM). Specifically, the in-plane density can be calculated by observing the surface of the printing plate precursor at five locations with the scanning electron microscope (SEM), counting the number of particles, converting the number of particles into the number of particles per mm$^2$ of observation field area, and obtaining the average value thereof.

In the printing plate precursor according to the embodiment of the present invention, in a case where the Bekk smoothness of the outermost layer surface on the side opposite to the printing surface side is denoted by b second, the following expression (1) is satisfied.

$$b \leq 1{,}000 \qquad (1)$$

The outermost layer surface on the side opposite to the printing surface side preferably corresponds to the surface of the layer including the above-described particles.

The Bekk smoothness b second of the outermost layer surface on the side opposite to the printing surface side preferably satisfies the following expression (2).

$$b \leq 300 \qquad (2)$$

The Bekk smoothness b second of the outermost layer surface on the side opposite to the printing surface side more preferably satisfies the following expression (2a).

$$b \leq 100 \qquad (2a)$$

The Bekk smoothness b second of the outermost layer surface on the side opposite to the printing surface side still more preferably satisfies the following expression (2b).

$$b \leq 50 \qquad (2b)$$

The Bekk smoothness (Bekk second) of the outermost layer surface can be measured in accordance with JIS P8119 (1998). Specifically, using a Bekk smoothness tester manufactured by KUMAGAI RIKI KOGYO Co., Ltd., the Bekk smoothness is measured with 1/10 of standard air volume, that is, 1 mL of air volume.

In the printing plate precursor according to the embodiment of the present invention, it is preferable that the arithmetic average height Sa of the outermost layer surface on the side opposite to the printing surface side is in a range of 0.3 μm to 20 μm.

In a case where the arithmetic average height Sa of the outermost layer surface on the side opposite to the printing surface side is 0.3 μm or more, in a case of configuring a laminate, a gap through which air can flow is formed between the precursors contacted with each other, which enhances an effect of preventing multiple-plate feeding. In a case where the arithmetic average height Sa of the outermost layer surface on the side opposite to the printing surface side is 20 μm or less, problem does not occur, the problem being that the image recording layer is damaged due to the contact of the convex portions in a case of configuring a laminate, and the like, so that development delay occur or scratches adversely affect printing performance.

The arithmetic average height Sa of the outermost layer surface on the side opposite to the printing surface side is more preferably in a range of 0.5 to 10 μm and particularly preferably in a range of 0.5 to 7 μm.

The arithmetic average height Sa of the outermost layer surface is measured in conformity with the method described in ISO 25178. Specifically, using MICROMAP MM3200-M100 (manufactured by Mitsubishi Chemical Systems, Inc.), three or more sites are selected from the same sample, the heights thereof are measured, and the average value thereof is set as the arithmetic average height Sa. As the measurement range, a range with a size of 1 cm×1 cm randomly selected from the sample surface is measured.

In the printing plate precursor according to the embodiment of the present invention, in a case where the Bekk smoothness of the outermost layer surface on the printing surface side is denoted by a second, the following expression (4) is preferably satisfied.

$$a \leq 1,000 \quad (4)$$

In a case where the Bekk smoothness a second of the outermost layer surface on the printing surface side satisfies the expression (4), the effect of preventing multiple-plate feeding is further enhanced.

The Bekk smoothness a second of the outermost layer surface on the printing surface side preferably satisfies a≤300 and more preferably satisfies a≤100.

In the printing plate precursor according to the embodiment of the present invention, it is preferable that, in a case where the Bekk smoothness of the outermost layer surface on the printing surface side is denoted by a second and the Bekk smoothness of the outermost layer surface on the side opposite to the printing surface side is denoted by b second, the following expressions (1) and (3) are satisfied.

$$b \leq 1.000 \quad (1)$$

$$1/a + 1/b \geq 0.002 \quad (3)$$

In a case where the Bekk smoothness b second and the Bekk smoothness a second satisfy the expression (1) and (3), the effect of preventing multiple-plate feeding is further enhanced.

The value of 1/a+1/b, which is the total value of the reciprocal of the Bekk smoothness a second of the outermost layer surface on the printing surface side and the reciprocal of the Bekk smoothness b second of the outermost layer surface on the side opposite to the printing surface side, is preferably 0.004 or more and more preferably 0.01 or more.

Smaller a and b are preferable, and the lower limit value thereof is not particularly limited, but is preferably more than 0.

In the printing plate precursor according to the embodiment of the present invention, it is preferable that the arithmetic average height Sa of the outermost layer surface on the printing surface side is in a range of 0.1 μm to 20 μm.

In a case where the arithmetic average height Sa of the outermost layer surface on the printing surface side is in a range of 0.1 μm to 20 μm, the effect of preventing multiple-plate feeding is further enhanced, and the problem such as development delay is further suppressed.

The arithmetic average height Sa of the outermost layer surface on the printing surface side is preferably in a range of 0.3 to 20 μm, more preferably in a range of 0.5 to 10 μm, and particularly preferably in a range of 0.5 to 7 μm.

In the printing plate precursor according to the embodiment of the present invention, it is preferable that the total value of the arithmetic average height Sa of the outermost layer surface on the side opposite to the printing surface side and the arithmetic average height Sa of the outermost layer surface on the printing surface side is more than 0.3 μm and 20 μm or less.

In a case where the total value of the arithmetic average height Sa of the outermost layer surface on the side opposite to the printing surface side and the arithmetic average height Sa of the outermost layer surface on the printing surface side is more than 0.3 μm and 20 μm or less, the effects of preventing multiple-plate feeding and preventing development delay are enhanced.

The total value of the arithmetic average height Sa of the outermost layer surface on the side opposite to the printing surface side and the arithmetic average height Sa of the outermost layer surface on the printing surface side is preferably in a range of 0.4 to 20 μm, more preferably in a range of 1 to 20 μm, and particularly preferably in a range of 1 to 14 μm.

In the printing plate precursor according to the embodiment of the present invention, as an embodiment in which the Bekk smoothness b second of the outermost layer surface on the side opposite to the printing surface side satisfies the requirement of the expression (1), which is not particularly limited, for example, an embodiment in which the outermost layer (for example, a back coat layer) on the side opposite to the printing surface side includes the particles having a modulus of elasticity of 0.1 GPa or more is preferably exemplified.

The outermost layer on the side opposite to the printing surface side preferably includes a binder in addition to the particles having a modulus of elasticity of 0.1 GPa or more.

As the binder, at least one selected from the group consisting of Novolak resins such as phenol formaldehyde resin, m-cresol formaldehyde resin, p-cresol formaldehyde resin, m-/p-mixed cresol formaldehyde resin, and phenol/cresol (any one of in-, p-, or m-/p-mixed may be used) mixed formaldehyde resin, resole resins, pyrogallol, acetone resins, epoxy resins, saturated copolyester resins, phenoxy resins, polyvinyl acetal resins, vinylidene chloride copolymer resins, polybutene, polybutadiene, polyamide, unsaturated copolymerized polyester resins, polyurethane, polyurea, polyimide, polysiloxane, polycarbonate, chlorinated polyethylene, aldehyde condensation resins of alkylphenol, polyvinyl chloride, polyvinylidene chloride, polystyrene, polyacrylate, carboxyvinyl polymers, acrylic resin copolymer resins, hydroxycellulose, hydroxymethyl cellulose, polyvinyl alcohol, polyvinylpyrrolidone, cellulose acetate, methyl cellulose, and carboxy methyl cellulose is preferably included. In a case of a planographic printing plate precursor used for on-press development, a water-insoluble resin is preferable in order to prevent apprehensiveness of dissolution in dampening water during the on-press development.

Further, as the above-described binder, at least one selected from the group consisting of polyurethane, acrylic resin, polystyrene, and polyethylene is preferably included.

Further, in the above-described embodiment, it is preferable that the above-described particles and the above-described binder each independently include at least one selected from the group consisting of polyurethane, acrylic resin, polystyrene, and polyethylene.

The outermost layer on the side opposite to the printing surface side may include other components in addition to the above-described particles and binder. Examples of other components include known additives such as a surfactant.

The thickness of the outermost layer on the side opposite to the printing surface side is preferably in a range of 0.5 to 10 μm, more preferably in a range of 0.5 to 5 μm, and still more preferably in a range of 0.5 to 3 μm.

Since the printing plate precursor according to the embodiment of the present invention includes the outermost layer (for example, an image recording layer and a protective layer) on the printing surface side of the support, and the outermost layer contains the above-described particles or protrusions are formed on the outermost layer, the Bekk smoothness a second of the outermost layer surface and the arithmetic average height Sa of the outermost layer surface can be adjusted within the desired ranges. As a result, the printing plate precursor according to the embodiment of the present invention has further excellent characteristics.

<Support>

The printing plate precursor according to the embodiment of the present invention includes an aluminum support.

As the support used in the printing plate precursor according to the embodiment of the present invention, a known support is used. Among these, an aluminum plate which has been subjected to an anodizing treatment is preferable, and an aluminum plate which has been subjected to a roughening treatment and an anodizing treatment is more preferable.

The roughening treatment and anodizing treatment can be performed according to known methods.

The aluminum plate can be subjected to a treatment appropriately selected from an expansion treatment or a sealing treatment of micropores of an anodized film described in JP2001-253181A or JP2001-322365A or a surface hydrophilization treatment using alkali metal silicate described in U.S. Pat. Nos. 2,714,066A, 3,181,461A, 3,280,734A, and U.S. Pat. No. 3,902,734A or polyvinyl phosphonic acid described in U.S. Pat. Nos. 3,276,868A, 4,153,461A, and U.S. Pat. No. 4,689,272A as necessary.

The center line average roughness Ra of the support is preferably in a range of 0.10 μm to 1.2 μm.

Further, the average diameter of micropores of the support in the surface of the anodized film is preferably in a range of 10 to 100 nm.

It is preferable that the aluminum support includes an aluminum plate and an anodized film of aluminum disposed on the aluminum plate.

The aluminum plate (aluminum support) is a dimensionally-stable metal in which the main component is aluminum, and is formed of aluminum or aluminum alloy. Examples of the aluminum plate include a pure aluminum plate, an alloy plate including aluminum as a main component and a trace amount of foreign element, and a plastic film of paper laminated or vapor-deposited with aluminum (alloy). Furthermore, a composite sheet in which an aluminum sheet is bonded on a polyethylene terephthalate film, as described in JP1973-018327A (JP-S48-018327A), may be used.

The foreign element included in the aluminum alloy include silicon, iron, manganese, copper, magnesium, chromium, zinc, bismuth, nickel, and titanium, and the content of the foreign element in the alloy is 10% by mass or less with respect to the total mass of the alloy. As the aluminum plate, a pure aluminum plate is suitable, and since completely pure aluminum is difficult to produce due to smelting technology, the pure aluminum plate may include a slight amount of foreign element.

The composition of the aluminum plate is not limited, and known and publicly available compositions (for example, JIS A 1050, JIS A 1100, JIS A 3103, and JIS A 3005) can be appropriately used.

Further, the width of the aluminum plate is preferably in a range of approximately 400 mm to 2,000 mm, and the thickness thereof is preferably in a range of approximately 0.1 mm to 0.6 mm. This width or thickness can be appropriately changed depending on the size of the printing machine, the size of the printing plate, the printed article to be obtained, and the like.

(Anodized Film)

The anodized film refers to an anodized aluminum film having micropores, which is formed on the surface of the aluminum plate by anodizing treatment. The micropores extend from a surface of the anodized film opposite to the aluminum plate in a thickness direction (aluminum plate side, depth direction).

From the viewpoint of tone reproducibility, printing durability, and blanket stain property, the average diameter (average opening diameter) of the above-described micropores in the surface of the anodized film is preferably in a range of 7 nm to 150 nm, more preferably in a range of 10 nm to 100 nm, still more preferably in a range of 10 nm to 60 nm, particularly preferably in a range of 15 nm to 60 nm, and most preferably in a range of 18 nm to 40 nm.

It is preferable that the micropores in the anodized film are constituted of a large-diameter hole portion extending from the surface of the anodized film to a depth of 10 nm to 1,000 nm and a small-diameter hole portion which communicates with the bottom of the large-diameter hole portion and extends from the communicating position to a depth of 20 to 2,000 nm.

Hereinafter, the large-diameter hole portion and the small-diameter hole portion will be described in detail.

—Large-Diameter Hole Portion—

From the viewpoint of tone reproducibility, printing durability, and blanket stain property, the average diameter (average opening diameter) of the large-diameter hole portion in the surface of the anodized film is preferably in a range of 7 nm to 150 nm, more preferably in a range of 15 nm to 150 nm, still more preferably in a range of 15 nm to 60 nm, and particularly preferably in a range of 18 nm to 40 nm.

The average diameter of the large-diameter hole portion is calculated by observing N=4 sheets of the surface of the anodized film using a field emission scanning electron microscope (FE-SEM) at a magnification of 150,000, measuring the diameters of micropores (large-diameter hole portions) present in a range of 400×600 $nm^2$ in the obtained images of 4 sheets, and averaging the diameters as an arithmetic average value.

In a case where the shape of the large-diameter hole portion is not circular, an equivalent circle diameter is used. The "equivalent circle diameter" is a diameter of a circle obtained by assuming the shape of an opening portion as a circle having the same projected area as the projected area of the opening portion.

The bottom of the large-diameter hole portion is preferably located at a depth of 70 nm to 1,000 nm (hereinafter, also referred to as a depth A) from the surface of the anodized film. That is, it is preferable that the large-diameter hole portion is a hole portion extending from the surface of the anodized film in the depth direction (thickness direction)

by 70 nm to 1,000 nm. Among these, from the viewpoint that an effect of a method of producing a planographic printing plate precursor according to the present invention is more excellent, the depth A is more preferably in a range of 90 nm to 850 nm, still more preferably in a range of 90 nm to 800 nm, and particularly preferably in a range of 90 nm to 600 nm.

The above-described depth is calculated by imaging a cross section of the anodized film (at a magnification of 150,000), measuring depths of 25 or more large-diameter hole portions, and averaging the depths as an arithmetic average value.

The shape of the large-diameter hole portion is not particularly limited, and examples thereof include a substantially straight tubular shape (substantially columnar shape) and a conical shape in which diameter decreases in the depth direction (thickness direction). Among these, a substantially straight tubular shape is preferable. Further, the shape of the bottom of the large-diameter hole portion is not particularly limited, and may be curved (convex) or flat.

The inner diameter of the large-diameter hole portion is not particularly limited, but it is preferable that the inner diameter is as large as the diameter of the opening portion or is smaller than the diameter of the opening portion. The inner diameter of the large-diameter hole portion may have a difference of approximately 1 nm to 10 nm from the diameter of the opening portion.

—Small-Diameter Hole Portion—

The small-diameter hole portion is a hole portion that communicates with the bottom of the large-diameter hole portion and extends further in the depth direction (thickness direction) from the communicating position. One small-diameter hole portion usually communicates with one large-diameter hole portion, but two or more small-diameter hole portions may communicate with the bottom of one large-diameter hole portion.

The average diameter of the small-diameter hole portion at the communicating position is preferably 13 nm or less, more preferably 11 nm or less, and particularly preferably 10 nm or less. The lower limit is not particularly limited, but is preferably 5 nm or more.

The average diameter of the small-diameter hole portion is calculated by observing N=4 sheets of the surface of the anodized film using FE-SEM at a magnification of 150,000, measuring the diameters of micropores (small-diameter hole portions) present in a range of 400×600 nm$^2$ in the obtained images of 4 sheets, and obtaining the arithmetic average value of the diameters. In a case where the large-diameter hole portion is deep, as necessary, the average diameter of the small-diameter hole portion may be obtained by cutting (for example, cutting with argon gas) the upper part (region with the large-diameter hole portion) of the anodized film, and then observing the surface of the anodized film using FE-SEM.

In a case where the shape of the small-diameter hole portion is not circular, an equivalent circle diameter is used. The "equivalent circle diameter" is a diameter of a circle obtained by assuming the shape of an opening portion as a circle having the same projected area as the projected area of the opening portion.

The bottom of the small-diameter hole portion is preferably located at a position extending further 20 nm to 2,000 nm in the depth direction from the communicating position (corresponding to the above-described depth A) with the large-diameter hole portion. In other words, the small-diameter hole portion is a hole portion extending further in the depth direction (thickness direction) from the communicating position with the large-diameter hole portion, and the depth of the small-diameter hole portion is preferably in a range of 20 nm to 2,000 nm, more preferably in a range of 100 nm to 1,500 nm, and particularly preferably in a range of 200 nm to 1,000 nm.

The above-described depth is calculated by imaging a cross section of the anodized film (at a magnification of 50,000), measuring depths of 25 or more small-diameter hole portions, and averaging the depths as an arithmetic average value.

The shape of the small-diameter hole portion is not particularly limited, and examples thereof include a substantially straight tubular shape (substantially columnar shape) and a conical shape in which diameter decreases in the depth direction. Among these, a substantially straight tubular shape is preferable. Further, the shape of the bottom of the small-diameter hole portion is not particularly limited, and may be curved (convex) or flat.

The inner diameter of the small-diameter hole portion is not particularly limited, and may be as large as the diameter at the communicating position or may be smaller or larger than the diameter. Generally, the inner diameter of the small-diameter hole portion may have a difference of approximately 1 nm to 10 nm from the diameter of the opening portion.

The ratio of the average diameter of the large-diameter hole portion in the surface of the anodized film to the average diameter of the small-diameter hole portion at the communicating position, (Average diameter of large-diameter hole portion on surface of anodized film)/(Average diameter of small-diameter hole portion at communicating position), is preferably in a range of 1.1 to 13 and more preferably in a range of 2.5 to 6.5.

Further, the ratio of the depth of the large-diameter hole portion to the depth of the small-diameter hole portion, (Depth of large-diameter hole portion)/(Depth of small-diameter hole portion), is preferably in a range of 0.005 to 50 and more preferably in a range of 0.025 to 40.

The method of producing the support used in the present invention is not particularly limited, and a known method can be used.

Hereinafter, the method of producing the support will be exemplified, but it is needless to say that the method is not limited thereto.

As a method of producing an aluminum support, for example, as a method of producing an aluminum support having an anodized film which has micropores extending in the depth direction from the surface of the image recording layer side, a producing method in which the following steps are carried out in order is preferable. (Roughening treatment step) step of subjecting an aluminum plate to a roughening treatment; (Anodizing treatment step) step of anodizing the roughened aluminum plate; (Pore widening treatment step) step of bringing the aluminum plate having an anodized film which is obtained in the anodizing treatment into contact with an acid aqueous solution or an alkaline aqueous solution to enlarging the diameter of micropores in the anodized film Hereinafter, the procedure of each step will be described in detail.

—Roughening Treatment Step—

The roughening treatment step is a step of subjecting a surface of an aluminum plate to a roughening treatment including an electrochemical roughening treatment. This step is preferably carried out before the anodizing treatment step described later, but in a case where the surface of the aluminum plate already has a preferred surface shape, it is not necessary to carry out the step.

The roughening treatment may be carried out only by the electrochemical roughening treatment, or may be carried out by combining the electrochemical roughening treatment with a mechanical roughening treatment and/or a chemical roughening treatment.

In a case of combining the mechanical roughening treatment and the electrochemical roughening treatment, it is preferable to carry out the electrochemical roughening treatment after the mechanical roughening treatment.

The electrochemical roughening treatment is preferably carried out using direct current or alternating current in an aqueous solution mainly containing nitric acid or hydrochloric acid.

The method of the mechanical roughening treatment is not particularly limited, and examples thereof include a method described in JP1975-040047A (JP-S50-040047A).

The chemical roughening treatment is also not particularly limited, and a known method can be mentioned.

After the mechanical roughening treatment, it is preferable to carry out the following chemical etching treatment.

The chemical etching treatment carried out after the mechanical roughening treatment is performed in order to smooth uneven edges on the surface of the aluminum plate, to prevent ink from catching on the edges during printing, to improve scumming resistance of the printing plate, and to remove unnecessary substances, such as abrasive particles, remaining on the surface.

Examples of the chemical etching treatment include etching with an acid and etching with an alkali, and examples of a method particularly excellent in terms of etching efficiency include chemical etching treatment using an alkaline aqueous solution (hereinafter, also referred to as an "alkali etching treatment").

An alkaline agent used in the alkaline aqueous solution is not particularly limited, and examples thereof include caustic soda, caustic potash, metasilicic acid soda, carbonic acid soda, aluminic acid soda, and gluconic acid soda.

The alkaline aqueous solution may include aluminum ions.

The concentration of the alkaline agent in the alkaline aqueous solution is preferably 0.01% by mass or more and more preferably 3% by mass or more, and is preferably 30% by mass or less.

In a case of carrying out the alkali etching treatment, in order to remove product produced by the alkali etching treatment, it is preferable to carry out a chemical etching treatment using a low-temperature acidic aqueous solution (hereinafter, also referred to as a "desmutting treatment").

The acid used in the acidic aqueous solution is not particularly limited, and examples thereof include sulfuric acid, nitric acid, and hydrochloric acid. Further, the temperature of the acidic aqueous solution is preferably in a range of 20° C. to 80° C.

As the roughening treatment step, a method of carrying out the treatments shown in A aspect or B aspect in the order shown below is preferable.

—A Aspect—
  (2) Chemical etching treatment using an alkaline aqueous solution (first alkali etching treatment)
  (3) Chemical etching treatment using an acidic aqueous solution (first desmutting treatment)
  (4) Electrochemical roughening treatment using an aqueous solution mainly containing nitric acid (first electrochemical roughening treatment)
  (5) Chemical etching treatment using an alkaline aqueous solution (second alkali etching treatment)
  (6) Chemical etching treatment using an acidic aqueous solution (second desmutting treatment)
  (7) Electrochemical roughening treatment using an aqueous solution mainly containing hydrochloric acid (second electrochemical roughening treatment)
  (8) Chemical etching treatment using an alkaline aqueous solution (third alkali etching treatment)
  (9) Chemical etching treatment using an acidic aqueous solution (third desmutting treatment)
—B Aspect—
  (10) Chemical etching treatment using an alkaline aqueous solution (fourth alkali etching treatment)
  (11) Chemical etching treatment using an acidic aqueous solution (fourth desmutting treatment)
  (12) Electrochemical roughening treatment using an aqueous solution mainly containing hydrochloric acid (third electrochemical roughening treatment)
  (13) Chemical etching treatment using an alkaline aqueous solution (fifth alkali etching treatment)
  (14) Chemical etching treatment using an acidic aqueous solution (fifth desmutting treatment)

Before the treatment (2) of the A aspect or before the treatment (10) of the B aspect, as necessary, (1) mechanical roughening treatment may be carried out.

The dissolution amount of the aluminum plate in the first alkali etching treatment and the fourth alkali etching treatment is preferably in a range of 0.5 g/m$^2$ to 30 g/m$^2$ and more preferably in a range of 1.0 g/m$^2$ to 20 g/m$^2$.

Examples of the aqueous solution mainly containing nitric acid, which is used in the first electrochemical roughening treatment in the A aspect, include an aqueous solution used for the electrochemical roughening treatment using direct current or alternating current. Examples thereof include an aqueous solution obtained by adding aluminum nitrate, sodium nitrate, ammonium nitrate, or the like to 1 g/L to 100 g/L of nitric acid aqueous solution.

Examples of the aqueous solution mainly containing hydrochloric acid, which is used in the second electrochemical roughening treatment in the A aspect and in the third electrochemical roughening treatment in the B aspect, include an aqueous solution used for the electrochemical roughening treatment using direct current or alternating current. Examples thereof include an aqueous solution obtained by adding 0 g/L to 30 g/L of sulfuric acid to 1 g/L to 100 g/L of hydrochloric acid aqueous solution. Nitrate ions of aluminum nitrate, sodium nitrate, ammonium nitrate, and the like; or chloride ions of aluminum chloride, sodium chloride, ammonium chloride, and the like may be further added to this solution.

As an AC power source waveform of the electrochemical roughening treatment, a sine wave, a rectangular wave, a trapezoidal wave, a triangular wave, and the like can be used. The frequency is preferably in a range of 0.1 Hz to 250 Hz.

FIG. 1 is a graph showing an example of an alternating waveform current waveform diagram used for the electrochemical roughening treatment.

In FIG. 1, ta represents an anodic reaction time, tc represents a cathodic reaction time, tp represents a time taken for the current to reach the peak from 0, Ia represents the peak current on an anode cycle side, and Ic represents the peak current on a cathode cycle side. In the trapezoidal wave, the time tp taken for the current to reach the peak from 0 is preferably in a range of 1 msec to 10 msec. As conditions for one cycle of alternating current used for electrochemical roughening, it is preferable that a ratio tc/ta of the anodic reaction time ta to the cathodic reaction time tc of the aluminum plate is in a range of 1 to 20, a ratio Qc/Qa of an electric quantity Qc at the anode an electric quantity Ca at the anode of the aluminum plate is in a range of 0.3 to 20, and the anodic reaction time ta is in a range of 5 msec to 1,000 msec. The current density is preferably a peak value of the trapezoidal wave in which both the current Ia the anode cycle side and the current Ic the cathode cycle side are in a range of 10 to 200 A/dm$^2$. Ic/Ia is preferably in a range of 0.3 to 20. The sum total of the electric quantity participated in the anodic reaction of the aluminum plate immediately before a timing of the electrochemical roughening is preferably in a range of 25 C/dm$^2$ to 1,000 C/dm$^2$.

Figure 2:
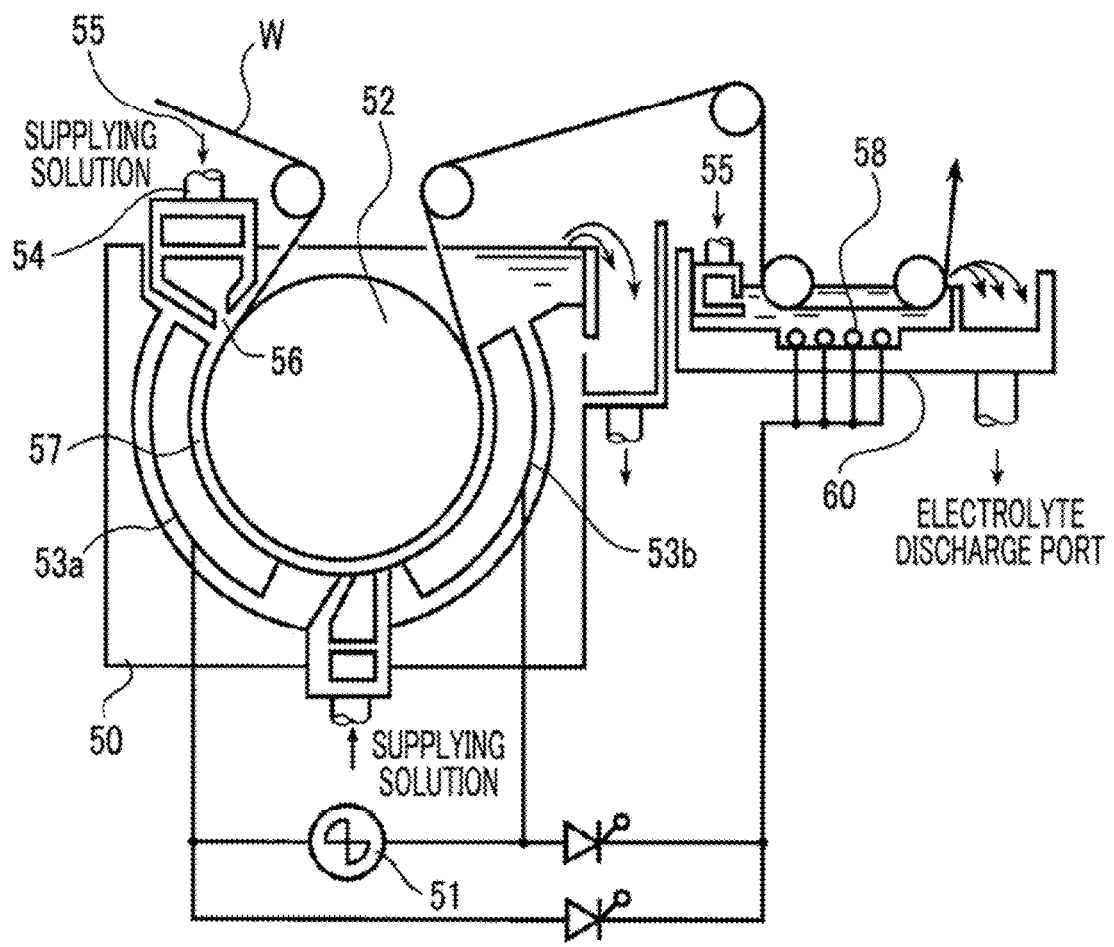
FIG. 2 is a side view illustrating an example of a radial type cell in the electrochemical roughening treatment using an alternating current.

A device shown in FIG. 2 can be used for the electrochemical roughening using alternating current.

FIG. 2 is a side view illustrating an example of a radial type cell in the electrochemical roughening treatment using the alternating current.

In FIG. 2, the reference numeral 50 represents a main electrolytic cell, the reference numeral 51 represents an AC power source, the reference numeral 52 represents a radial drum roller, the reference numerals 53a and 53b represent a main pole, the reference numeral 54 represents an electrolyte supply port, the reference numeral 55 represents an electrolyte, the reference numeral 56 represents a slit, the reference numeral 57 represents an electrolyte passage, the reference numeral 58 represents an auxiliary anode, the reference numeral 60 represents an auxiliary anode cell, and the symbol W represents an aluminum plate. In a case where two or more electrolytic cells are used, the electrolysis conditions may be the same or different from each other.

The aluminum plate W is wound around the radial drum roller 52 which is immersed in and disposed on the main electrolytic cell 50, and in the transport step, electrolysis is performed by the main poles 53a and 53b connected to the AC power source 51. The electrolyte 55 is supplied from the electrolyte supply port 54 to the electrolyte passage 57 between the radial drum roller 52 and the main poles 53a and 53b, through the slit 56. The aluminum plate W treated in the main electrolytic cell 50 is then electrolyzed in the auxiliary anode cell 60. In the auxiliary anode cell 60, the auxiliary anode 58 is disposed to face the aluminum plate W, and the electrolyte 55 is supplied so as to flow in the space between the auxiliary anode 58 and the aluminum plate W.

From the viewpoint that it is easy to produce a predetermined printing plate precursor, the dissolution amount of the aluminum plate in the second alkali etching treatment is preferably 1.0 g/m$^2$ or more and more preferably in a range of 2.0 g/m$^2$ to 10 g/m$^2$.

From the viewpoint that it is easy to produce a predetermined printing plate precursor, the dissolution amount of the aluminum plate in the third alkali etching treatment and the fourth alkali etching treatment is preferably in a range of 0.01 g/m$^2$ to 0.8 g/m$^2$ and more preferably in a range of 0.05 g/m$^2$ to 0.3 g/m$^2$.

In the chemical etching treatment (first to fifth desmutting treatment) using an acidic aqueous solution, an acidic aqueous solution containing phosphoric acid, nitric acid, sulfuric acid, chromic acid, hydrochloric acid, or a mixed acid including two or more of these acids is suitably used.

The concentration of the acid in the acidic aqueous solution is preferably in a range of 0.5% by mass to 60% by mass.

—Anodizing Treatment Step—

The procedure of the anodizing treatment step is not particularly limited as long as the above-described micropores can be obtained, and a known method can be mentioned.

In the anodizing treatment step, an aqueous solution of sulfuric acid, phosphoric acid, oxalic acid, and the like can be used as an electrolytic bath. For example, the concentration of sulfuric acid may be 100 g/L to 300 g/L.

The condition of the anodizing treatment is appropriately set depending on the electrolyte used, and examples thereof include a condition in which the solution temperature is in a range of 5° C. to 70° C. (preferably 10° C. to 60° C.), the current density is in a range of 0.5 A/dm$^2$ to 60 A/dm$^2$ (preferably 5 A/dm$^2$ to 60 A/dm$^2$), the voltage is preferably in a range of 1 V to 100 V (preferably 5 V to 50 V), the electrolysis time is in a range of 1 second to 100 seconds (preferably 5 seconds to 60 seconds), and the coating amount is 0.1 g/m$^2$ to 5 g/m$^2$ (preferably 0.2 g/m$^2$ to 3 g/m$^2$).

—Pore Widening Treatment—

The pore widening treatment is a treatment (pore diameter enlargement treatment) for enlarging the diameter (pore diameter) of micropores existing in the anodized film formed by the above-described anodizing treatment step.

The pore widening treatment can be performed by bringing the aluminum plate is obtained by the above-described anodizing treatment step into contact with an acid aqueous solution or an alkaline aqueous solution. The contact method is not particularly limited, and examples thereof include a dipping method and a spraying method.

A rear surface of the support may be provided with an organic polymer compound described in JP1993-045885A (JP-H05-045885A) and a back coat layer containing an alkoxy compound of silicon described in JP1994-035174A (JP-H06-035174A) as necessary.

Hereinafter, a planographic printing plate precursor, which is one embodiment of the printing plate precursor according to the embodiment of the present invention, will be described.

[Planographic Printing Plate Precursor]

The planographic printing plate precursor according to the present invention has an image recording layer on the printing surface side of the support. The planographic printing plate precursor may have an undercoat layer between the support and the image recording layer and a protective layer on the image recording layer as necessary.

<Image Recording Layer>

It is preferable that the image recording layer of the planographic printing plate precursor includes an infrared absorbent, a polymerization initiator, a polymerizable compound, and a polymer compound. The polymer compound may function as a binder polymer of the image recording layer, or may be present in the image recording layer as a polymer compound having a particle shape.

As the polymer compound, a polymer compound including styrene and/or acrylonitrile as a constitutional unit is preferable.

Examples of the styrene described above include styrene, p-methylstyrene, p-methoxystyrene, β-methylstyrene, p-methyl-β-methylstyrene, α-methylstyrene, and p-methoxy-β-methylstyrene. Among these, styrene is preferable.

Examples of the acrylonitrile described above include (meth)acrylonitrile, and acrylonitrile is preferable.

According to a preferred embodiment of the planographic printing plate precursor according to the present invention, the image recording layer is an image recording layer (hereinafter, also referred to as an "image recording layer A") containing an infrared absorbent, a polymerization initiator, a polymerizable compound, and a binder polymer.

According to another preferred embodiment of the planographic printing plate precursor according to the present invention, the image recording layer is an image recording layer (hereinafter, also referred to as an "image recording layer B") containing an infrared absorbent, a polymerization initiator, a polymerizable compound, and a polymer compound having a particle shape.

According to still another preferred embodiment of the planographic printing plate precursor according to the present invention, the image recording layer is an image recording layer (hereinafter, also referred to as an "image recording layer C") containing an infrared absorbent and thermoplastic polymer particles.

—Image Recording Layer A—

The image recording layer A contains an infrared absorbent, a polymerization initiator, a polymerizable compound, and a binder polymer. Hereinafter, the constituent components of the image recording layer A will be described.

(Infrared Absorbent)

The infrared absorbent has a function of converting absorbed infrared rays into heat, a function of electron transfer to a polymerization initiator described below through excitation by infrared rays, and/or a function of energy transfer thereto. As the infrared absorbent used in the present invention, a dye or a pigment having maximum absorption at a wavelength of 760 nm to 1,200 nm is preferable and a dye is more preferable.

As the dye, dyes described in paragraphs 0082 to 0088 of JP2014-104631A can be used.

The average particle diameter of the pigment is preferably in a range of 0.01 µm to 1 µm and more preferably in a range of 0.01 µm to 0.5 µm. A known dispersion technique used to produce inks or toners can be used for dispersion of the pigment. The details are described in "Latest Pigment Application Technology" (CMC Publishing Co., Ltd., published in 1986) and the like.

The infrared absorbent may be used alone or in combination of two or more kinds thereof.

The content of the infrared absorbent is preferably in a range of 0.05% by mass to 30% by mass, more preferably in a range of 0.1% by mass to 20% by mass, and particularly preferably in a range of 0.2% by mass to 10% by mass with respect to the total mass of the image recording layer.

(Polymerization Initiator)

The polymerization initiator is a compound that initiates and promotes polymerization of a polymerizable compound. As the polymerization initiator, a known thermal polymerization initiator, a compound having a bond with small bond dissociation energy, or a photopolymerization initiator can be used. Specifically, radical polymerization initiators described in paragraphs 0092 to 0106 of JP2014-104631A can be used.

Preferred examples of compounds of the polymerization initiators include onium salts. Among these, iodonium salts and sulfonium salts are particularly preferable. Preferred specific examples of the compounds in each of the salts are compounds described in paragraphs 0104 to 0106 of JP2014-104631A.

The content of the polymerization initiator is preferably in a range of 0.1% by mass to 50% by mass, more preferably in a range of 0.5% by mass to 30% by mass, and particularly preferably in a range of 0.8% by mass to 20% by mass with respect to the total mass of the image recording layer. In a case where the content thereof is within the above-described range, improved sensitivity and improved stain resistance of a non-image area during printing are obtained.

(Polymerizable Compound)

The polymerizable compound is an addition polymerizable compound having at least one ethylenically unsaturated bond, and is preferably selected from compounds having at least one, more preferably two or more, terminal ethylenically unsaturated bond. These compounds have chemical forms such as a monomer, a pre-polymer, that is, a dimer, a trimer, an oligomer, and a mixture of these.

Examples of the monomer include unsaturated carboxylic acids (such as acrylic acid, methacrylic acid, itaconic acid, crotonic acid, isocrotonic acid, and maleic acid), and esters and amides thereof, and an ester of an unsaturated carboxylic acid and a polyhydric alcohol compound and amides of an unsaturated carboxylic acid and a polyhydric amine compound are preferably used. Further, addition reaction products of unsaturated carboxylic acid ester or amides having a nucleophilic substituent such as a hydroxy group, an amino group, and a mercapto group, and monofunctional or polyfunctional isocyanates or epoxies; dehydration-condensation reaction products with monofunctional or polyfunctional carboxylic acids; and the like are also suitably used. Further, addition reaction products of unsaturated carboxylic acid ester or amides having an electrophilic substituent such as an isocyanate group and an epoxy group, and monofunctional or polyfunctional alcohols, amines, or thiols; and substitution reaction products of unsaturated carboxylic acid esters or amides having a dissociable substituent such as a halogen group and a tosyloxy group, and monofunctional or polyfunctional alcohols, amines, or thiols are also suitable.

As additional examples, compound groups obtained by replacing the above-described unsaturated carboxylic acids with unsaturated phosphonic acids, styrenes, vinyl ethers, or the like can also be used. These compounds are described in references including JP2006-508380A, JP2002-287344A, JP2008-256850A, JP2001-342222A, JP1997-179296A (JP-H09-179296A), JP1997-179297A (JP-H09-179297A), JP1997-179298A (JP-H09-179298A), JP2004-294935A, JP2006-243493A, JP2002-275129A, JP2003-064130A, JP2003-280187A, and JP1998-333321A (JP-H10-333321A).

As specific examples of monomers of the ester of polyhydric alcohol compound and unsaturated carboxylic acid, ethylene glycol diacrylate, 1,3-butanediol diacrylate, tetramethylene glycol diacrylate, propylene glycol diacrylate, trimethylolpropane triacrylate, hexanediol diacrylate, tetraethylene glycol diacrylate, pentaerythritol tetraacrylate, sorbitol triacrylate, isocyanuric acid ethylene oxide (EO)-modified triacrylate, polyester acrylate oligomers, and the like are exemplified as acrylic acid esters. As methacrylic acid esters, tetramethylene glycol dimethacrylate, neopentyl glycol dimethacrylate, trimethylolpropane trimethacrylate, ethylene glycol dimethacrylate, pentaerythritol trimethacrylate, bis[p-(3-methacryloxy-2-hydroxypropoxy)phenyl] dimethyl methane, bis[p-(methacryloxyethoxy)phenyl] dimethyl methane, and the like are exemplified. Further, as specific examples of monomers of the amide of polyhydric amine compound and unsaturated carboxylic acid, methylene bisacrylamide, methylene bismethacrylamide, 1,6-hexamethylene bisacrylamide, 1,6-hexamethylene bismethacrylamide, diethylenetriamine trisacrylamide, xylylene bisacrylamide, xylylene bismethacrylamide, and the like are exemplified.

Urethane-based addition polymerizable compounds produced using an addition reaction between an isocyanate and a hydroxy group are also suitable, and specific examples thereof include vinyl urethane compounds having two or more polymerizable vinyl groups in one molecule obtained by adding vinyl monomers having a hydroxy group represented by Formula (b) to a polyisocyanate compound having two or more isocyanate groups in one molecule which is described in JP1973-041708B (JP-S48-041708B).

$$CH_2=C(R_{b4})COOCH_2CH(R_{b5})OH \quad (b)$$

Here, $R_{b4}$ and $R_{b5}$ represent a hydrogen atom or a methyl group.

Urethane acrylates described in JP1976-037193A (JP-S51-037193A), JP1990-32293B (JP-H02-32293B), JP1990-16765B (JP-H02-16765B), JP2003-344997A, and JP2006-065210A, urethane compounds having ethylene oxide-based skeletons described in JP1983-49860B (JP-S58-49860B), JP1981-17654B (JP-S56-17654B), JP1987-39417B (JP-S62-39417B), JP1987-39418B (JP-S62-39418B), JP2000-250211A, and JP2007-094138A, and urethane compounds having hydrophilic groups described in U.S. Pat. No. 7,153, 632B, JP1996-505958A (JP-H08-505958A), JP2007-293221A, and JP2007-293223A are also suitable.

Among the examples described above, from the viewpoint that balance between hydrophilicity associated with on-press developability and polymerization ability associated with printing durability is excellent, isocyanuric acid ethylene oxide-modified acrylate compounds or compounds having a urethane bond or a urea bond in the molecule are particularly preferable.

The polymerizable compound may be used alone or in combination of two or more kinds thereof.

The details of the structures of these polymerizable compounds, whether to be used alone or in combination, and the usage method such as the addition amount can be arbitrarily set according to the final performance design of a planographic printing plate precursor.

The content of the polymerizable compound is preferably in a range of 5% by mass to 75% by mass, more preferably in a range of 10% by mass to 70% by mass, and particularly preferably in a range of 15% by mass to 60% by mass with respect to the total mass of the image recording layer.

(Binder Polymer)

The binder polymer can be mainly used for the purpose of improving film hardness of the image recording layer. As the binder polymer, known polymers of the related art can be used and polymers having coated-film properties are preferable. Among examples thereof, an acrylic resin, a polyvinyl acetal resin, and a polyurethane resin are preferable.

Preferred examples of the binder polymers include polymers having a crosslinking functional group in the main chain or side chain, preferably in the side chain, for improving coated-film hardness of an image area as described in JP2008-195018A. Crosslinking occurs between polymer molecules by the crosslinking group so that curing is promoted.

Preferred examples of the crosslinking functional group include an ethylenically unsaturated group such as a (meth) acryl group, a vinyl group, an allyl group, or a styryl group and an epoxy group, and the crosslinking functional group can be introduced into a polymer by a polymer reaction or copolymerization. For example, a reaction between an acrylic polymer having a carboxy group in the side chain thereof or polyurethane and glycidyl methacrylate or a reaction between a polymer having an epoxy group and ethylenically unsaturated group-containing carboxylic acid such as methacrylic acid can be used.

The content of the crosslinking group in the binder polymer is preferably in a range of 0.1 to 10.0 mmol, more preferably in a range of 0.25 to 7.0 mmol, and particularly preferably in a range of 0.5 to 5.5 mmol per 1 g of the binder polymer.

Moreover, it is preferable that the binder polymer includes a hydrophilic group. The hydrophilic group contributes to imparting on-press developability to the image recording layer. Particularly, in the coexistence of a crosslinking group and a hydrophilic group, both of printing durability and on-press developability can be achieved.

Examples of the hydrophilic group include a hydroxy group, a carboxy group, an alkylene oxide structure, an amino group, an ammonium group, an amide group, a sulfo group, and a phosphoric acid group. Among these, an alkylene oxide structure having 1 to 9 alkylene oxide units having 2 or 3 carbon atoms is preferable. A monomer having a hydrophilic group may be copolymerized in order to impart a hydrophilic group to a binder polymer.

In addition, in order to control impressing property, a lipophilic group such as an alkyl group, an aryl group, an aralkyl group, or an alkenyl group can be introduced into the binder polymer. For example, a lipophilic group-containing monomer such as methacrylic acid alkyl ester may be copolymerized.

The weight-average molecular weight (Mw) of the binder polymer is preferably 2,000 or more, more preferably 5,000 or more, and still more preferably in a range of 10,000 to 300,000.

The content of the binder polymer is preferably in a range of 3% by mass to 90% by mass, more preferably in a range of 5% by mass to 80% by mass, and still more preferably in a range of 10% by mass to 70% by mass with respect to the total mass of the image recording layer.

As a preferred example of the binder polymer, a polymer compound having a polyoxyalkylene chain in the side chain is exemplified. In a case where the image recording layer contains a polymer compound having a polyoxyalkylene chain in the side chain (hereinafter, also referred to as a "POA chain-containing polymer compound"), permeability of dampening water is promoted and on-press developability is improved.

Examples of the resin constituting the main chain of the POA chain-containing polymer compound include an acrylic resin, a polyvinyl acetal resin, a polyurethane resin, a polyurea resin, a polyimide resin, a polyamide resin, an epoxy resin, a methacrylic resin, a polystyrene resin, a novolak type phenolic resin, a polyester resin, synthetic rubber, and natural rubber. Among these, an acrylic resin is particularly preferable.

In the present invention, the "main chain" indicates relatively the longest bonding chain in a molecule of a polymer compound constituting a resin and the "side chain" indicates a branched chain branched from the main chain.

The POA chain-containing polymer compound does not substantially include a perfluoroalkyl group. The expression "does not substantially include a perfluoroalkyl group" means that the mass ratio of fluorine atom present as a perfluoroalkyl group in the polymer compound is less than 0.5% by mass, and it is preferable that the polymer compound does not include a fluorine atom. The mass ratio of fluorine atom is measured by an elemental analysis method.

Further, the "perfluoroalkyl group" is a group in which all hydrogen atoms of the alkyl group are replaced with fluorine atoms.

As alkylene oxide (oxyalkylene) in the polyoxyalkylene chain, alkylene oxide having 2 to 6 carbon atoms is preferable, ethylene oxide (oxyethylene) or propylene oxide (oxypropylene) is more preferable, and ethylene oxide is still more preferable.

The repetition number of the alkylene oxide in a polyoxyalkylene chain, that is, a polyalkyleneoxide moiety is preferably in a range of 2 to 50 and more preferably in a range of 4 to 25.

In a case where the repetition number of the alkylene oxide is 2 or more, the permeability of dampening water is sufficiently improved. Further, from the viewpoint that printing durability is not degraded due to abrasion, it is preferable that the repetition number thereof is 50 or less.

As the polyalkyleneoxide moiety, structures described in paragraphs 0060 to 0062 of JP2014-104631A are preferable.

The POA chain-containing polymer compound may have crosslinking properties in order to improve coated-film hardness of an image area. Examples of the POA chain-containing polymer compounds having crosslinking properties are described in paragraphs 0063 to 0072 of JP2014-104631A.

The proportion of repeating units having a poly(alkylene oxide) moiety in the total repeating units constituting the POA chain-containing polymer compound is not particularly limited, but is preferably in a range of 0.5 mol % to 80 mol % and more preferably in a range of 0.5 mol % to 50 mol %. Specific examples of the POA chain-containing polymer compounds are described in paragraphs 0075 and 0076 of JP2014-104631A.

As the POA chain-containing polymer compound, hydrophilic polymer compounds, such as polyacrylic acid and polyvinyl alcohol, described in JP2008-195018A can be used in combination as necessary. Further, a lipophilic polymer compound and a hydrophilic polymer compound can be used in combination.

In addition to the presence of the POA chain-containing polymer compound in the image recording layer as a binder which has a function of connecting image recording layer components with each other, the polymer compound may be present in form of particles. In a case where the polymer compound is present in the particle shape, the average particle diameter is preferably in a range of 10 nm to 1,000 nm, more preferably in a range of 20 nm to 300 nm, and particularly preferably in a range of 30 nm to 120 nm.

The content of the POA chain-containing polymer compound is preferably in a range of 3% by mass to 90% by mass and more preferably in a range of 5% by mass to 80% by mass with respect to the total mass of the image recording layer. In a case where the content thereof is within the above-described range, both of permeability of dampening water and image formability can be more reliably achieved.

Other preferred examples of the binder polymer include a polymer compound (hereinafter, also referred to as a "star type polymer compound") which has a polymer chain bonded to a nucleus through a sulfide bond by means of using a polyfunctional, in a range of hexa- to deca-functional, thiol as the nucleus and in which the polymer chain has a polymerizable group. As the star type polymer compound, for example, compounds described in JP2012-148555A can be preferably used.

Examples of the star type polymer compound include compounds having a polymerizable group such as an ethylenically unsaturated bond in the main chain or in the side chain, preferably in the side chain, for improving coated-film hardness of an image area as described in JP2008-195018A. Crosslinking occurs between polymer molecules by the polymerizable group so that curing is promoted.

Preferred examples of the polymerizable group include an ethylenically unsaturated group such as a (meth)acryl group, a vinyl group, an allyl group, or a styryl group and an epoxy group. Among these, from the viewpoint of polymerization reactivity, a (meth)acryl group, a vinyl group, or a styryl group is more preferable and a (meth)acryl group is particularly preferable. These groups can be introduced into a polymer by a polymer reaction or copolymerization. For example, a reaction between a polymer having a carboxy group in the side chain thereof and glycidyl methacrylate or a reaction between a polymer having an epoxy group and ethylenically unsaturated group-containing carboxylic acid such as methacrylic acid can be used. These groups may be used in combination.

The content of the crosslinking group in the star type polymer compound is preferably in a range of 0.1 mmol to 10.0 mmol, more preferably in a range of 0.25 mmol to 7.0 mmol, and particularly preferably in a range of 0.5 mmol to 5.5 mmol per 1 g of the star type polymer compound.

Moreover, it is preferable that the star type polymer compound further includes a hydrophilic group. The hydrophilic group contributes to imparting on-press developability to the image recording layer. Particularly, in the coexistence of a polymerizable group and a hydrophilic group, both of printing durability and developability can be achieved.

Examples of the hydrophilic group include —$SO_3M^1$, —OH, —$CONR^1R^2$ ($M^1$ represents a hydrogen atom, a metal ion, an ammonium ion, or a phosphonium ion, $R^1$ and $R^2$ each independently represent a hydrogen atom, an alkyl group, an alkenyl group, or an aryl group, and $R^1$ and $R^2$ may be bonded to each other to form a ring), —$N^+R^3R^4R^5X^-$ ($R^3$ to $R^5$ each independently represent an alkyl group having 1 to 8 carbon atoms and $X^-$ represents a counter anion), —$(CH_2CH_2O)_nR$, and —$(C_3H_6O)_mR$.

In the above-described formulae, n and m each independently represent an integer of 1 to 100 and R's each independently represent a hydrogen atom or an alkyl group having 1 to 18 carbon atoms.

Here, in a case where the star type polymer compound is a star type polymer compound having a polyoxyalkylene chain (for example, —$(CH_2CH_2O)_nR$ and —$(C_3H_6O)_mR$) in the side chain, such a star type polymer compound is a polymer compound having the above-described polyoxyalkylene chain in the side chain.

Among these hydrophilic groups, —$CONR^1R^2$, —$(CH_2CH_2O)_nR$, or —$(C_3H_6O)_mR$ is preferable, —$CONR^1R^2$ or —$(CH_2CH_2O)_nR$ is more preferable, and —$(CH_2CH_2O)_nR$ is particularly preferable. Furthermore, in —$(CH_2CH_2O)_nR$, n represents preferably 1 to 10 and particularly preferably 1 to 4. Further, R represents more preferably a hydrogen atom or an alkyl group having 1 to 4 carbon atoms and particularly preferably a hydrogen atom or a methyl group. These hydrophilic groups may be used in combination of two or more kinds thereof.

Further, it is preferable that the star type polymer compound does not substantially include a carboxylic acid group, a phosphoric acid group, or a phosphonic acid group. Specifically, the amount of these acid groups is preferably less than 0.1 mmol/g, more preferably less than 0.05 mmol/g, and particularly preferably 0.03 mmol/g or less. In a case where the amount of these acid groups is less than 0.1 mmol/g, developability is further improved.

In order to control impressing property, a lipophilic group such as an alkyl group, an aryl group, an aralkyl group, or an alkenyl group can be introduced into the star type polymer compound. Specifically, a lipophilic group-containing monomer such as methacrylic acid alkyl ester may be copolymerized.

Specific examples of the star type polymer compound include compounds described in paragraphs 0153 to 0157 of JP2014-104631A.

The star type polymer compound can be synthesized, using a known method, by performing radical polymerization on the above-described monomers constituting a polymer chain in the presence of the above-described polyfunctional thiol compound.

The weight-average molecular weight of the star type polymer compound is preferably in a range of 5,000 to 500,000, more preferably in a range of 10,000 to 250,000, and particularly preferably in a range of 20,000 to 150,000. In a case where the weight-average molecular weight thereof is within the above-described range, the on-press developability and the printing durability are more improved.

The star type polymer compound may be used alone or in combination of two or more kinds thereof. Further, the star type polymer compound may be used in combination with a typical linear binder polymer.

The content of the star type polymer compound is preferably in a range of 5% by mass to 95% by mass, more preferably in a range of 10% by mass to 90% by mass, and particularly preferably in a range of 15% to 85% by mass with respect to the total mass of the image recording layer.

From the viewpoint of promoting the permeability of dampening water and improving the on-press developability, star type polymer compounds described in JP2012-148555A are particularly preferable.

(Other Components)

The image recording layer A can contain other components described below as necessary.

(1) Low-Molecular Weight Hydrophilic Compound

In order to improve the on-press developability without degrading the printing durability, the image recording layer may contain a low-molecular weight hydrophilic compound.

As the low-molecular weight hydrophilic compound, examples of a water-soluble organic compound include glycols such as ethylene glycol, diethylene glycol, triethylene glycol, propylene glycol, dipropylene glycol, and tripropylene glycol and ether or ester derivatives thereof; polyols such as glycerin, pentaerythritol, and tris(2-hydroxyethyl) isocyanurate; organic amines such as triethanolamine, diethanolamine, and monoethanolamine and salts thereof; organic sulfonic acids such as alkylsulfonic acid, toluenesulfonic acid, and benzenesulfonic acid and salts thereof; organic sulfamic acids such as alkyl sulfamic acid and salts thereof; organic sulfuric acids such as alkyl sulfuric acid and alkyl ether sulfuric acid and salts thereof; organic phosphonic acids such as phenyl phosphonic acid and salts thereof; organic carboxylic acids such as tartaric acid, oxalic acid, citric acid, malic acid, lactic acid, gluconic acid, and amino acids and salts thereof; and betaines.

Among these, it is preferable that the image recording layer contains at least one compound selected from the group consisting of polyols, organic sulfates, organic sulfonates, and betaines.

Specific examples of compounds of the organic sulfonates include compounds described in paragraphs 0026 to 0031 of JP2007-276454A and paragraphs 0020 to 0047 of JP2009-154525A. The salt may be potassium salt or lithium salt.

Examples of the organic sulfates include compounds described in paragraphs 0034 to 0038 of JP2007-276454A.

As betaines, compounds having 1 to 5 carbon atoms of hydrocarbon substituents to nitrogen atoms are preferable. Specific examples thereof include trimethyl ammonium acetate, dimethyl propyl ammonium acetate, 3-hydroxy-4-trimethyl ammonio butyrate, 4-(1-pyridinio)butyrate, 1-hydroxyethyl-1-imidazolioacetate, trimethyl ammonium methane sulfonate, dimethyl propyl ammonium methane sulfonate, 3-trimethylammonio-1-propane sulfonate, and 3-(1-pyridinio)-1-propane sulfonate.

Since the low-molecular weight hydrophilic compound has a small structure of a hydrophobic portion, hydrophobicity or coated-film hardness of an image area is not degraded by dampening water permeating into an image recording layer exposed area (image area) and ink receptivity or printing durability of the image recording layer can be maintained satisfactorily.

The addition amount of the low-molecular weight hydrophilic compound is preferably in a range of 0.5% by mass to 20% by mass, more preferably in a range of 1% by mass to 15% by mass, and still more preferably in a range of 2% by mass to 10% by mass with respect to the total mass of the image recording layer. In a case where the amount thereof is within the above-described range, excellent on-press developability and printing durability can be obtained.

The low-molecular weight hydrophilic compound may be used alone or in combination of two or more kinds thereof.

(2) Oil Sensitizing Agent

In order to improve the impressing property, an oil sensitizing agent such as a phosphonium compound, a nitrogen-containing low-molecular weight compound, and an ammonium group-containing polymer can be used for the image recording layer. Particularly, in a case where a protective layer contains an inorganic layered compound, the above-described compounds function as a surface coating agent of the inorganic layered compound and prevent a degradation in impressing property due to the inorganic layered compound during printing.

The phosphonium compound, the nitrogen-containing low-molecular weight compound, and the ammonium group-containing polymer are described in paragraphs 0184 to 0190 of JP2014-104631A in detail.

The content of the oil sensitizing agent is preferably in a range of 0.01% by mass to 30.0% by mass, more preferably in a range of 0.1% by mass to 15.0% by mass, and still more preferably in a range of 1% by mass to 10% by mass with respect to the total mass of the image recording layer.

(3) Other Components

As the other components, the image recording layer may further contain components such as a surfactant, a colorant, a printing-out agent, a polymerization inhibitor, a higher fatty acid derivative, a plasticizer, inorganic particles, an inorganic layered compound, a co-sensitizer, and a chain transfer agent. Specifically, the compounds and the addition amounts described in paragraphs 0114 to 0159 of JP2008-284817A, paragraphs 0023 to 0027 of JP2006-091479A, and paragraph 0060 of US2008/0311520A can be preferably used.

(Formation of Image Recording Layer A)

The image recording layer A is formed by, as described in paragraphs 0142 and 0143 of JP2008-195018A, dispersing or dissolving each of the above-described required components in a known solvent to prepare a coating solution, coating a support with the coating solution directly or through an undercoat layer using a known method such as a bar coater coating method, and drying the resultant. The coating amount (solid content) of the image recording layer on the support to be obtained after the coating and the drying varies depending on the applications thereof, but is preferably in a range of 0.3 $g/m^2$ to 3.0 $g/m^2$. In a case where the coating amount thereof is within the above-described range, excellent sensitivity and excellent film-coating characteristics of the image recording layer are obtained.

(Image Recording Layer B)

The image recording layer B contains an infrared absorbent, a polymerization initiator, a polymerizable compound, and a polymer compound having a particle shape. Hereinafter, the constituent components of the image recording layer B will be described.

Similarly, the infrared absorbent, the polymerization initiator, and the polymerizable compound described in the image recording layer A can be used as an infrared absorbent, a polymerization initiator, and a polymerizable compound in the image recording layer B.

(Polymer Compound Having Particle Shape)

It is preferable that the polymer compound having a particle shape is selected from the group consisting of thermoplastic polymer particles, thermally reactive polymer particles, polymer particles having a polymerizable group, a microcapsule encapsulating a hydrophobic compound, and a microgel (crosslinked polymer particles). Among these, polymer particles having a polymerizable group and a microgel are preferable. According to a particularly preferred embodiment, the polymer compound having a particle shape includes at least one ethylenically unsaturated polymerizable group. Because of the presence of the polymer compound having a particle shape, effects of improving the printing durability of an exposed area and the on-press developability of an unexposed area are obtained.

Further, it is preferable that the polymer compound having a particle shape is thermoplastic polymer particles.

Preferred examples of the thermoplastic polymer particles include thermoplastic polymer particles described in Research Disclosure No. 33303 on January, 1992, JP1997-123387A (JP-H09-123387A), JP1997-131850A (JP-H09-131850A), JP1997-171249A (JP-H09-171249A), JP1997-171250A (JP-H09-171250A), and EP931647B.

Specific examples of a polymer constituting the thermoplastic polymer particles include homopolymers or copolymers of monomers such as acrylate or methacrylate having structures of ethylene, styrene, vinyl chloride, methyl acrylate, ethyl acrylate, methyl methacrylate, ethyl methacrylate, vinylidene chloride, acrylonitrile, vinyl carbazole, and polyalkylene, and mixtures of these. Among these, polystyrene, a copolymer containing styrene and acrylonitrile, or polymethyl methacrylate is more preferable. The average particle diameter of the thermoplastic polymer particles is preferably in a range of 0.01 μm to 3.0 μm.

Examples of the thermally reactive polymer particles include polymer particles having a thermally reactive group. The thermally reactive polymer particles are crosslinked by a thermal reaction and have hydrophobic regions formed by a change in functional groups during the crosslinking.

As the thermally reactive group in polymer particles having a thermally reactive group, a functional group that performs any reaction may be used as long as a chemical bond is formed, but a polymerizable group is preferable. Preferred examples of the polymerizable group include an ethylenically unsaturated group that performs a radical polymerization reaction (such as an acryloyl group, a methacryloyl group, a vinyl group, or an allyl group); a cationic polymerizable group (such as a vinyl group, a vinyloxy group, an epoxy group, or an oxetanyl group); an isocyanate group that performs an addition reaction or a block body thereof, an epoxy group, a vinyloxy group, and a functional group having active hydrogen atom as a reaction partner of these (such as an amino group, a hydroxy group, or a carboxy group); a carboxy group that performs a condensation reaction and a hydroxy group or an amino group as a reaction partner thereof; and an acid anhydride that performs a ring-opening addition reaction and an amino group or a hydroxy group as a reaction partner thereof.

The microcapsule is a microcapsule in which at least a part of constituent components of the image recording layer is encapsulated as described in JP2001-277740A and JP2001-277742A. The constituent components of the image recording layer may be contained in a portion other than the microcapsule. A preferred embodiment of the image recording layer containing the microcapsule is an embodiment in which hydrophobic constituent components are encapsulated in a microcapsule and hydrophilic constituent components are contained in a portion other than the microcapsule.

The microgel (crosslinked polymer particles) may contain a part of the constituent components of the image recording layer in at least one of the surface or the inside of the microgel. From the viewpoint of image forming sensitivity and printing durability, a reactive microgel having a radical polymerizable group on the surface thereof is particularly preferable.

The constituent components of the image recording layer can be made into microcapsules or microgels using a known method.

From the viewpoint of the printing durability, stain resistance, and storage stability, it is preferable that the polymer compound having a particle shape is obtained by reacting a polyvalent isocyanate compound which is an adduct of a polyhydric phenol compound containing two or more hydroxy groups in a molecule and isophorone diisocyanate with a compound having an active hydrogen.

As the polyhydric phenol compound, a compound having a plurality of benzene rings having a phenolic hydroxy group is preferable.

As the above-described compound having an active hydrogen, a polyol compound or a polyamine compound is preferable, a polyol compound is more preferable, and at least one compound selected from the group consisting of propylene glycol, glycerin, and trimethylolpropane is still more preferable.

As the resin particles obtained by reacting the compound containing an active hydrogen with the polyvalent isocyanate compound which is an adduct of a polyhydric phenol compound containing two or more hydroxy groups in a molecule and isophorone diisocyanate, polymer particles described in paragraphs 0032 to 0095 of JP2012-206495A are preferably exemplified.

Furthermore, from the viewpoint of printing durability and solvent resistance, it is preferable that the polymer compound having a particle shape has a hydrophobic main chain and includes both of a constitutional unit (i) which has a pendant-cyano group directly bonded to the hydrophobic main chain and a constitutional unit (ii) which has a pendant group including a hydrophilic polyalkyleneoxide segment.

Preferred examples of the hydrophobic main chain include an acrylic resin chain.

Preferred examples of the pendant-cyano group include —[CH$_2$CH(C≡N)—] and —[CH$_2$C(CH$_3$)(C≡N)—].

Further, the constitutional unit having a pendant-cyano group can be easily derived from an ethylene-based unsaturated monomer such as acrylonitrile or methacrylonitrile or a combination of these.

Further, as alkylene oxide in the hydrophilic polyalkyleneoxide segment, ethylene oxide or propylene oxide is preferable and ethylene oxide is more preferable.

The repetition number of alkylene oxide structures in the hydrophilic polyalkyleneoxide segment is preferably in a range of 10 to 100, more preferably in a range of 25 to 75, and still more preferably in a range of 40 to 50.

As the resin particles which have the hydrophobic main chain and include both of the constitutional unit (i) which has the pendant-cyano group directly bonded to the hydrophobic main chain and the constitutional unit (ii) which has the pendant group including the hydrophilic polyalkyleneoxide segment, those described in paragraphs 0039 to 0068 of JP2008-503365A are preferably exemplified.

The average particle diameter of the polymer compound having a particle shape is preferably in a range of 0.01 μm to 3.0 μm, more preferably in a range of 0.03 μm to 2.0 μm, and still more preferably in a range of 0.10 μm to 1.0 μm. In a case where the average particle diameter thereof is within the above-described range, excellent resolution and temporal stability are obtained.

The content of the polymer compound having a particle shape is preferably in a range of 5% by mass to 90% by mass with respect to the total mass of the image recording layer.
(Other Components)

The image recording layer B can contain the other components described in the above-described image recording layer A as necessary.
(Formation of Image Recording Layer B)

The image recording layer B can be formed in the same manner as in the image recording layer A described above.

(Image Recording Layer C)

The image recording layer C contains an infrared absorbent and thermoplastic polymer particles. Hereinafter, the constituent components of the image recording layer C will be described.
(Infrared Absorbent)

The infrared absorbent included in the image recording layer C is a dye or a pigment having maximum absorption at a wavelength in a range of 760 nm to 1,200 nm. A dye is more preferable.

As the dye, commercially available dyes and known dyes described in the literatures (for example, "Dye Handbook" edited by The Society of Synthetic Organic Chemistry, Japan, published in 1970, "Near-Infrared Absorbing Coloring agent" of "Chemical Industry", p. 45 to 51, published in May, 1986, and "Development and Market Trend of Functional Dyes in 1990's" Section 2.3 of Chapter 2 (CMC Publishing Co., Ltd., published in 1990)) and the patents can be used. Specific preferred examples thereof include infrared absorbing dyes such as an azo dye, a metal complex salt azo dye, a pyrazolone azo dye, an anthraquinone dye, a phthalocyanine dye, a carbonium dye, a quinone imine dye, a polymethine dye, and a cyanine dye.

Among these, infrared absorbing dyes having a water-soluble group are particularly preferable from the viewpoint of addition to the image recording layer C.

Specific examples of the infrared absorbing dyes are described below, but the infrared absorbent is not limited thereto.

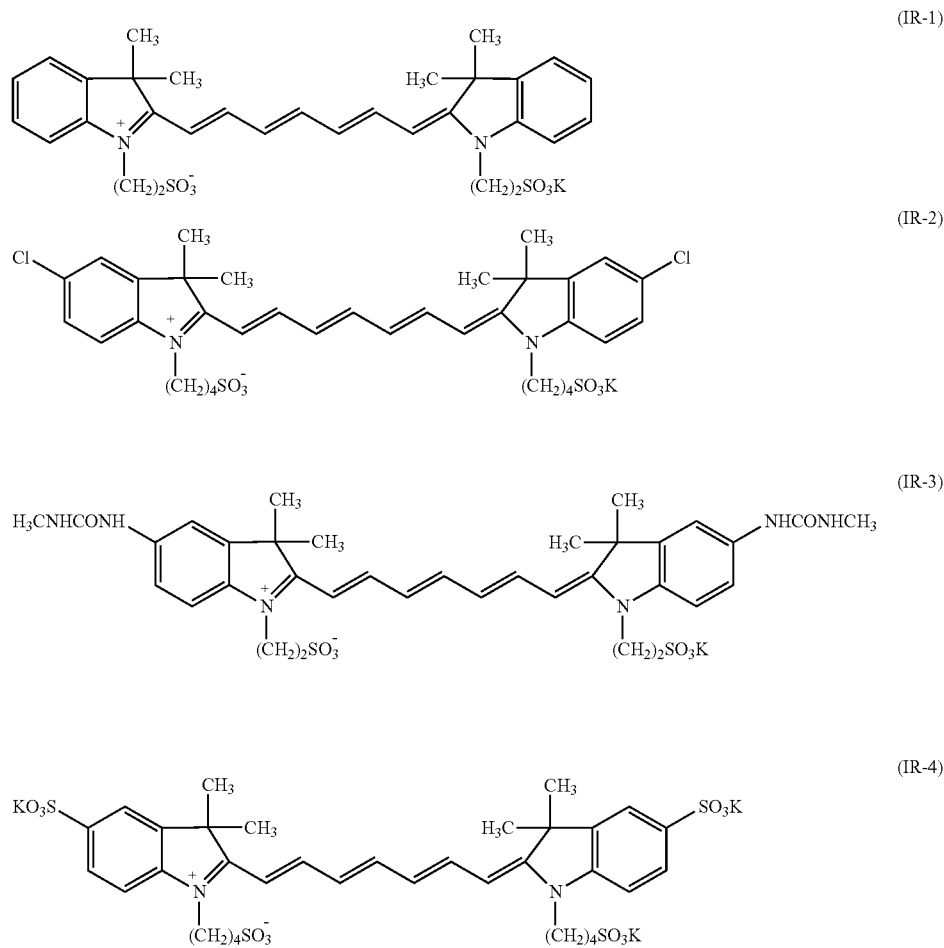

-continued

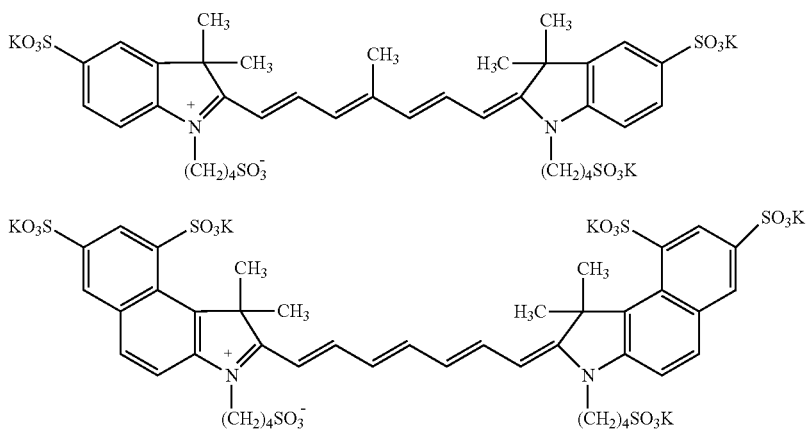

(IR-5)

(IR-6)

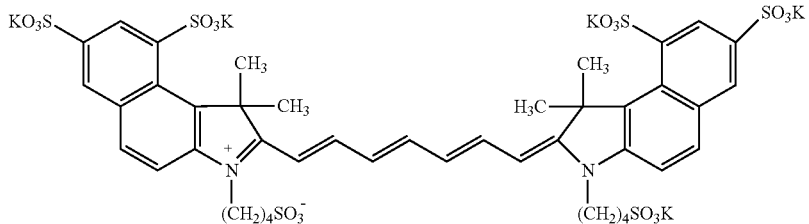

(IR-7)

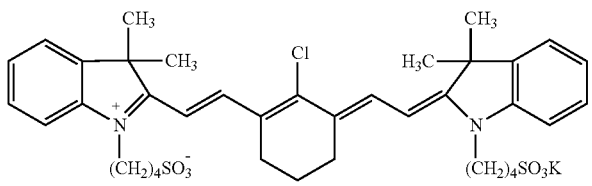

(IR-8)

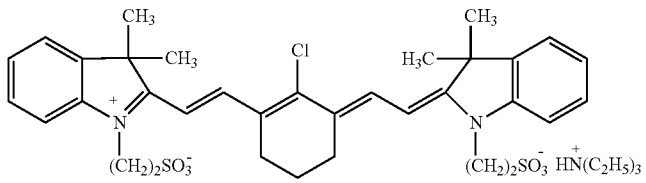

(IR-9)

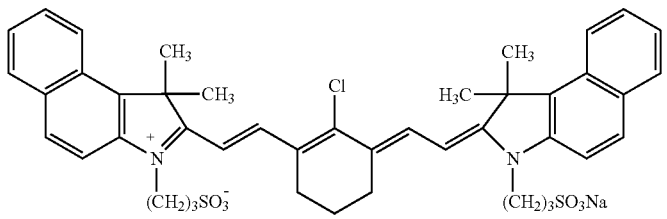

(IR-10)

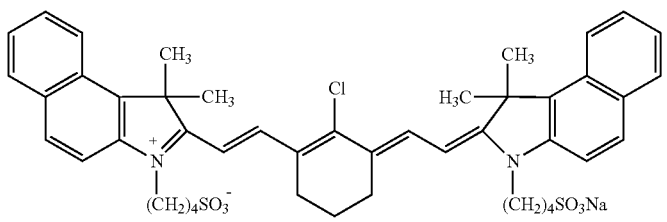

(IR-11)

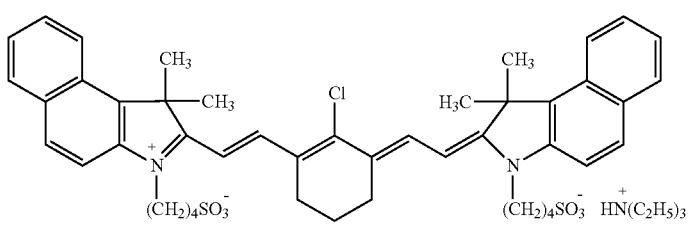

As the pigments, commercially available pigments and pigments described in Color Index (C. I.) Handbook, "Latest Pigment Handbook" (edited by Japan Pigment Technology Association, published in 1977), "Latest Pigment Application Technology" (CMC Publishing Co., Ltd., published in 1986), and "Printing Ink Technology" (CMC Publishing Co., Ltd., published in 1984) can be used.

The particle diameter of the pigment is preferably in a range of 0.01 μm to 1 μm and more preferably in a range of 0.01 μm to 0.5 μm. A known dispersion technique used in production of inks or toners can be used as a method of dispersing the pigment. The details are described in "Latest Pigment Application Technology" (CMC Publishing Co., Ltd., published in 1986).

The content of the infrared absorbent is preferably in a range of 0.1% by mass to 30% by mass, more preferably in a range of 0.25% by mass to 25% by mass, and particularly preferably in a range of 0.5% by mass to 20% by mass with respect to the total mass of the image recording layer. In a case where the content thereof is within the above-described range, excellent sensitivity is obtained without damaging the film hardness of the image recording layer.

(Thermoplastic Polymer Particles)

The glass transition temperature (Tg) of the thermoplastic polymer particles is preferably in a range of 60° C. to 250° C. Tg of the thermoplastic polymer particles is more preferably in a range of 70° C. to 140° C. and still more preferably in a range of 80° C. to 120° C.

Suitable examples of the thermoplastic polymer particles having a Tg of 60° C. or higher include thermoplastic polymer particles described in Research Disclosure No. 33303 on January, 1992, JP1997-123387A (JP-H09-123387A), JP1997-131850A (JP-H09-131850A), JP1997-171249A (JP-H09-171249A), JP1997-171250A (JP-H09-171250A), and EP931647B.

Specific examples thereof include homopolymers or copolymers formed of monomers such as ethylene, styrene, vinyl chloride, methyl acrylate, ethyl acrylate, methyl methacrylate, ethyl methacrylate, vinylidene chloride, acrylonitrile, and vinyl carbazole, and mixtures of these. Among these, polystyrene, a copolymer containing styrene and acrylonitrile, and polymethyl methacrylate are preferable.

The average particle diameter of the thermoplastic polymer particles is preferably in a range of 0.005 µm to 2.0 µm from the viewpoint of resolution and temporal stability. This value is used as the average particle diameter in a case where two or more kinds of thermoplastic polymer particles are mixed with each other. The average particle diameter thereof is more preferably in a range of 0.01 µm to 1.5 µm and particularly preferably in a range of 0.05 µm to 1.0 µm. The polydispersity in a case where two or more kinds of thermoplastic polymer particles are mixed with each other is preferably 0.2 or more. The average particle diameter and the polydispersity are calculated according to a laser light scattering method.

The thermoplastic polymer particles may be used in combination of two or more kinds thereof. Specifically, at least two kinds of thermoplastic polymer particles with different particle sizes or at least two kinds of thermoplastic polymer particles with different Tg's may be exemplified. In a case where two or more kinds of thermoplastic polymer particles are used in combination, coated-film curing properties of an image area are further improved and printing durability of the planographic printing plate is obtained is further improved.

For example, in a case where thermoplastic polymer particles having the same particle size are used, voids are present between the thermoplastic polymer particles to some extent and thus the curing properties of the coated-film are not desirable in some cases even in a case where the thermoplastic polymer particles are melted and solidified by image exposure. Meanwhile, in a case where thermoplastic polymer particles having different particle sizes are used, the void volume between the thermoplastic polymer particles can be decreased and thus the coated-film curing properties of the image area after image exposure can be improved.

Further, in a case where thermoplastic polymer particles having the same Tg are used, the thermoplastic polymer particles are not sufficiently melted and solidified in some cases where an increase in temperature of the image recording layer resulting from image exposure is insufficient, and thus the curing properties of the coated-film are not desirable. Meanwhile, in a case where thermoplastic polymer particles having different Tg's are used, the coated-film curing properties of the image area can be improved even in a case where an increase in temperature of the image recording layer resulting from image exposure is insufficient.

In a case where two or more kinds of thermoplastic polymer particles having different Tg's are used in combination, the Tg of at least one thermoplastic polymer particle is preferably 60° C. or higher. In this case, a difference in Tg's is preferably 10° C. or higher and more preferably 20° C. or higher. Further, it is preferable that the content of the thermoplastic polymer particles having a Tg of 60° C. or higher is 70% by mass or more with respect to the total amount of all thermoplastic polymer particles.

The thermoplastic polymer particles may include a crosslinking group. In a case where thermoplastic polymer particles having a crosslinking group are used, the crosslinking group is thermally reacted due to heat generated by an image-exposed portion so as to be crosslinked between the polymers, and thus coated-film hardness of the image area is improved and printing durability is more excellent. As the crosslinking group, a functional group that undergoes any reaction may be used as long as a chemical bond is formed, and examples thereof include an ethylenically unsaturated group that undergoes a polymerization reaction (such as an acryloyl group, a methacryloyl group, a vinyl group, or an allyl group); an isocyanate group that undergoes an addition reaction or a block body thereof, and a group having active hydrogen atom as a reaction partner of these (such as an amino group, a hydroxy group, or a carboxyl group); an epoxy group that undergoes an addition reaction and an amino group, a carboxyl group or a hydroxy group as a reaction partner thereof; a carboxyl group that undergoes a condensation reaction and a hydroxy group or an amino group; and an acid anhydride that undergoes a ring-opening addition reaction and an amino group or a hydroxy group.

Specific examples of the thermoplastic polymer particles having a crosslinking group include thermoplastic polymer particles having a crosslinking group such as an acryloyl group, a methacryloyl group, a vinyl group, an allyl group, an epoxy group, an amino group, a hydroxy group, a carboxyl group, an isocyanate group, an acid anhydride, and a protecting group of these. These crosslinking groups may be introduced into polymers in a case of polymerization of polymer particles or may be introduced using a polymer reaction after polymerization of the polymer particles.

In a case where a crosslinking group is introduced to a polymer in a case of polymerization of polymer particles, it is preferable that a monomer having a crosslinking group may be subjected to an emulsion polymerization or a suspension polymerization. Specific examples of the monomer having a crosslinking group include allyl methacrylate, allyl acrylate, vinyl methacrylate, vinyl acrylate, glycidyl methacrylate, glycidyl acrylate, 2-isocyanate ethyl methacrylate or a block isocyanate resulting from alcohol thereof, 2-isocyanate ethyl acrylate or a block isocyanate resulting from alcohol thereof, 2-aminoethyl methacrylate, 2-aminoethyl acrylate, 2-hydroxyethyl methacrylate, 2-hydroxyethyl acrylate, acrylic acid, methacrylic acid, maleic acid anhydride, difunctional acrylate, and difunctional methacrylate.

Examples of the polymer reaction used in a case where a crosslinking group is introduced after polymerization of polymer particles include polymer reactions described in WO1996/034316A.

Polymer particles may react with each other through a crosslinking group or the thermoplastic polymer particles may react with a polymer compound or a low-molecular weight compound added to the image recording layer.

The content of the thermoplastic polymer particles is preferably in a range of 50% by mass to 95% by mass, more preferably in a range of 60% by mass to 90% by mass, and particularly preferably in a range of 70% by mass to 85% by mass with respect to the total mass of the image recording layer.

(Other Components)

The image recording layer C may further contain other components as necessary.

Preferred examples of other components include a surfactant having a polyoxyalkylene group or a hydroxy group.

As the surfactant having a polyoxyalkylene group (hereinafter, also referred to as a "POA group") or a hydroxy group, a surfactant having a POA group or a hydroxy group may be appropriately used, but an anionic surfactant or a non-ionic surfactant is preferable. Among anionic surfactants or non-ionic surfactants having a POA group or a hydroxy group, anionic surfactants or non-ionic surfactants having a POA group are preferable.

As the POA group, a polyoxyethylene group, a polyoxypropylene group, or a polyoxybutylene group is preferable and a polyoxyethylene group is particularly preferable.

The average degree of polymerization of the oxyalkylene group is preferably 2 to 50 and more preferably 2 to 20.

The number of hydroxy groups is preferably 1 to 10 and more preferably 2 to 8. Here, the number of terminal hydroxy groups in the oxyalkylene group is not included in the number of hydroxy groups.

The anionic surfactant having a POA group is not particularly limited, and examples thereof include polyoxyalkylene alkyl ether carboxylates, polyoxyalkylene alkyl sulfosuccinates, polyoxyalkylene alkyl ether sulfuric acid ester salts, alkyl phenoxy polyoxyalkylene propyl sulfonates, polyoxyalkylene alkyl sulfophenyl ethers, polyoxyalkylene aryl ether sulfuric acid ester salts, polyoxyalkylene polycyclic phenylether sulfuric acid ester salts, polyoxyalkylene styryl phenyl ether sulfuric acid ester salts, polyoxyalkylene alkyl ether phosphoric acid ester salts, polyoxyalkylene alkyl phenyl ether phosphoric acid ester salts, and polyoxyalkylene perfluoroalkyl ether phosphoric acid ester salts.

The anionic surfactant having a hydroxy group is not particularly limited, and examples thereof include hydroxy carboxylates, hydroxy alkyl ether carboxylates, hydroxy alkane sulfonates, fatty acid monoglyceride sulfuric acid ester salts, and fatty acid monoglyceride phosphate salts.

The content of the surfactant having a POA group or a hydroxy group is preferably in a range of 0.05% by mass to 15% by mass and more preferably in a range of 0.1% by mass to 10% by mass with respect to the total mass of the image recording layer.

Hereinafter, specific examples of the surfactant having a POA group or a hydroxy group will be described, but the surfactant is not limited thereto. A surfactant A-12 described below is a trade name of Zonyl FSP and available from Dupont. Further, a surfactant N-11 described below is a trade name of Zonyl FSO 100 and available from Dupont. m and n in A-12 each independently represent an integer of 1 or more.

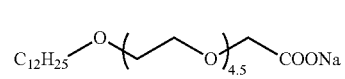
A-1

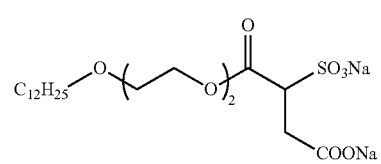
A-2

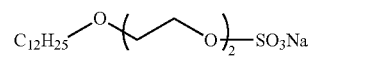
A-3

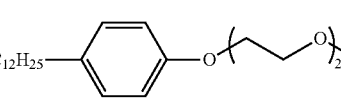
A-4

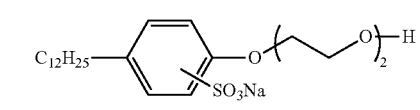
A-5

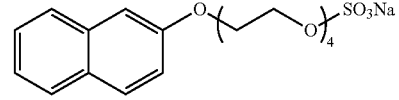
A-6

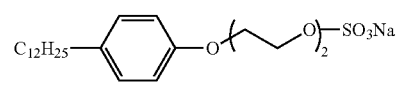
A-7

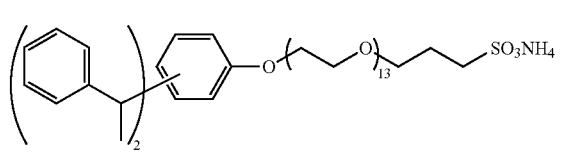
A-8

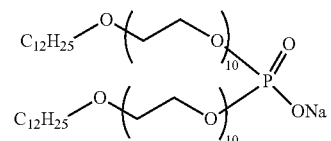
A-9

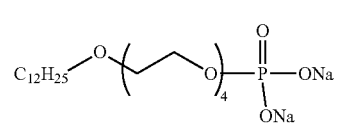
A-10

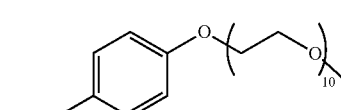
A-11

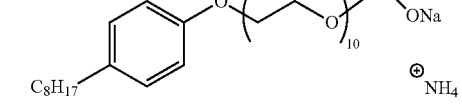
A-12

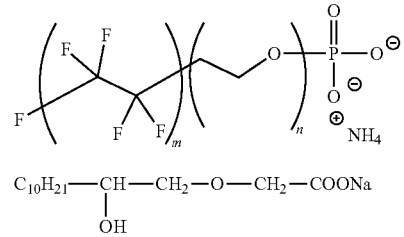
A-13

-continued

A-14 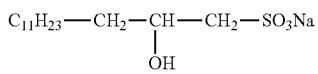

A-15 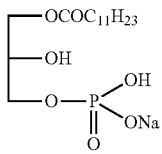

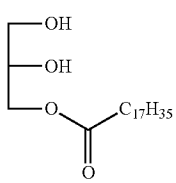

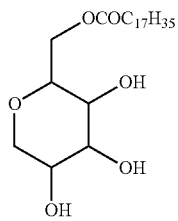

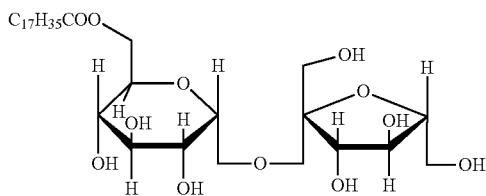

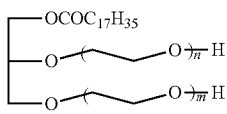

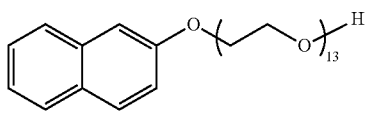

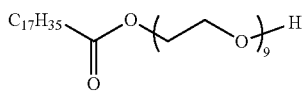

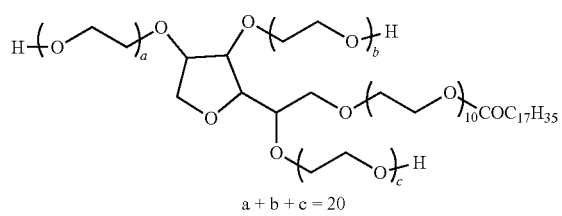

-continued

N-9 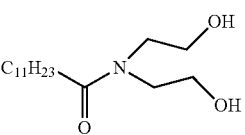

N-10 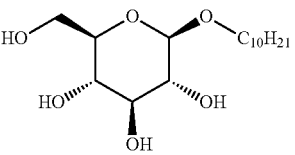

N-11 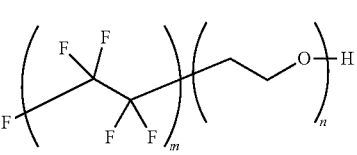

For the purpose of ensuring coating uniformity of the image recording layer, the image recording layer may contain an anionic surfactant which does not have a polyoxyalkylene group and a hydroxy group.

The above-described anionic surfactant is not particularly limited as long as the above-described purpose is achieved. Among the examples of the anionic surfactants, alkyl benzene sulfonic acid or a salt thereof, alkyl naphthalene sulfonic acid or a salt thereof, (di)alkyl diphenyl ether (di)sulfonic acid or a salt thereof, or alkyl sulfuric acid ester salt is preferable.

The addition amount of the anionic surfactant which does not have a polyoxyalkylene group and a hydroxy group is preferably in a range of 1% by mass to 50% by mass and more preferably in a range of 1% by mass to 30% by mass with respect to the total mass of the surfactant which has a polyoxyalkylene group or a hydroxy group.

Hereinafter, specific examples of the anionic surfactant which does not have a polyoxyalkylene group and a hydroxy group will be described, but the present invention is not limited thereto.

AA-1 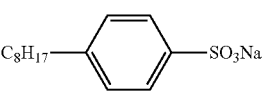

AA-2 

AA-3 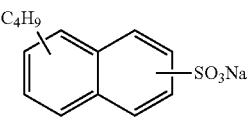

AA-4 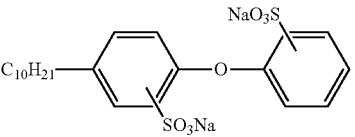

-continued

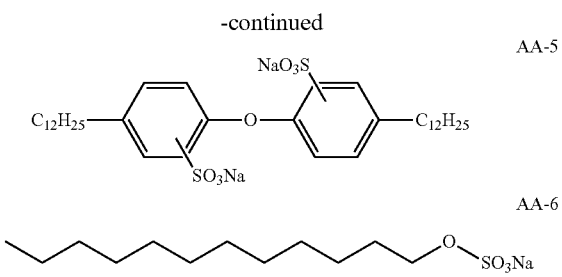

AA-5

AA-6

Further, for the purpose of ensuring coating uniformity of the image recording layer, a non-ionic surfactant which does not have a polyoxyalkylene group and a hydroxy group, or a fluorine-based surfactant may be used. For example, fluorine-based surfactants described in JP1987-170950A (JP-S62-170950A) are preferably used.

The image recording layer may contain a hydrophilic resin. Preferred examples of the hydrophilic resin include resins having a hydrophilic group such as a hydroxy group, a hydroxyethyl group, a hydroxypropyl group, an amino group, an aminoethyl group, an aminopropyl group, a carboxy group, a carboxylate group, a sulfo group, a sulfonate group, and a phosphoric acid group.

Specific examples of the hydrophilic resin include gum Arabic, casein, gelatin, a starch derivative, carboxy methyl cellulose and sodium salt thereof, cellulose acetate, sodium alginate, vinyl acetate-maleic acid copolymers, styrene-maleic acid copolymers, polyacrylic acids and salts of these, polymethacrylic acids and salts of these, a homopolymer and a copolymer of hydroxy ethyl methacrylate, a homopolymer and a copolymer of hydroxyethyl acrylate, a homopolymer and a copolymer of hydroxypropyl methacrylate, a homopolymer and a copolymer of hydroxypropyl acrylate, a homopolymer and a copolymer of hydroxybutyl methacrylate, a homopolymer and a copolymer of hydroxybutyl acrylate, polyethylene glycols, hydroxy propylene polymers, polyvinyl alcohols, hydrolyzed polyvinyl acetate having a degree of hydrolysis of preferably at least 60% and more preferably at least 80%, polyvinyl formal, polyvinyl butyral, polyvinyl pyrrolidone, a homopolymer and a copolymer of acrylamide, a homopolymer and a copolymer of methacrylamide, and a homopolymer and a copolymer of N-methylol acrylamide.

The weight-average molecular weight of the hydrophilic resin is preferably 2,000 or more from the viewpoint of obtaining sufficient coated-film hardness or printing durability.

The content of the hydrophilic resin is preferably in a range of 0.5% by mass to 50% by mass and more preferably in a range of 1% by mass to 30% by mass with respect to the total mass of the image recording layer.

The image recording layer may contain inorganic particles other than those for forming unevenness described above. Preferred examples of the inorganic particles include silica, alumina, magnesium oxide, titanium oxide, magnesium carbonate, calcium alginate, and a mixture of these. The inorganic particles can be used for the purpose of improving coated-film hardness.

The average particle diameter of the inorganic particles is preferably in a range of 5 nm to 10 μm and more preferably in a range of 10 nm to 1 μm. In a case where the average particle diameter thereof is within the above-described range, the thermoplastic polymer particles are stably dispersed, the film hardness of the image recording layer is sufficiently held, and a non-image area with excellent hydrophilicity, in which printing stain is unlikely to occur, can be formed.

The inorganic particles are available as commercially available products such as a colloidal silica dispersion.

The content of the inorganic particles is preferably in a range of 1.0% by mass to 70% by mass and more preferably in a range of 5.0% by mass to 50% by mass with respect to the total mass of the image recording layer.

The image recording layer can contain a plasticizer in order to impart flexibility and the like to a coated film. Examples of the plasticizer include polyethylene glycol, tributyl citrate, diethyl phthalate, dibutyl phthalate, dihexyl phthalate, dioctyl phthalate, tricresyl phosphate, tributyl phosphate, trioctyl phosphate, and tetrahydrofurfuryl oleate.

The content of the plasticizer is preferably in a range of 0.1% by mass to 50% by mass and more preferably in a range of 1% by mass to 30% by mass with respect to the total mass of the image recording layer.

In a case where polymer particles having a thermally reactive functional group (crosslinking group) are used for the image recording layer, a compound that initiates or promotes a reaction of the thermally reactive functional group (crosslinking group) can be added to the image recording layer as necessary. Examples of the compound which initiates or promotes a reaction of the thermally reactive functional group include a compound which generates a radical or a cation by heating. Examples thereof include a lophine dimer, a trihalomethyl compound, a peroxide, an azo compound, onium salts including diazonium salts and diphenyl iodonium salts, acyl phosphine, and imide sulfonate. The addition amount of such a compound is preferably in a range of 1% by mass to 20% by mass and more preferably in a range of 1% by mass to 10% by mass with respect to the total mass of the image recording layer. In a case where the amount thereof is within the above-described range, on-press developability is not degraded and excellent effects of initiating or promoting a reaction are obtained.

(Formation of Image Recording Layer C)

The image recording layer C is formed by dissolving or dispersing each of the above-described required components in a suitable solvent to prepare a coating solution, coating a support with the coating solution directly or through an undercoat layer. As the solvent, water or a mixed solvent of water and an organic solvent is used, and a mixed solvent of water and an organic solvent is preferable from the viewpoint of the excellent surface state after coating. Since the amount of the organic solvent varies depending on the type of organic solvent, the amount thereof cannot be specified unconditionally, but the amount of the organic solvent in the mixed solvent is preferably in a range of 5% by volume to 50% by volume. Here, it is necessary that the amount of the organic solvent to be used is set to such that the thermoplastic polymer particles are not aggregated. The concentration of solid contents of the image recording layer coating solution is preferably in a range of 1% by mass to 50% by mass.

As the organic solvent used as a solvent of the coating solution, a water-soluble organic solvent is preferable. Specific examples thereof include alcohol solvents such as methanol, ethanol, propanol, isopropanol, and 1-methoxy-2-propanol, ketone solvents such as acetone and methyl ethyl ketone, glycol ether solvents such as ethylene glycol dimethyl ether, γ-butyrolactone, N,N-dimethylformamide, N,N-dimethylacetamide, tetrahydrofuran, and dimethylsulfoxide. Particularly, an organic solvent having a boiling point of 120° C. or lower and a solubility (amount of a solvent to be dissolved in 100 g of water) of 10 g or more in water is preferable, and an organic solvent having a solubility of 20 g or more in water is more preferable.

As a coating method of the image recording layer coating solution, various methods can be used. Examples thereof include a bar coater coating, a rotary coating, a spray coating, a curtain coating, a dip coating, an air knife coating, a blade coating, and a roll coating. The coating amount (solid content) of the image recording layer on the support obtained after the coating and the drying varies depending on the applications thereof, but is preferably in a range of 0.5 g/m$^2$ to 5.0 g/m$^2$ and more preferably in a range of 0.5 g/m$^2$ to 2.0 g/m$^2$.

Hereinafter, other constituent elements of the planographic printing plate precursor will be described.

<Undercoat Layer>

The planographic printing plate precursor according to the present invention may be provided with an undercoat layer between the image recording layer and the support as necessary. Since intimate attachment of the support to the image recording layer is stronger in an exposed area and the support is easily peeled off from the image recording layer in an unexposed area, the undercoat layer contributes to improvement of on-press developability without degrading printing durability. Further, in a case of infrared laser exposure, the undercoat layer functions as a heat insulating layer so that a degradation in sensitivity due to heat, generated by the exposure, being diffused in the support is prevented.

Examples of the compound used for the undercoat layer include a silane coupling agent having an ethylenic double bond reactive group, which is an addition-polymerizable group, described in JP1998-282679A (JP-H10-282679A); and a phosphorus compound having an ethylenic double bond reactive group described in JP1990-304441A (JP-H02-304441A). Preferred examples thereof include polymer compounds having an adsorptive group, which can be adsorbed to the surface of the support, a hydrophilic group, and a crosslinking group, as described in JP2005-125749A and JP2006-188038A. As such a polymer compound, a copolymer of a monomer having an adsorptive group, a monomer having a hydrophilic group, and a monomer having a crosslinking group is preferable. Specific examples thereof include a copolymer of a monomer having an adsorptive group such as a phenolic hydroxy group, a carboxy group, —PO$_3$H$_2$, —OPO$_3$H$_2$, —CONHSO$_2$—, —SO$_2$NHSO$_2$—, or —COCH$_2$COCH$_3$, a monomer having a hydrophilic group such as a sulfo group, and a monomer having a polymerizable crosslinking group such as a methacryl group or an allyl group. The polymer compound may have a crosslinking group introduced by forming salts between a polar substituent of the polymer compound and a compound that includes a substituent having the opposite charge of the polar substituent and an ethylenically unsaturated bond. Further, monomers other than the above-described monomers, preferably hydrophilic monomers may be further copolymerized.

The content of the ethylenically unsaturated bond in the polymer compound for an undercoat layer is preferably in a range of 0.1 to 10.0 mmol and more preferably in a range of 2.0 to 5.5 mmol per 1 g of the polymer compound.

The weight-average molecular weight of the polymer compound for an undercoat layer is preferably 5,000 or more and more preferably in a range of 10,000 to 300,000.

For the purpose of preventing stain over time, the undercoat layer can contain a chelating agent, a secondary or tertiary amine, a polymerization inhibitor, a compound that includes an amino group or a functional group having polymerization inhibiting ability and a group interacting with the surface of an aluminum support, and the like (for example, 1,4-diazabicyclo[2.2.2]octane (DABCO), 2,3,5,6-tetrahydroxy-β-quinone, chloranil, sulfophthalic acid, hydroxyethyl ethylene diamine triacetic acid, dihydroxyethyl ethylene diamine diacetic acid, or hydroxyethyl imino diacetic acid), in addition to the compounds for an undercoat layer described above.

The undercoat layer is applied according to a known method. The coating amount of the undercoat layer in terms of a coating amount after drying is preferably in a range of 0.1 mg/m$^2$ to 100 mg/m$^2$ and more preferably in a range of 1 mg/m$^2$ to 30 mg/m$^2$.

<Protective Layer>

The planographic printing plate precursor according to the present invention may include a protective layer on the image recording layer. The protective layer has a function of preventing generation of damage to the image recording layer and a function of preventing ablation in a case of high illuminance laser exposure, in addition to a function of suppressing a reaction of inhibiting image formation through oxygen blocking.

As the protective layer having such functions, a protective layer described in paragraphs 0202 to 0204 of JP2014-104631A can be used.

It is preferable that the protective layer includes a water-soluble polymer. Examples of the water-soluble polymer used for the protective layer include polyvinyl alcohols, modified polyvinyl alcohols, polyvinylpyrrolidone, water-soluble cellulose derivatives, polyethylene glycol, and poly(meth)acrylonitriles.

As the modified polyvinyl alcohols, acid-modified polyvinyl alcohols having carboxy groups or sulfo groups are preferably used. Specific examples thereof include modified polyvinyl alcohols described in JP2005-250216A and JP2006-259137A.

Among the water-soluble polymers, polyvinyl alcohol is preferable, and polyvinyl alcohol having a saponification degree of 50% or more is more preferable. The saponification degree of the polyvinyl alcohol is preferably 60% or more, more preferably 70% or more, and still more preferably 85% or more. The upper limit of the saponification degree is not particularly limited, and may be 100% or less.

The saponification degree can be measured according to the method described in JIS K 6726:1994.

The protective layer is applied according to a known method. The protective layer may not be provided, and in a case where the protective layer is provided on the image recording layer, the film thickness of the protective layer is preferably less than 0.2 μm.

The planographic printing plate precursor can be produced by applying a coating solution of each configuration layer according to a typical method, performing drying, and forming each configuration layer. The coating solution can be applied according to a die coating method, a dip coating method, an air knife coating method, a curtain coating method, a roller coating method, a wire bar coating method, a gravure coating method, a slide coating method, or the like.

Hereinafter, a printing key plate precursor, which is another embodiment of the printing plate precursor according to the embodiment of the present invention, will be described.

The printing key plate precursor is a precursor for producing a printing key plate by performing the same plate-making step (here, image exposure is not performed) as that for the planographic printing plate precursor and basically does not have photosensitivity. As well-known in the printing industry, the printing key plate is used by being attached to a plate cylinder in a case where it is necessary to print a part of the paper surface with two colors or one color in color newspaper printing (multicolor printing).

[Printing Key Plate Precursor]

The printing key plate precursor according to the present invention includes a non-photosensitive resin layer on the printing surface side of the support. The printing key plate precursor may include an undercoat layer between the support and the non-photosensitive resin layer and a hydrophilic layer (also referred to as a protective layer) on the non-photosensitive resin layer as necessary. The non-photosensitive resin layer or hydrophilic layer in the printing key plate precursor corresponds to the layer including particles in the printing plate precursor.

It is preferable that the non-photosensitive resin layer in the printing key plate precursor includes a water-soluble binder polymer or a water-insoluble and alkali-soluble binder polymer (hereinafter, also referred to as a "binder polymer"). Further, the non-photosensitive resin layer may contain a colorant having maximum absorption at a wavelength of 350 to 800 nm and a low-molecular-weight acidic compound.

The binder contained in the non-photosensitive resin layer of the printing key plate precursor is described in, for example, paragraphs 0069 to 0074 of JP2012-218778A.

The non-photosensitive resin layer of the printing key plate precursor and the method of forming the same are described in, for example, paragraphs 0021 to 0054 of JP2012-218778A.

The hydrophilic layer of the printing key plate precursor contains a binder. The hydrophilic layer can be formed by coating the non-photosensitive layer with a hydrophilic layer coating solution prepared by mixing a binder and various additives such as a colorant, a water-soluble plasticizer, and a surfactant to be added depending on the purpose thereof and stirring the solution according to a method described in, for example, U.S. Pat. No. 3,458,311A or JP1980-049729A (JP-S55-049729A). The coating amount of the hydrophilic layer is preferably in a range of 0.2 to 5.0 $g/m^2$ and more preferably in a range of 0.3 to 3.0 $g/m^2$.

The binder contained in the hydrophilic layer of the printing key plate precursor is described in, for example, paragraphs 0069 to 0074 of JP2012-218778A.

[Printing Plate Precursor Laminate]

A printing plate precursor laminate according to an embodiment of the present invention is a laminate obtained by laminating the printing plate precursors according to the embodiment of the present invention and is formed by laminating a plurality of the printing plate precursors according to the embodiment of the present invention. Further, it is preferable that the printing plate precursor laminate according to the embodiment of the present invention is a laminate in which the outermost layer on the printing surface side is directly brought into contact and laminated with the outermost layer on the side opposite to the printing surface side.

Further, the printing plate precursor laminate according to the embodiment of the present invention is preferably a laminate obtained by laminating a plurality of printing plate precursors according to the embodiment of the present invention without using interleaving paper.

The number of laminated sheets is not particularly limited, but is preferably in a range of 2 sheets to 500 sheets.

Due to the characteristics of the printing plate precursor according to the embodiment of the present invention, the printing plate precursor laminate according to the embodiment of the present invention is also excellent in preventing property of multiple-plate feeding and scratch-preventing property, and also has characteristic that the dislocation in stacking is unlikely to occur.

[Method for Making Printing Plate and Printing Method]

The method for making a printing plate according to the embodiment of the present invention is not particularly limited as long as the method is a method of making the printing plate precursor according to the embodiment of the present invention, and it is preferable that the method is a method of making a planographic printing plate using the printing plate precursor according to the embodiment of the present invention and includes a step of image-wise exposing the printing plate precursor according to the embodiment of the present invention to light (also referred to as an "image exposure step"), and a step of supplying at least one of printing ink or dampening water to remove an unexposed area of the image recording layer on a printing machine, thereby making a printing plate (also referred to as a "development treatment step"). In the printing plate precursor according to the embodiment of the present invention, the development treatment step is performed without performing the image exposure step in a case of the printing key plate precursor. In the development treatment step, the non-photosensitive resin layer is removed.

The above-described plate-making method is also referred to as an "on-press development method" below.

The printing method according to the embodiment of the present invention is a method for making and printing a printing plate using the printing plate precursor according to the embodiment of the present invention, and it is preferable that the printing method includes a step of image-wise exposing the printing plate precursor according to the embodiment of the present invention to light (also referred to as an "image exposure step"), a step of supplying at least one of printing ink or dampening water to remove an unexposed area of the image recording layer on a printing machine, thereby making a printing plate (also referred to as a "development treatment step"), and a step of printing with the obtained printing plate (also referred to as a "printing step"). In the printing plate precursor according to the embodiment of the present invention, the development treatment step is performed without performing the image exposure step in a case of the printing key plate precursor.

<Image Exposure Step>

The image exposure of the printing plate precursor can be performed in conformity with an image exposure operation for a typical planographic printing plate precursor.

The image exposure is performed by laser exposure through a transparent original picture having a line image, a halftone image, and the like or by laser beam scanning using digital data. The wavelength of a light source is preferably in a range of 700 nm to 1,400 nm. As the light source having a wavelength of 700 nm to 1,400 nm, a solid-state laser or a semiconductor laser which radiates infrared rays is suitable. The output of the infrared laser is preferably 100 mW or more, the exposure time per one pixel is preferably 20 μsec or less, and the irradiation energy quantity is preferably in a range of 10 $mJ/cm^2$ to 300 $mJ/cm^2$. For the purpose of reducing the exposure time, it is preferable to use a multi-beam laser device. The exposure mechanism may be any of an internal drum system, an external drum system, a flat bed system, or the like. The image exposure can be performed using a plate setter according to a usual method.

<Development Treatment Step>

The development treatment can be performed using a typical method. In a case of on-press development, in an exposed area of the image recording layer, a printing ink receiving unit having a lipophilic surface is formed by the image recording layer cured by light exposure, in a case where at least one of dampening water or printing ink is supplied to the image-exposed printing plate precursor on a printing machine. Meanwhile, in an unexposed area, a non-cured image recording layer is dissolved or dispersed by at least one of dampening water or printing ink supplied and then removed, a hydrophilic surface is exposed to the portion. As the result, the dampening water adheres to the exposed hydrophilic surface, the printing ink is impressed on the image recording layer of the exposed region, and then the printing is started.

Here, either of dampening water or printing ink may be initially supplied to the surface of the printing plate precursor, but it is preferable that dampening water is initially supplied thereto so that the on-press developability is promoted by permeation of the dampening water.

<Printing Step>

The printing using the obtained printing plate can be performed according to a typical method. The printing can be performed by supplying, to the printing plate, desired printing ink, and as necessary, dampening water.

The amount of the printing ink and dampening water to be supplied is not particularly limited and may be appropriately set according to the desired printing.

The method of supplying the printing ink and dampening water to the printing plate is not particularly limited and a known method can be used.

Further, a planographic printing plate can be produced from the planographic printing plate precursor according to the present invention through a development treatment using a developer by appropriately selecting the binder polymer or the like that is the constituent component of the image recording layer.

It is preferable that the method for making a printing plate according to another embodiment of the present invention includes a step of image-wise exposing the printing plate precursor according to the embodiment of the present invention to light (also referred to as an "image exposure step"), and a development step of supplying a developer having a pH of 2 to 14 to remove an unexposed area (also referred to as a "developer developing step").

The above-described plate-making method is also referred to as a "developer treatment method" below.

The printing method according to another embodiment of the present invention is a method for making and printing a printing plate using the printing plate precursor according to the embodiment of the present invention, and it is preferable that the printing method includes a step of image-wise exposing the printing plate precursor according to the embodiment of the present invention to light (also referred to as an "image exposure step"), a development step of supplying a developer having a pH of 2 to 14 to remove an unexposed area (also referred to as a "developer developing step"), and a step of printing with the obtained printing plate (also referred to as a "printing step").

<Image Exposure Step>

The image exposure step in the developer treatment method is the same as the image exposure step in the above-described on-press development method.

<Developer Developing Step>

The development treatment using a developer includes an embodiment (also referred to as a simple development treatment) including a step of supplying a developer having a pH of 2 to 12 to remove an unexposed area of the image recording layer. The developer having a pH of 2 to 12 may contain at least one compound selected from the group consisting of a surfactant and a water-soluble polymer compound.

Further, as a preferred embodiment of the simple development treatment, an embodiment including a step of supplying the developer having a pH of 2 to 10 to remove an unexposed area of the image recording layer and not including a water-washing step after the unexposed area-removing step is also adopted.

It is also possible to perform development and a gum solution treatment step simultaneously by a method adding a water-soluble polymer compound to the developer as necessary, and the like.

Therefore, the post-water washing step is not particularly required, and it is also possible to perform development and the gum solution treatment step by a single one-solution step and then perform a drying step. Thus, as the development treatment using a developer, a method for producing a printing plate including a step of subjecting an image-exposed printing plate precursor to a development treatment using a developer having a pH of 2 to 12 is preferable. After the development treatment, it is preferable to remove the excess developer using a squeeze roller and then perform drying.

That is, in the development step of the method for producing the printing plate according to the present invention, it is preferable to perform the development treatment and the gum solution treatment by a single one-solution step.

Development and the gum solution treatment being performed by a single one-solution step means that the development treatment and the gum solution treatment are not performed as separate steps, and the development treatment and the gum solution treatment are performed in a single step using one solution.

The development treatment can be suitably performed using an automatic development treatment machine including unit for supplying the developer and a rubbing member. An automatic development treatment machine in which a rotating brush roll is used as the rubbing member is particularly preferable.

The number of rotating brush rolls is preferably two or more. Furthermore, the automatic development treatment machine preferably includes, after development treatment unit, unit for removing the excess developer such as a squeeze roller or drying unit such as a hot-air device. Further, the automatic development treatment machine may include, before the development treatment unit, preheating unit for performing a heating treatment on the planographic printing plate precursor after image exposure.

A treatment in such an automatic development treatment machine has an advantage of being opened from a need for dealing with development scum derived from the image recording layer, the non-photosensitive resin layer, and the protective layer in a case where a protective layer is present, the development scum being generated in a case of so-called on-press development treatment.

In the development, in the case of a manual treatment, as a development treatment method, for example, a method in which sponge, absorbent cotton, or the like is soaked with an aqueous solution, the entire plate surface is treated while being rubbed and dried after the end of the treatment is suitably exemplified. In the case of an immersion treatment, for example, a method in which the printing plate precursor is immersed and stirred for 60 seconds in a vat, deep tank, or the like containing an aqueous solution and then dried while being rubbed with absorbent cotton, sponge, or the like is suitably exemplified.

In the development treatment, a device having a simplified structure and simplified steps is preferably used.

For example, in an alkali development treatment, the protective layer is removed by the pre-water washing step, next, development is performed using an alkaline developer having high pH, after that, alkali is removed in the post-water washing step, a gum treatment is performed in a gum pulling step, and drying is performed in the drying step. In the simple development treatment, development and gum pulling can be performed simultaneously using one solution. Therefore, it is possible to omit the post-water washing step and the gum treatment step, and it is preferable to perform the drying step as necessary after development and gum pulling (gum solution treatment) are performed using one solution.

Furthermore, it is preferable to perform the removal of the protective layer, development, and gum pulling simultaneously using one solution without performing the pre-water washing step. Further, it is preferable to remove the excess developer using a squeeze roller after development and gum pulling, and then perform drying.

In the development treatment, a method of immersing the printing plate precursor in the developer once may be used, or a method of immersing the printing plate precursor in the developer twice or more may be used. Among these, the method of immersing the printing plate precursor in the developer once or twice is preferable.

In the immersion, the exposed planographic printing plate precursor may be put into a developer tank in which the developer is stored or the developer is blown onto the plate surface of the exposed planographic printing plate precursor from a spray or the like.

Even in a case of immersing the planographic printing plate precursor in the developer twice or more, a case where the planographic printing plate precursor is immersed in the same developer or the developer and a developer (fatigued solution) in which the components of the image recording layer are dissolved or dispersed by the development treatment twice or more is referred to as the development treatment using one solution (one-solution treatment).

In the development treatment, a rubbing member is preferably used, and a rubbing member such as a brush is preferably installed in a development bath for removing the non-image area of the image recording layer.

The development treatment can be performed according to a usual method at a temperature of preferably at 0° C. to 60° C. and more preferably 15° C. to 40° C. by, for example, immersing the exposed printing plate precursor in the developer and rubbing the printing plate precursor with a brush or drawing a treatment liquid prepared in an external tank using a pump, blowing the developer from a spray nozzle, and rubbing the printing plate precursor with the brush. The development treatment can be continuously performed a plurality of times. For example, the development treatment can be performed by drawing the developer prepared in an external tank using a pump, blowing the developer from a spray nozzle, rubbing the printing plate precursor with the brush, then, again, blowing the developer from the spray nozzle, and rubbing the printing plate precursor with the brush. In the case of performing the development treatment using the automatic development treatment machine, the developer is fatigued as the treatment amount increases, and thus it is preferable to restore the treatment capability by using a supplementary solution or a fresh developer.

For the development treatment, a gum coater and an automatic development treatment machine known for pre-sensitized plate (PS plates) and computer to plate (CTP) can also be used in the related art. In the case of using the automatic development treatment machine, it is possible to apply any method of, for example, a method of treating the planographic printing plate precursor by drawing a developer prepared in a developer tank or a developer prepared in an external tank using a pump and blowing the developer from a spray nozzle, a method of treating the planographic printing plate precursor by immersing and transporting the printing plate in a tank filled with a developer using a guide roll in the developer or the like, or a so-called single-use treatment method of treating the planographic printing plate precursor by supplying only a necessary amount of a substantially unused developer to each plate. In any method, it is more preferable to use a rubbing mechanism such as a brush, molleton, and the like. For example, commercially available automatic development treatment machines (Clean Out Unit C85/C125, Clean-Out Unit+ C85/120, FCF 85V, FCF 125V, FCF News (manufactured by Glunz & Jensen), Azura CX85, Azura CX125, and Azura CX150 (manufactured by AGFA Graphics NV.)) can be used. Further, it is also possible to use a device into which a laser exposure unit and an automatic development treatment machine unit are integrally combined.

The details of components and the like of the developer used in the development step will be described below.

—pH—

The pH of the developer is preferably in a range of 2 to 12, more preferably in a range of 5 to 9, and still more preferably in a range of 7 to 9. From the viewpoint of developability and dispersibility of the image recording layer, it is advantageous to the value of the pH to be high; however, regarding printability, particularly, stain suppression, it is advantageous to set the value of the pH to be low.

Here, the pH is a value measured at 25° C. using a pH meter (model No.: HM-31, manufactured by DKK-TOA Corporation).

—Surfactant—

The developer can contain a surfactant such as an anionic surfactant, a non-ionic surfactant, a cationic surfactant, and an amphoteric surfactant.

From the viewpoint of blanket stain property, the developer preferably includes at least one selected from the group consisting of an anionic surfactant and an amphoteric surfactant.

Further, the developer preferably includes a non-ionic surfactant and more preferably includes a non-ionic surfactant and at least one selected from the group consisting of an anionic surfactant and an amphoteric surfactant.

Preferred examples of the anionic surfactant include a compound represented by Formula (I).

$$R^1\text{—}Y^1\text{—}X^1 \qquad (I)$$

In Formula (I), $R^1$ represents an alkyl group, a cycloalkyl group, an alkenyl group, an aralkyl group, or an aryl group, which may have a substituent.

As the alkyl group, for example, an alkyl group having 1 to 20 carbon atoms is preferable, and preferred specific examples thereof include a methyl group, an ethyl group, a propyl group, an n-butyl group, a sec-butyl group, a hexyl group, a 2-ethylhexyl group, an octyl group, a decyl group, a dodecyl group, a hexadecyl group, and a stearyl group.

The cycloalkyl group may be monocyclic or polycyclic. As the monocyclic cycloalkyl group, a monocyclic cycloalkyl group having 3 to 8 carbon atoms is preferable, and a cyclopropyl group, a cyclopentyl group, a cyclohexyl group, or a cyclooctyl group is more preferable. Preferred examples of the polycyclic cycloalkyl group include an adamantyl group, a norbornyl group, an isobornyl group, a camphanyl group, a dicyclopentyl group, an α-pinel group, and a tricyclodecanyl group.

As the alkenyl group, for example, an alkenyl group having 2 to 20 carbon atoms is preferable, and preferred specific examples thereof include a vinyl group, an allyl group, a butenyl group, and a cyclohexenyl group.

As the aralkyl group, for example, an aralkyl group having 7 to 12 carbon atoms is preferable, and preferred specific examples thereof include a benzyl group, a phenethyl group, and a naphthylmethyl group.

As the aryl group, for example, an aryl group having 6 to 15 carbon atoms is preferable, and preferred specific examples thereof include a phenyl group, a tolyl group, a dimethylphenyl group, a 2,4,6-trimethylphenyl group, a naphthyl group, an anthryl group, and a 9,10-dimethoxyanthryl group.

As the substituent, a monovalent nonmetallic atomic group excluding a hydrogen atom is used, and preferred examples thereof include a halogen atom (F, Cl, Br, or I), a hydroxy group, an alkoxy group, an aryloxy group, an acyl group, an amide group, an ester group, an acyloxy group, a carboxy group, a carboxylic acid anion group, and a sulfonic acid anion group.

As specific examples of the alkoxy group in the substituent, a methoxy group, an ethoxy group, a propyloxy group, an isopropyloxy group, a butyloxy group, a pentyloxy group, a hexyloxy group, a dodecyloxy group, a stearyloxy group, a methoxyethoxy group, a poly(ethyleneoxy) group, and a poly(propyleneoxy) group, which respectively have 1 to 40 carbon atoms, are preferable; and these groups respectively having 1 to 20 carbon atoms are more preferable. Examples of the aryloxy group include a phenoxy group, a tolyloxy group, a xylyloxy group, a mesityloxy group, a cumenyloxy group, a methoxyphenyloxy group, an ethoxyphenyloxy group, a chlorophenyloxy group, a bromophenyloxy group, and a naphthyloxy group, respectively having 6 to 18 carbon atoms. Examples of the acyl group include an acetyl group, a propanoyl group, a butanoyl group, a benzoyl group, and a naphthoyl group, respectively having 2 to 24 carbon atoms. Examples of the amide group include an acetamide group, a propionic acid amide group, a dodecanoic acid amide group, a palmitic acid amide group, a stearic acid amide group, a benzoic acid amide group, and a naphthoic acid amide group, respectively having 2 to 24 carbon atoms. Examples of the acyloxy group include an acetoxy group, a propanoyloxy group, a benzoyloxy group, and a naphthoyloxy group, respectively having 2 to 20 carbon atoms. Examples of the ester group include a methyl ester group, an ethyl ester group, a propyl ester group, a hexyl ester group, an octyl ester group, a dodecyl ester group, and a stearyl ester group, respectively having 1 to 24 carbon atoms. The substituent may be formed by consisting of a combination of two or more substituents described above.

$X^1$ represents a sulfonate group, a sulfate monoester group, a carboxylate group, or a phosphate group.

$Y^1$ represents a single bond, —$C_nH_{2n}$—, —$C_{n-m}H_{2(n-m)}OC_mH_{2m}$—, —O—($CH_2CH_2O)_n$—, —O—($CH_2CH_2CH_2O)_n$—, —CO—NH—, or a divalent linking group formed by consisting of a combination of two or more of these, in which the expressions of "n≥1" and "n≥m≥0" is satisfied.

Among examples of the compound represented by Formula (I), from the viewpoint of scratch and stain resistance, a compound represented by Formula (I-A) or Formula (I-B) is preferable.

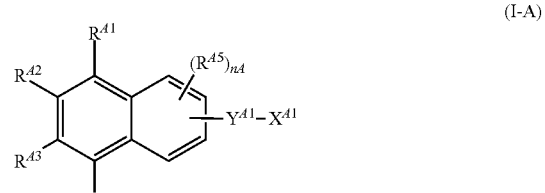

(I-A)

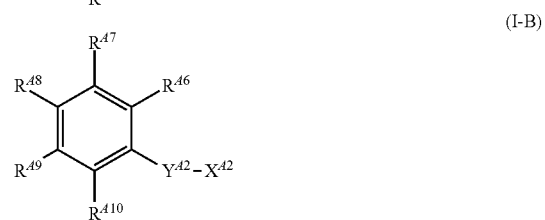

(I-B)

In Formulae (I-A) and (I-B), $R^{41}$ to $R^{410}$ each independently represent a hydrogen atom or an alkyl group, nA represents an integer of 1 to 3, $X^{41}$ and $X^{42}$ each independently represent a sulfonate group, a sulfate monoester group, a carboxylate group, or a phosphate group, and $Y^{41}$ and $Y^{42}$ each independently represent a single bond, —$C_nH_{2n}$—, —$C_{n-m}H_{2(n-m)}OC_mH_{2m}$—, —O—($CH_2CH_2O)_n$—, —O—($CH_2CH_2CH_2O)_n$—, —CO—NH—, or a divalent linking group formed by combining two or more of these, in which the expressions of "n≥1" and "n≥m≥0" is satisfied. The sum total number of carbon atoms in $R^{41}$ to $R^{45}$ or $R^{46}$ to $R^{410}$, and $Y^{41}$ or $Y^{42}$ is 3 or more.

The total number of carbon atoms in $R^{41}$ to $R^{45}$ and $Y^{1A}$, or $R^{46}$ to $R^{410}$ and $Y^{42}$ in the compound represented by Formula (I-A) or Formula (I-B) is preferably 25 or less and more preferably in a range of 4 to 20. The structure of the above-described alkyl group may be linear or branched.

It is preferable that $X^{41}$ and $X^{42}$ in the compound represented by Formula (I-A) or Formula (I-B) represent a sulfonate group or a carboxylate group. Further, the salt structure in $X^{41}$ and $X^{42}$ is preferable, from the viewpoint that the solubility of the alkali metal salt in a water-based solvent is particularly excellent. Among the salt structures, a sodium salt or a potassium salt is particularly preferable.

As the compound represented by Formula (I-A) or Formula (I-B), the description in paragraphs 0019 to 0037 of JP2007-206348A can be referred to.

As the anionic surfactant, the compounds described in paragraphs 0023 to 0028 of JP2006-065321A can be suitably used.

The amphoteric surfactant used for the developer is not particularly limited, and examples thereof include an amine oxide-based surfactant such as alkyl dimethylamine oxide; a betaine-based surfactant such as alkyl betaine, fatty acid amide propyl betaine, or alkyl imidazole; and an amino acid-based surfactant such as sodium alkylamino fatty acid.

Particularly, alkyl dimethylamine oxide which may have a substituent, alkyl carboxy betaine which may have a substituent, or alkyl sulfobetaine which may have a substituent is preferably used. Specific examples thereof include compounds represented by Formula (2) in paragraph 0256 of JP2008-203359A, compounds represented by Formulae (I), Formula (II), and Formula (VI) in paragraph 0028 of JP2008-276166A, and compounds described in paragraphs 0022 to 0029 of JP2009-047927A.

As an amphoteric ion-based surfactant used for the developer, a compound represented by formula (1) or a compound represented by Formula (2) is preferable.

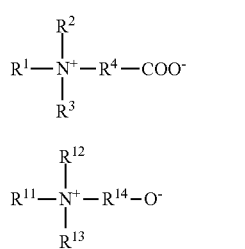

In Formulae (1) and (2), $R^1$ and $R^{11}$ each independently represent an alkyl group having 8 to 20 carbon atoms or an alkyl group having a linking group, which has 8 to 20 carbon atoms in total.

$R^2$, $R^3$, $R^{12}$, and $R^{13}$ each independently represent a hydrogen atom, an alkyl group, or a group containing an ethylene oxide structure.

$R^4$ and $R^{14}$ each independently represent a single bond or an alkylene group.

Further, two groups among $R^1$, $R^2$, $R^3$, and $R^4$ may be bonded to each other to form a ring structure, and two groups among $R^{11}$, $R^{12}$, $R^{13}$, and $R^{14}$ may be bonded to each other to form a ring structure.

In the compound represented by Formula (1) or the compound represented by Formula (2), the hydrophobic portion is bigger as the total number of carbon atoms increases, and the solubility in a water-based developer is decreased. In this case, the solubility is improved by mixing an organic solvent such as alcohol that assists dissolution with water as a dissolution assistant, but the surfactant cannot be dissolved within a proper mixing range in a case where the total number of carbon atoms is extremely large. Accordingly, the sum total number of carbon atoms of $R^1$ to $R^4$ or $R^{11}$ to $R^{14}$ is preferably in a range of 10 to 40 and more preferably in a range of 12 to 30.

The alkyl group having a linking group represented by $R^1$ or $R^{11}$ has a structure in which a linking group is present between alkyl groups. That is, in a case where one linking group is present, the structure can be represented by "-alkylene group-linking group-alkyl group". Examples of the linking group include an ester bond, a carbonyl bond, and an amide bond. The structure may have two or more linking groups, but it is preferable that the structure has one linking group, and an amide bond is particularly preferable. The total number of carbon atoms of the alkylene group bonded to the linking group is preferably in a range of 1 to 5. The alkylene group may be linear or branched, but a linear alkylene group is preferable. The number of carbon atoms of the alkyl group bonded to the linking group is preferably in a range of 3 to 19, and the alkyl group may be linear or branched, but a linear alkyl is preferable.

In a case where $R^2$ or $R^{12}$ represents an alkyl group, the number of carbon atoms thereof is preferably in a range of 1 to 5 and particularly preferably in a range of 1 to 3. The alkyl group may be linear or branched, but a linear alkyl group is preferable.

In a case where $R^3$ or $R^{13}$ represents an alkyl group, the number of carbon atoms thereof is preferably in a range of 1 to 5 and particularly preferably in a range of 1 to 3. The alkyl group may be linear or branched, but a linear alkyl group is preferable.

Examples of the group containing an ethylene oxide structure, which is represented by $R^3$ or $R^{13}$, include a group represented by $-R^a(CH_2CH_2O)_nR^b$. Here, $R^a$ represents a single bond, an oxygen atom, or a divalent organic group (preferably having 10 or less carbon atoms), $R^b$ represents a hydrogen atom or an organic group (preferably having 10 or less carbon atoms), and n represents an integer of 1 to 10.

In a case where $R^4$ and $R^{14}$ represents an alkylene group, the number of carbon atoms thereof is preferably in a range of 1 to 5 and particularly preferably in a range of 1 to 3. The alkylene group may be linear or branched, but a linear alkylene group is preferable.

The compound represented by Formula (1) or the compound represented by Formula (2) preferably has an amide bond and more preferably has an amide bond as a linking group of $R^1$ or $R^{11}$.

Representative examples of the compound represented by Formula (1) or the compound represented by Formula (2) are as follows, but the present invention is not limited thereto.

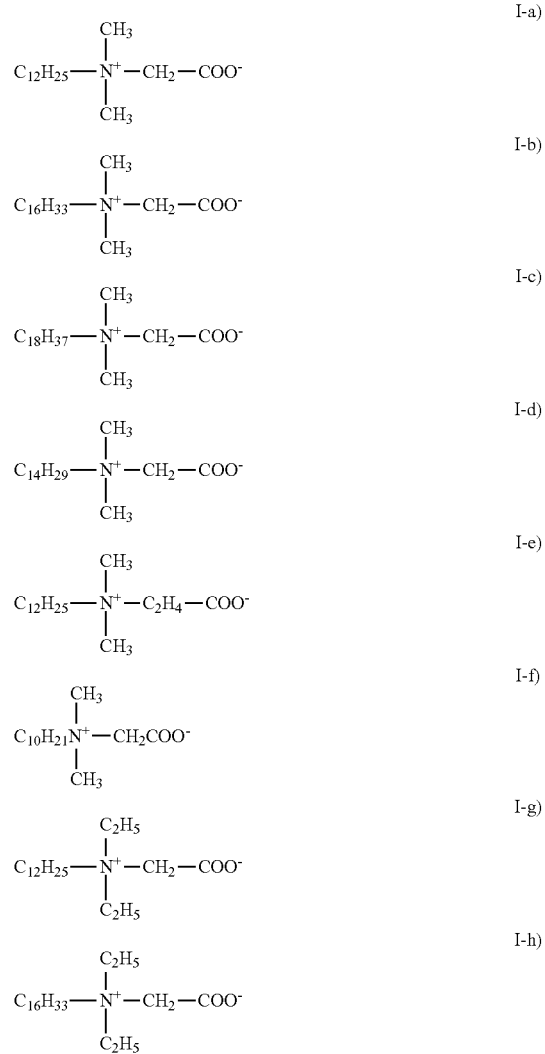

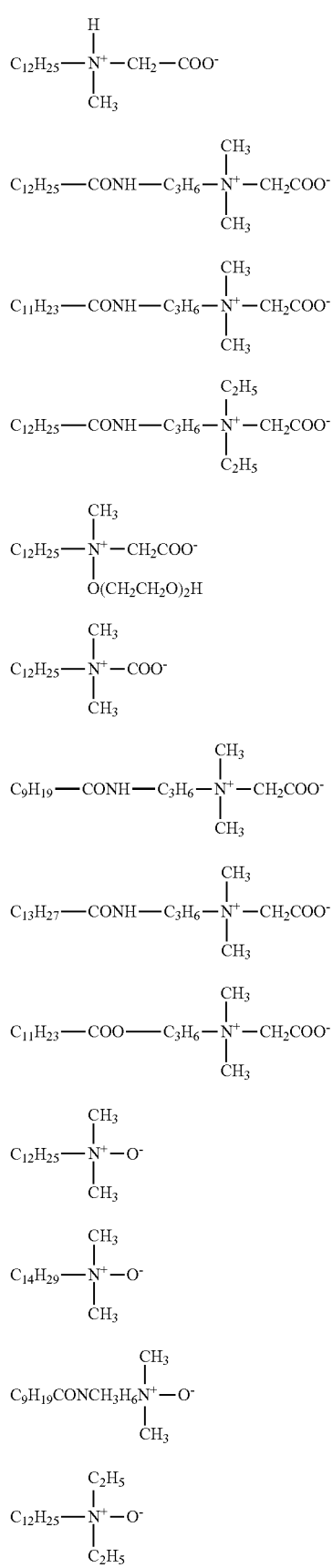

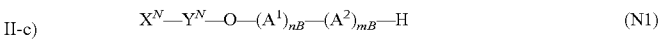

The compound represented by Formula (1) or Formula (2) can be synthesized according to a known method. Further, commercially available products may be used. Examples of the commercially available products of the compound represented by Formula (1) include SOFRAZOLINE LPB, SOFTAZOLINE LPB-R, and VISTA MAP (manufactured by Kawaken Fine Chemicals Co., Ltd.), and TAKESAAF C-157L (manufactured by TAKEMOTO OIL & FAT Co., Ltd.). Examples of the commercially available products of the compound represented by Formula (2) include SOFTAZOLINE LAO (manufactured by Kawaken Fine Chemicals Co., Ltd.) and AMOGEN AOL (manufactured by DKS Co., Ltd.).

The amphoteric ion-based surfactant may be used alone or in combination of two or more kinds thereof in a developer.

Examples of the non-ionic surfactant include polyoxyethylene alkyl ethers, polyoxyethylene alkyl phenyl ethers, polyoxyethylene polystyryl phenyl ether, glycerin fatty acid partial esters, sorbitan fatty acid partial esters, pentaerythritol fatty acid partial esters, propylene glycol monofatty acid ester, sucrose fatty acid partial ester, polyoxyethylene sorbitan fatty acid partial esters, polyoxyethylene sorbitol fatty acid partial esters, polyethylene glycol fatty acid esters, polyglycerin fatty acid partial esters, polyoxyethylene glycerin fatty acid partial esters, polyoxyethylene diglycerins, fatty acid diethanolamides, N,N-bis-2-hydroxyalkylamines, polyoxyethylene alkylamine, triethanolamine fatty acid ester, trialkylamine oxide, polyoxyethylene alkyl phenyl ethers, and polyoxyethylene-polyoxypropylene block copolymers.

Further, acetylene glycol-based and acetylene alcohol-based oxyethylene adducts, and fluorine-based surfactants can also be used. These surfactants can be used in combination of two or more kinds thereof.

Particularly preferred examples of the non-ionic surfactant include a non-ionic aromatic ether-based surfactant represented by Formula (N1).

$$X^N—Y^N—O—(A^1)_{nB}—(A^2)_{mB}—H \quad (N1)$$

In the formula, $X^N$ represents an aromatic group which may have a substituent, $Y^N$ represents a single bond or an alkylene group having 1 to 10 carbon atoms, $A^1$ and $A^2$ are different groups and represent any one of $—CH_2CH_2O—$ or $—CH_2CH(CH_3)O—$, and nB and mB each independently represent an integer of 0 to 100, where both of nB and mB is not 0 simultaneously, and both of nB and mB is not 1 in a case where any one of nB or mB is 0.

In the formula, examples of the aromatic group of $X^N$ include a phenyl group, a naphthyl group, and an anthranyl group. These aromatic groups may have a substituent. Examples of the substituent include an organic group having 1 to 100 carbon atoms. In the formula, the compound may be a random or block copolymer in a case where both A and B are present.

Specific examples of the organic group having 1 to 100 carbon atoms include aliphatic hydrocarbon groups or aromatic hydrocarbon groups, which may be saturated or unsaturated and may be linear or branched, such as an alkyl group, an alkenyl group, an alkynyl group, an aryl group, an aralkyl group, an alkoxy group, an aryloxy group, a N-alkylamino group, a N,N-dialkylamino group, a N-arylamino group, a N,N-diarylamino group, a N-alkyl-N-arylamino group, an acyloxy group, a carbamoyloxy group, a N-alkylcarbamoyloxy group, a N-arylcarbamoyloxy group, a N,N-dialkylcarbamoyloxy group, a N,N-diarylcarbamoyloxy group, a N-alkyl-N-arylcarbamoyloxy group, an acylamino group, a N-alkylacylamino group, a N-arylacylamino group, an acyl group, an alkoxycarbonylamino group, an alkoxycarbonyl group, an aryloxycarbonyl group, a carbamoyl group, a N-alkylcarbamoyl group, a N,N-dialkylcarbamoyl group, a N-arylcarbamoyl group, a N,N-diarylcarbamoyl group, a N-alkyl-N-arylcarbamoyl group, a polyoxyalkylene chain, and the above-described organic group to which a polyoxyalkylene chain is bonded. The alkyl group may be linear or branched.

Further, as the non-ionic surfactant, compounds described in paragraphs 0030 to 0040 of JP2006-065321A can also be suitably used.

The cationic surfactant is not particularly limited, and known surfactants of the related art can be used. Examples thereof include alkylamine salts, quaternary ammonium salts, alkylimidazolinium salts, polyoxyethylene alkylamine salts, and polyethylene polyamine derivatives.

The surfactant may be used alone or in combination of two or more kinds thereof.

The content of the surfactant is preferably in a range of 1% by mass to 25% by mass, more preferably in a range of 2% by mass to 20% by mass, still more preferably in a range of 3% by mass to 15% by mass, and particularly preferably in a range of 5% by mass to 10% by mass with respect to the total mass of the developer. In a case where the content thereof is within the above-described range, scratch and stain resistance is more excellent, the dispersibility of the development scum is excellent, and the inking property of a planographic printing plate to be obtained is excellent.

—Water-Soluble Polymer Compound—

The developer is capable of including a water-soluble polymer compound from the viewpoint of the viscosity adjustment of the developer and the protection of the plate surface of a planographic printing plate to be obtained.

Examples of the water-soluble polymer compound include a water-soluble polymer compound such as soybean polysaccharides, modified starch, gum arabic, dextrin, a fiber derivative (such as carboxy methyl cellulose, carboxy ethyl cellulose, or methyl cellulose) and a modified product thereof, pullulan, polyvinyl alcohol and a derivative thereof, a copolymer of polyvinylpyrrolidone, polyacrylamide and acrylamide, a vinyl methyl ether/maleic anhydride copolymer, a vinyl acetate/maleic anhydride copolymer, and a styrene/maleic anhydride copolymer.

As the soybean polysaccharides, soybean polysaccharides which have been known in the related art can be used. For example, SOYAFIBE (trade name, manufactured by FUJI OIL, CO., LTD.) can be used as a commercially available product, and various grades of products can be used. Preferred examples thereof include products in which the viscosity of a 10% by mass of aqueous solution is in a range of 10 mPa s to 100 mPa s.

As the modified starch, starch represented by Formula (III) is preferable. Any of starch such as corn, potato, tapioca, rice, or wheat can be used as the starch represented by Formula (III). The modification of the starch can be performed according to a method of decomposing the starch with an acid or an enzyme to have 5 to 30 glucose residues per one molecule and adding oxypropylene thereto in an alkali.

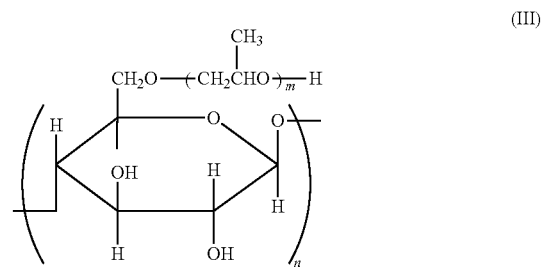

(III)

In the formula, the etherification degree (degree of substitution) is in a range of 0.05 to 1.2 per glucose unit, n represents an integer of 3 to 30, and m represents an integer of 1 to 3.

Among the examples of the water-soluble polymer compound, soybean polysaccharides, modified starch, gum arabic, dextrin, carboxy methyl cellulose, and polyvinyl alcohol are particularly preferable.

The water-soluble polymer compound can be used in combination of two or more kinds thereof.

In a case where the developer includes a water-soluble polymer compound, the content of the water-soluble polymer compound is preferably 3% by mass or less and more preferably 1% by mass or less with respect to the total mass of the developer. In the case of the above-described aspect, the viscosity of the developer is appropriate, and it is possible to suppress the development scum or the like being deposited on a roller member of the automatic development treatment machine.

—Other Additives—

The developer used in the present invention may contain a wetting agent, a preservative, a chelate compound, an anti-foaming agent, an organic acid, an organic solvent, an inorganic acid, and an inorganic salt in addition to those described above.

Suitable examples of the wetting agent include ethylene glycol, propylene glycol, triethylene glycol, butylene glycol, hexylene glycol, diethylene glycol, dipropylene glycol, glycerin, trimethylolpropane, and diglycerin. The wetting agent may be used alone or in combination of two or more kinds thereof. The content of the wetting agent is preferably in a range of 0.10% by mass to 5% by mass with respect to the total mass of the developer.

As the preservative, phenol or a derivative thereof, formalin, an imidazole derivative, sodium dehydroacetate, a 4-isothiazolin-3-one derivative, benzoisothiazolin-3-one, 2-methyl-4-isothiazolin-3-one, a benzotriazole derivative, an amidizing anidine derivative, quaternary ammonium salts, derivatives of pyridine, quinoline, guanidine, and the like, diazine, a triazole derivative, oxazole, an oxazine derivative, nitrobromoalcohol such as 2-bromo-2-nitropropane-1,3-diol, 1,1-dibromo-1-nitro-2-ethanol, and 1,1-dibromo-1-nitro-2-propanol, and the like can be preferably used.

The addition amount of the preservative is an amount of stably exhibiting the efficacy for bacteria, molds, yeasts, or the like, and is preferably in a range of 0.01% by mass to 4% by mass with respect to the total mass of the developer, even though the amount thereof varies depending on the type of bacteria, molds, and the yeasts. Further, two or more preservatives are preferably used in combination so that there is efficacy for a variety of molds and sterilization.

Examples of the chelate compound include ethylenediaminetetraacetic acid, a potassium salt thereof, and a sodium salt thereof; diethylenetriaminepentaacetic acid, a potassium salt thereof, and a sodium salt thereof; triethylenetetraminehexaacetic acid, a potassium salt thereof, a sodium salt thereof; hydroxyethylethylenediaminetriacetic acid, a potassium salt thereof, and a sodium salt thereof; nitrilotriacetic acid and a sodium salt thereof; 1-hydroxyethane-1,1-diphosphonic acid, a potassium salt thereof, and a sodium salt thereof; and organic phosphonic acids such as amino tri (methylenephosphonic acid), a potassium salt thereof, and sodium salt thereof. Instead of the sodium salt and the potassium salt of the chelating agent, a salt of an organic amine is also effective.

The chelating agent is preferably a chelating agent which is stably present in a treatment liquid composition and does not impair printability. The content of the chelating agent is preferably in a range of 0.001% by mass to 1.0% by mass with respect to the total mass of the developer.

As the antifoaming agent, it is possible to use a typical silicon-based self-emulsification type, emulsification type, or non-ionic compound having a hydrophilic-lipophilic balance (HLB) of 5 or less or the like. A silicon anti-foaming agent is preferable.

A silicon-based surfactant is regarded as the antifoaming agent.

The content of the anti-foaming agent is suitably in a range of 0.001% by mass to 1.0% by mass with respect to the total mass of the developer.

Examples of the organic acid include citric acid, acetic acid, oxalic acid, malonic acid, salicylic acid, caprylic acid, tartaric acid, malic acid, lactic acid, levulinic acid, p-toluenesulfonic acid, xylenesulfonic acid, phytic acid, and organic phosphonic acid. The organic acid can be used in form of an alkali metal salt or ammonium salt thereof. The content of the organic acid is preferably in a range of 0.01% by mass to 0.5% by mass with respect to the total mass of the developer.

Examples of the organic solvent include aliphatic hydrocarbons (hexane, heptane, "ISOPAR E, H, G" (manufactured by Exxon Mobil Corporation), and the like), aromatic hydrocarbons (toluene, xylene, and the like), halogenated hydrocarbon (methylene dichloride, ethylene dichloride, trichlene, monochlorobenzene, and the like), and polar solvents.

Examples of the polar solvent include alcohols (such as methanol, ethanol, propanol, isopropanol, benzyl alcohol, ethylene glycol monomethyl ether, 2-ethoxyethanol, diethylene glycol monoethyl ether, diethylene glycol monohexyl ether, triethylene glycol monomethyl ether, propylene glycol monoethyl ether, propylene glycol monomethyl ether, polyethylene glycol monomethyl ether, polypropylene glycol, tetraethylene glycol, ethylene glycol monobutyl ether, ethylene glycol monobenzyl ether, ethylene glycol monophenyl ether, methyl phenyl carbinol, n-amyl alcohol, and methyl amyl alcohol), ketones (such as acetone, methyl ethyl ketone, ethyl butyl ketone, methyl isobutyl ketone, and cyclohexanone), esters (such as ethyl acetate, propyl acetate, butyl acetate, amyl acetate, benzyl acetate, methyl lactate, butyl lactate, ethylene glycol monobutyl acetate, propylene glycol monomethyl ether acetate, diethylene glycol acetate, diethyl phthalate, and butyl levulinate), and others (such as triethyl phosphate, tricresyl phosphate, N-phenylethanolamine, and N-phenyldiethanolamine).

In a case where the organic solvent is insoluble in water, the organic solvent can be used by being solubilized in water using a surfactant or the like. In a case where the developer contains an organic solvent, from the viewpoints of safety and inflammability, the concentration of the solvent in the developer is preferably less than 40% by mass.

Examples of the inorganic acid and inorganic salt include phosphoric acid, methacrylic acid, primary ammonium phosphate, secondary ammonium phosphate, primary sodium phosphate, secondary sodium phosphate, primary potassium phosphate, secondary potassium phosphate, sodium tripolyphosphate, potassium pyrophosphate, sodium hexametaphosphate, magnesium nitrate, sodium nitrate, potassium nitrate, ammonium nitrate, sodium sulfate, potassium sulfate, ammonium sulfate, sodium sulfite, ammonium sulfite, sodium hydrogensulfate, and nickel sulfate. The content of the inorganic salt is preferably in a range of 0.01% by mass to 0.5% by mass with respect to the total mass of the developer.

The developer is prepared by dissolving or dispersing each of the above-described components in water as necessary. The concentration of solid contents of the developer is preferably in a range of 2% by mass to 25% by mass. The developer can be used by preparing a concentrated solution and diluting the concentrate with water before use.

The developer is preferably an aqueous developer.

From the viewpoint of dispersibility of the development scum, the developer preferably contains an alcohol compound.

Examples of the alcohol compound include methanol, ethanol, propanol, isopropanol, and benzyl alcohol. Among these, benzyl alcohol is preferable.

From the viewpoint of dispersibility of the development scum, the content of the alcohol compound is preferably in a range of 0.01% by mass to 5% by mass, more preferably in a range of 0.1% by mass to 2% by mass, and particularly preferably in a range of 0.2% by mass to 1% by mass with respect to the total mass of the developer.

<Printing Step>

The printing method using the printing plate obtained by the developer treatment method is not particularly limited, and printing may be performed by a known method.

Examples thereof include a method of printing by supplying ink, and as necessary, dampening water to the printing plate.

The printing method according to the embodiment of the present invention may include known steps other than the above-described steps. Examples of other steps include a plate inspection step of confirming the position or orientation of the printing plate precursor before each step and a confirmation step of confirming the printed image after the development treatment step.

EXAMPLES

Hereinafter, the present invention will be described in detail with reference to examples, but the present invention is not limited thereto. In the examples, "%" and "parts" respectively indicate "% by mass" and "parts by mass"

unless otherwise specified. In a polymer compound, the molecular weight indicates the mass average molecular weight (Mw) and the proportion of constituent repeating units indicates mole percentage unless otherwise specified. The mass average molecular weight (Mw) is a value in terms of polystyrene obtained by performing measurement using gel permeation chromatography (GPC).

Examples 1 to 35 and Comparative Example 1 to 6

<Production of Support 1>

An aluminum plate (material: JIS A 1052) having a thickness of 0.3 mm was subjected to the following treatments (a) to (f), thereby producing a support 1. Moreover, during all treatment steps, a water washing treatment was performed, and liquid cutting was performed using a nip roller after the water washing treatment.

(a) Alkali Etching Treatment

The aluminum plate was subjected to an etching treatment by spraying an aqueous solution at a temperature of 60° C. in which the concentration of caustic soda was 25% by mass and the concentration of aluminum ions was 100 g/L using a spray tube. The etching amount of the surface of the aluminum plate to be subjected to an electrochemical roughening treatment was 3 $g/m^2$.

(b) Desmutting Treatment

A desmutting treatment was performed by spraying a sulfuric acid aqueous solution (concentration of 300 g/L) at a temperature of 35° C. for 5 seconds using the spray tube.

(c) Electrolytic Roughening Treatment

An electrochemical roughening treatment was continuously performed using an electrolyte (solution temperature of 35° C.) obtained by dissolving aluminum chloride in a 1% by mass of hydrochloric acid aqueous solution and adjusting the aluminum ion concentration to 4.5 g/L, a 60 Hz AC power source, and a flat cell type electrolytic cell. A sine wave was used as the waveform of the AC power source. In the electrochemical roughening treatment, the current density of the aluminum plate during the anodic reaction at the peak of the alternating current was 30 $A/dm^2$. The ratio between the sum total of electric quantity in a case of the anodic reaction and the sum total of electric quantity in a case of the cathodic reaction of the aluminum plate was 0.95. The electric quantity was set to 480 $C/dm^2$ in terms of the sum total of electric quantity in a case of the anodic reaction of the aluminum plate. The electrolyte was circulated using a pump so that the stirring inside the electrolytic cell was performed.

(d) Alkali Etching Treatment

The aluminum plate was subjected to an etching treatment by spraying an aqueous solution at a temperature of 35° C. in which the concentration of caustic soda was 5% by mass and the concentration of aluminum ions was 5 g/L using a spray tube. The etching amount of the surface of the aluminum plate on which the electrolytic roughening treatment had been performed was 0.05 $g/m^2$.

(e) Desmutting Treatment

A desmutting treatment was performed by spraying an aqueous solution at a solution temperature of 35° C. with a sulfuric acid concentration of 300 g/L and an aluminum ion concentration of 5 g/L using the spray tube for 5 seconds.

(f) Anodizing Treatment

The aluminum plate was subjected to an anodizing treatment at a solution temperature of 38° C. and a current density of 15 $A/dm^2$ using a 22% by mass of phosphoric acid aqueous solution as an electrolyte. Thereafter, washing with water by spraying was performed. The coating amount of oxide film was 1.5 $g/m^2$. The average diameter of micropores of a surface on the printing surface side of the support 1 was 30 nm.

The average diameter of micropores of the surface on the printing surface side of the aluminum support was determined by the following method. The average diameter was calculated by observing N=4 sheets of the surfaces on the printing surface side of the aluminum support using FE-SEM at a magnification of 150,000, measuring the diameters of micropores present in a range of 400 nm×600 $nm^2$ in the obtained four sheets of images, and averaging the values. In a case where the shape of the micropores was not circular, an equivalent circle diameter was used. The "equivalent circle diameter" is a diameter of a circle obtained by assuming the shape of an opening portion as a circle having the same projected area as the projected area of the opening portion.

<Production of Supports 2 to 4>

An aluminum plate (aluminum alloy plate) of a material 1S, having a thickness of 0.3 mm, was subjected to the following treatments (A-a) to (A-g), thereby producing supports 2 to 4. Moreover, during all treatment steps, a water washing treatment was performed, and liquid cutting was performed using a nip roller after the water washing treatment.

(A-a) Alkali Etching Treatment

The aluminum plate was subjected to an etching treatment by spraying a caustic soda aqueous solution in which the concentration of caustic soda was 26% by mass and the concentration of aluminum ions was 6.5% by mass using a spray at a temperature of 70° C. The dissolved aluminum amount of the surface to be subjected to an electrochemical roughening treatment was 5 $g/m^2$.

(A-b) Desmutting Treatment Using Acidic Aqueous Solution

A desmutting treatment was performed by spraying, as an acidic aqueous solution, an aqueous solution at a solution temperature of 30° C. with a sulfuric acid concentration of 150 g/L to the aluminum plate for 3 seconds.

(A-c) Electrochemical Roughening Treatment Using Hydrochloric Acid Aqueous Solution An electrochemical roughening treatment was performed using the AC current and an electrolyte having a hydrochloric acid concentration of 14 g/L, an aluminum ion concentration of 13 g/L, and a sulfuric acid concentration of 3 g/L. The solution temperature of the electrolyte was 30° C. The aluminum ion concentration was adjusted by adding aluminum chloride.

The waveform of the AC current was a sine wave in which the positive and negative waveforms were symmetrical, the frequency was 50 Hz, the ratio between the anodic reaction time and the cathodic reaction time in one cycle of the AC current was 1:1, and the current density was 75 $A/dm^2$ in terms of the peak current value of the AC current waveform. Further, the sum total of electric quantity of the aluminum plate used for the anodic reaction was 450 $C/dm^2$, and the electrolytic treatment was performed four times at energization intervals of 4 seconds for each of the electric quantity of 112.5 $C/dm^2$. A carbon electrode was used as a counter electrode of the aluminum plate.

(A-d) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray at a temperature of 45° C. The dissolved aluminum amount of the surface to be subjected to an electrochemical roughening treatment was 0.2 g/m².

(A-e) Desmutting Treatment Using Acidic Aqueous Solution

A desmutting treatment was performed by spraying, as an acidic aqueous solution, a waste liquid at a solution temperature of 30° C. (aqueous solution with a sulfuric acid concentration of 170 g/L and an aluminum ion concentration of 5 g/L), which was generated in the anodizing treatment step, to the aluminum plate for 3 seconds.

(A-f) Anodizing Treatment

Figure 3:
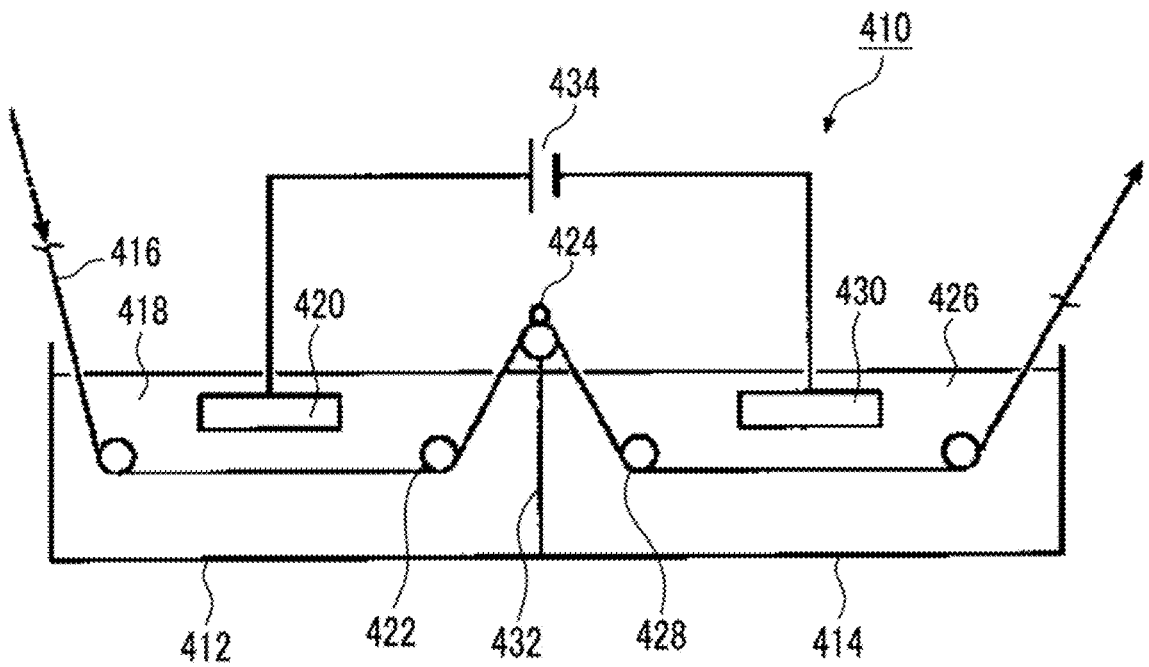
FIG. 3 is a schematic view illustrating an anodizing device used for an anodizing treatment.

An anodizing treatment was performed with an anodizing device using DC electrolysis having the structure shown in FIG. 3. The aluminum plate was subjected to an anodizing treatment at a solution temperature of 50° C. and a current density of 30A/dm² using a 170 g/L of sulfuric acid aqueous solution as an electrolyte, thereby forming an anodized film having a coating amount of 0.3 g/m².

An aluminum plate 416 in an anodizing device 410 illustrated in FIG. 3 is transported as indicated by the arrow in FIG. 3. The aluminum plate 416 is positively (+) charged by a power supply electrode 420 in a power supply tank 412 in which an electrolyte 418 is stored. Further, the aluminum plate 416 is transported upward by a roller 422 in the power supply tank 412, redirected downward by a nip roller 424, transported toward an electrolytic treatment tank 414 in which an electrolyte 426 was stored, and redirected to the horizontal direction by a roller 428. Next, the aluminum plate 416 is negatively (−) charged by an electrolytic electrode 430 so that an anodized film is formed on the surface thereof, and the aluminum plate 416 coming out of the electrolytic treatment tank 414 is transported to the next step. In the anodizing device 410, direction changing unit is formed of the roller 422, the nip roller 424, and the roller 428. The aluminum plate 416 is transported in a mountain shape and an inverted U shape by the roller 422, the nip roller 424, and the roller 428 in an inter-tank portion between the power supply tank 412 and the electrolytic treatment tank 414. The power supply electrode 420 and the electrolytic electrode 430 are connected to a DC power source 434.

(A-g) Pore Widening Treatment

The aluminum plate after being subjected to the anodizing treatment was subjected to a pore widening treatment by being immersed in a caustic soda aqueous solution in which the concentration of caustic soda was 5% by mass and the concentration of aluminum ions was 0.5% by mass at a temperature of 28° C. for 3 seconds (support 2), at a temperature of 40° C. for 3 seconds (support 3), and at a temperature of 40° C. for 15 seconds (support 4). Thereafter, washing with water by spraying was performed. The average diameters of micropores of surfaces on the printing surface side of the supports 2, 3, and 4 were respectively 13 nm, 30 nm, and 100 nm.

<Production of support 5>

An aluminum plate (aluminum alloy plate) of a material 1S, having a thickness of 0.3 mm, was subjected to the following treatments (B-a) to (B-h), thereby producing a support 5. Moreover, during all treatment steps, a water washing treatment was performed, and liquid cutting was performed using a nip roller after the water washing treatment.

(B-a) Alkali Etching Treatment

The aluminum plate was subjected to an etching treatment by spraying a caustic soda aqueous solution in which the concentration of caustic soda was 26% by mass and the concentration of aluminum ions was 6.5% by mass using a spray at a temperature of 70° C. The dissolved aluminum amount of the surface to be subjected to an electrochemical roughening treatment was 5 g/m².

(B-b) Desmutting Treatment Using Acidic Aqueous Solution

A desmutting treatment was performed by spraying, as an acidic aqueous solution, an aqueous solution at a solution temperature of 30° C. with a sulfuric acid concentration of 150 g/L to the aluminum plate for 3 seconds.

(B-c) Electrochemical Roughening Treatment Using Hydrochloric Acid Aqueous Solution An electrochemical roughening treatment was performed using the AC current and an electrolyte having a hydrochloric acid concentration of 14 g/L, an aluminum ion concentration of 13 g/L, and a sulfuric acid concentration of 3 g/L. The solution temperature of the electrolyte was 30° C. The aluminum ion concentration was adjusted by adding aluminum chloride.

The waveform of the AC current was a sine wave in which the positive and negative waveforms were symmetrical, the frequency was 50 Hz, the ratio between the anodic reaction time and the cathodic reaction time in one cycle of the AC current was 1:1, and the current density was 75 A/dm² in terms of the peak current value of the AC current waveform. Further, the sum total of electric quantity of the aluminum plate used for the anodic reaction was 450 C/dm², and the electrolytic treatment was performed four times at energization intervals of 4 seconds for each of the electric quantity of 112.5 C/dm². A carbon electrode was used as a counter electrode of the aluminum plate.

(B-d) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray at a temperature of 45° C. The dissolved aluminum amount of the surface to be subjected to an electrochemical roughening treatment was 0.2 g/m².

(B-e) Desmutting Treatment Using Acidic Aqueous Solution

A desmutting treatment was performed by spraying, as an acidic aqueous solution, a waste liquid at a solution temperature of 30° C. (aqueous solution with a sulfuric acid concentration of 170 g/L and an aluminum ion concentration of 5 g/L), which was generated in the anodizing treatment step, to the aluminum plate for 3 seconds.

(B-f) First Step of Anodizing Treatment

A first step of an anodizing treatment was performed with an anodizing device using DC electrolysis having the structure shown in FIG. 3. The aluminum plate was subjected to an anodizing treatment at a solution temperature of 50° C. and a current density of 30A/dm² using a 170 g/L of sulfuric acid aqueous solution as an electrolyte, thereby forming an anodized film having a coating amount of 0.3 g/m².

(B-g) Pore Widening Treatment

The aluminum plate after being subjected to the anodizing treatment was subjected to a pore widening treatment by being immersed in a caustic soda aqueous solution in which the concentration of caustic soda was 5% by mass and the concentration of aluminum ions was 0.5% by mass at a temperature of 40° C. for 3 seconds.

(B-h) Second Step of Anodizing Treatment

A second step of an anodizing treatment was performed with an anodizing device using DC electrolysis having the structure shown in FIG. 3. The aluminum plate was subjected to an anodizing treatment at a solution temperature of 50° C. and a current density of 13A/dm² using a 170 g/L of sulfuric acid aqueous solution as an electrolyte, thereby forming an anodized film having a coating amount of 2.1 g/m². Thereafter, washing with water by spraying was performed. The average diameter of micropores of a surface on the printing surface side of the support 5 was 30 nm.

<Production of Support 6>

An aluminum plate (aluminum alloy plate) of a material 1S, having a thickness of 0.3 mm, was subjected to the following treatments (D-a) to (D-l), thereby producing a support 6. Moreover, during all treatment steps, a water washing treatment was performed, and liquid cutting was performed using a nip roller after the water washing treatment.

(D-a) Mechanical Roughening Treatment (Brush Grain Method)

Figure 5:
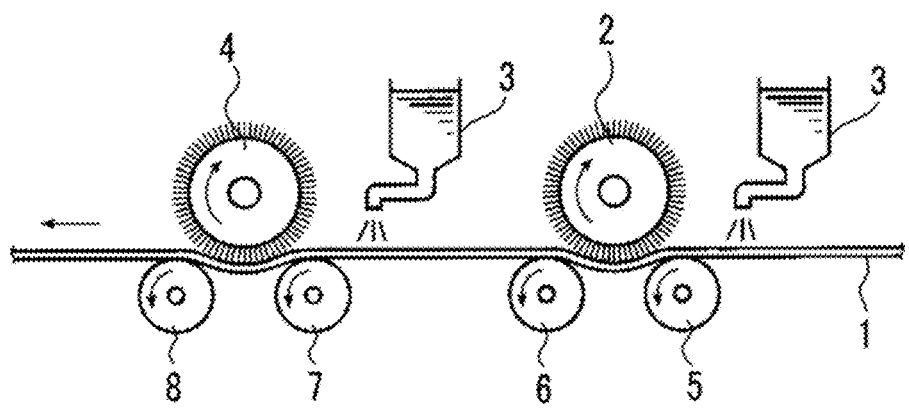
FIG. 5 is a side view illustrating the concept of a brush graining step used in a mechanical roughening treatment in production of an aluminum support.

Using the device having a structure shown in FIG. 5, while supplying a suspension of pumice (specific gravity of 1.1 g/cm$^3$) to the surface of an aluminum plate as a polishing slurry liquid, a mechanical roughening treatment was performed using rotating bundle bristle brushes. In FIG. 5, the reference numeral 1 represents an aluminum plate, the reference numerals 2 and 4 represent roller-like brushes (in the present examples, bundle bristle brushes), the reference numeral 3 represents a polishing slurry liquid, and the reference numerals 5, 6, 7, and 8 represent a support roller.

The mechanical roughening treatment is performed under conditions in which the median diameter (μm) of a polishing material was 30 μm, the number of the brushes was four, and the rotation speed (rpm) of the brushes was set to 250 rpm. The material of the bundle bristle brushes was nylon 6·10, the diameter of the brush bristles was 0.3 mm, and the bristle length was 50 mm. The brushes were produced by implanting bristles densely into holes in a stainless steel cylinder having a diameter of φ$^{300}$ mm. The distance between two support rollers (φ200 mm) of the lower portion of the bundle bristle brushes was 300 mm. The bundle bristle brushes were pressed until the load of a driving motor for rotating the brushes became 10 kW plus with respect to the load before the bundle bristle brushes were pressed against the aluminum plate. The rotation direction of the brush was the same as the moving direction of the aluminum plate.

(D-b) Alkali Etching Treatment

The aluminum plate was subjected to an etching treatment by spraying a caustic soda aqueous solution in which the concentration of caustic soda was 26% by mass and the concentration of aluminum ions was 6.5% by mass using a spray at a temperature of 70° C. The dissolved aluminum amount of the surface to be subjected to an electrochemical roughening treatment was 10 g/m$^2$.

(D-c) Desmutting Treatment Using Acidic Aqueous Solution

A desmutting treatment was performed by spraying, as an acidic aqueous solution, a waste liquid of nitric acid at a solution temperature of 35° C., to be used for the electrochemical roughening treatment in the next step, to the aluminum plate for 3 seconds.

(D-d) Electrochemical Roughening Treatment Using Nitric Acid Aqueous Solution

An electrochemical roughening treatment was continuously performed using an AC voltage of 60 Hz. An electrolyte which had been adjusted to have a concentration of aluminum ions of 4.5 g/L by adding aluminum nitrate to a nitric acid aqueous solution having a concentration of 10.4 g/L at a solution temperature of 35° C. was used. Using a trapezoidal rectangular waveform AC having a time tp, until the current value reached a peak from zero, of 0.8 msec and the duty ratio of 1:1 as an AC power source waveform which is a waveform shown in FIG. 1, the electrochemical roughening treatment was performed using a carbon electrode as a counter electrode. As an auxiliary anode, ferrite was used. As an electrolytic cell, the electrolytic cell having a structure shown in FIG. 2 was used. The current density was 30 A/dm$^2$ as the peak current value, and 5% of the current from the power source was separately flowed to the auxiliary anode. The electric quantity (C/dm$^2$) was 185 C/dm$^2$ as the sum total of electric quantity in a case of anodization of the aluminum plate.

(D-e) Alkali Etching Treatment

The aluminum plate was subjected to an etching treatment by spraying a caustic soda aqueous solution in which the concentration of caustic soda was 27% by mass and the concentration of aluminum ions was 2.5% by mass using a spray at a temperature of 50° C. The amount of aluminum dissolved was 0.5 g/m$^2$.

(D-f) Desmutting Treatment Using Acidic Aqueous Solution

A desmutting treatment was performed by spraying, as an acidic aqueous solution, an aqueous solution with a sulfuric acid concentration of 170 g/L and an aluminum ion concentration of 5 g/L at a solution temperature of 30° C. to the aluminum plate for 3 seconds.

(D-g) Electrochemical Roughening Treatment Using Hydrochloric Acid Aqueous Solution An electrochemical roughening treatment was continuously performed using an AC voltage of 60 Hz. An electrolyte which had been adjusted to have a concentration of aluminum ions of 4.5 g/L by adding aluminum chloride to a hydrochloric acid aqueous solution having a concentration of 6.2 g/L, and of which the solution temperature was 35° C. was used. Using a trapezoidal rectangular waveform AC having a time tp, until the current value reached a peak from zero, of 0.8 msec and the duty ratio of 1:1 as an AC power source waveform which is a waveform shown in FIG. 1, the electrochemical roughening treatment was performed using a carbon electrode as a counter electrode. As an auxiliary anode, ferrite was used. As an electrolytic cell, the electrolytic cell having a structure shown in FIG. 2 was used. The current density was 25 A/dm$^2$ as the peak current value, and the electric quantity (C/dm$^2$) in the hydrochloric acid electrolysis was 63 C/dm$^2$ as the sum total of electric quantity in a case of anodization of the aluminum plate.

(D-h) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray at a temperature of 60° C. The amount of aluminum dissolved was 0.1 g/m$^2$.

(D-i) Desmutting Treatment Using Acidic Aqueous Solution

A desmutting treatment was performed by spraying, as an acidic aqueous solution, a waste liquid at a solution temperature of 35° C. (aqueous solution with a sulfuric acid concentration of 170 g/L and an aluminum ion concentration of 5 g/L), which was generated in the anodizing treatment step, to the aluminum plate for 4 seconds.

(D-j) Anodizing Treatment

An anodizing treatment was performed with an anodizing device using DC electrolysis having the structure shown in FIG. 3. The aluminum plate was subjected to an anodizing treatment at a solution temperature of 50° C. and a current density of 30A/dm$^2$ using a 170 g/L of sulfuric acid aqueous solution as an electrolyte, thereby forming an anodized film having a coating amount of 2.4 g/m$^2$.

(D-k) Pore Widening Treatment

The aluminum plate after being subjected to the anodizing treatment was subjected to a pore widening treatment by being immersed in a caustic soda aqueous solution in which the concentration of caustic soda was 5% by mass and the concentration of aluminum ions was 0.5% by mass at a temperature of 40° C. for 3 seconds. The average diameter of micropores of a surface on the printing surface side of the aluminum support was 30 nm.

(D-l) Hydrophilization Treatment

In order to ensure hydrophilicity of a non-image area, the aluminum plate area was subjected to a silicate treatment by being immersed in a 2.5% by mass of No. 3 sodium silicate aqueous solution at 50° C. for 7 seconds. The adhesion amount of Si was 8.5 mg/m². Thereafter, washing with water by spraying was performed.

<Production of Support 7>

An aluminum plate (aluminum alloy plate) of a material 1S, having a thickness of 0.3 mm, was subjected to the following treatments (F-a) to (F-g), thereby producing a support 7. Moreover, during all treatment steps, a water washing treatment was performed, and liquid cutting was performed using a nip roller after the water washing treatment.

(F-a) Alkali Etching Treatment

The aluminum plate was subjected to an etching treatment by spraying a caustic soda aqueous solution in which the concentration of caustic soda was 26% by mass and the concentration of aluminum ions was 6.5% by mass using a spray at a temperature of 70° C. The dissolved aluminum amount of the surface to be subjected to an electrochemical roughening treatment was 5 g/m².

(F-b) Desmutting Treatment Using Acidic Aqueous Solution

A desmutting treatment was performed by spraying, as an acidic aqueous solution, an aqueous solution at a solution temperature of 30° C. with a sulfuric acid concentration of 150 g/L to the aluminum plate for 3 seconds.

(F-c) Electrochemical Roughening Treatment

An electrochemical roughening treatment was performed using the AC current and an electrolyte having a hydrochloric acid concentration of 14 g/L, an aluminum ion concentration of 13 g/L, and a sulfuric acid concentration of 3 g/L. The solution temperature of the electrolyte was 30° C. The aluminum ion concentration was adjusted by adding aluminum chloride.

The waveform of the AC current was a sine wave in which the positive and negative waveforms were symmetrical, the frequency was 50 Hz, the ratio between the anodic reaction time and the cathodic reaction time in one cycle of the AC current was 1:1, and the current density was 75 A/dm² in terms of the peak current value of the AC current waveform. Further, the sum total of electric quantity of the aluminum plate used for the anodic reaction was 450 C/dm², and the electrolytic treatment was performed four times at energization intervals of 4 seconds for each of the electric quantity of 112.5 C/dm². A carbon electrode was used as a counter electrode of the aluminum plate.

(F-d) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray at a temperature of 45° C. The dissolved aluminum amount of the surface to be subjected to an electrochemical roughening treatment was 0.2 g/m².

(F-e) Desmutting Treatment Using Acidic Aqueous Solution

A desmutting treatment was performed by spraying, as an acidic aqueous solution, an aqueous solution with a sulfuric acid concentration of 170 g/L and an aluminum ion concentration of 5 g/L at a solution temperature of 35° C. to the aluminum plate for 3 seconds.

(F-f) First Step of Anodizing Treatment

A first step of an anodizing treatment was performed with an anodizing device using DC electrolysis having the structure shown in FIG. 3. The aluminum plate was subjected to an anodizing treatment at a solution temperature of 35° C. and a current density of 4.5A/dm² using a 150 g/L of phosphoric acid aqueous solution as an electrolyte, thereby forming an anodized film having a coating amount of 1 g/m².

(F-g) Second Step of Anodizing Treatment

A second step of an anodizing treatment was performed with an anodizing device using DC electrolysis having the structure shown in FIG. 3. The aluminum plate was subjected to an anodizing treatment at a solution temperature of 50° C. and a current density of 13A/dm² using a 170 g/L of sulfuric acid aqueous solution as an electrolyte, thereby forming an anodized film having a coating amount of 2.1 g/m². Thereafter, washing with water by spraying was performed. The average diameter of micropores of a surface on the printing surface side of the support 7 was 40 nm.

<Production of Support 8>

An aluminum plate (aluminum alloy plate) of a material 1S, having a thickness of 0.3 mm, was subjected to the following treatments (G-a) to (G-h), thereby producing a support 8. Moreover, during all treatment steps, a water washing treatment was performed, and liquid cutting was performed using a nip roller after the water washing treatment.

(G-a) Alkali Etching Treatment

The aluminum plate was subjected to an etching treatment by spraying a caustic soda aqueous solution in which the concentration of caustic soda was 26% by mass and the concentration of aluminum ions was 6.5% by mass using a spray at a temperature of 70° C. The dissolved aluminum amount of the surface to be subjected to an electrochemical roughening treatment was 5 g/m².

(G-b) Desmutting Treatment Using Acidic Aqueous Solution

A desmutting treatment was performed by spraying, as an acidic aqueous solution, an aqueous solution at a solution temperature of 30° C. with a sulfuric acid concentration of 150 g/L to the aluminum plate for 3 seconds.

(G-c) Electrochemical Roughening Treatment

An electrochemical roughening treatment was performed using the AC current and an electrolyte having a hydrochloric acid concentration of 14 g/L, an aluminum ion concentration of 13 g/L, and a sulfuric acid concentration of 3 g/L. The solution temperature of the electrolyte was 30° C. The aluminum ion concentration was adjusted by adding aluminum chloride.

The waveform of the AC current was a sine wave in which the positive and negative waveforms were symmetrical, the frequency was 50 Hz, the ratio between the anodic reaction time and the cathodic reaction time in one cycle of the AC current was 1:1, and the current density was 75 A/dm² in terms of the peak current value of the AC current waveform. Further, the sum total of electric quantity of the aluminum plate used for the anodic reaction was 450 C/dm², and the electrolytic treatment was performed four times at energization intervals of 4 seconds for each of the electric quantity of 112.5 C/dm². A carbon electrode was used as a counter electrode of the aluminum plate.

(G-d) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray at a temperature of 45° C. The dissolved aluminum amount of the surface to be subjected to an electrochemical roughening treatment was 0.2 g/m².

(G-e) Desmutting Treatment Using Acidic Aqueous Solution

A desmutting treatment was performed by spraying, as an acidic aqueous solution, an aqueous solution with a sulfuric acid concentration of 170 g/L and an aluminum ion concentration of 5 g/L at a solution temperature of 35° C. to the aluminum plate for 3 seconds.

(G-f) First Step of Anodizing Treatment

A first step of an anodizing treatment was performed with an anodizing device using DC electrolysis having the structure shown in FIG. 3. The aluminum plate was subjected to an anodizing treatment at a solution temperature of 35° C. and a current density of 4.5A/dm² using a 150 g/L of phosphoric acid aqueous solution as an electrolyte, thereby forming an anodized film having a coating amount of 1 g/m².

(G-g) Pore Widening Treatment

The aluminum plate after being subjected to the anodizing treatment was subjected to a pore widening treatment by being immersed in a caustic soda aqueous solution in which the concentration of caustic soda was 5% by mass and the concentration of aluminum ions was 0.5% by mass at a temperature of 40° C. for 4 seconds.

(G-h) Second Step of Anodizing Treatment

A second step of an anodizing treatment was performed with an anodizing device using DC electrolysis having the structure shown in FIG. 3. The aluminum plate was subjected to an anodizing treatment at a solution temperature of 50° C. and a current density of 13A/dm² using a 170 g/L of sulfuric acid aqueous solution as an electrolyte, thereby forming an anodized film having a coating amount of 2.1 g/m². Thereafter, washing with water by spraying was performed. The average diameter of micropores of a surface on the printing surface side of the support 8 was 100 nm.

<Production of Support 9>

An aluminum plate (aluminum alloy plate) of a material 1S, having a thickness of 0.3 mm, was subjected to the following treatments (H-a) to (H-g), thereby producing a support 9. Moreover, during all treatment steps, a water washing treatment was performed, and liquid cutting was performed using a nip roller after the water washing treatment.

(H-a) Alkali Etching Treatment

The aluminum plate was subjected to an etching treatment by spraying a caustic soda aqueous solution in which the concentration of caustic soda was 26% by mass and the concentration of aluminum ions was 6.5% by mass using a spray at a temperature of 70° C. The dissolved aluminum amount of the surface to be subjected to an electrochemical roughening treatment was 5 g/m².

(H-b) Desmutting Treatment Using Acidic Aqueous Solution

A desmutting treatment was performed by spraying, as an acidic aqueous solution, an aqueous solution at a solution temperature of 30° C. with a sulfuric acid concentration of 150 g/L to the aluminum plate for 3 seconds.

(H-c) Electrochemical Roughening Treatment

An electrochemical roughening treatment was performed using the AC current and an electrolyte having a hydrochloric acid concentration of 14 g/L, an aluminum ion concentration of 13 g/L, and a sulfuric acid concentration of 3 g/L. The solution temperature of the electrolyte was 30° C. The aluminum ion concentration was adjusted by adding aluminum chloride.

The waveform of the AC current was a sine wave in which the positive and negative waveforms were symmetrical, the frequency was 50 Hz, the ratio between the anodic reaction time and the cathodic reaction time in one cycle of the AC current was 1:1, and the current density was 75 A/dm² in terms of the peak current value of the AC current waveform. Further, the sum total of electric quantity of the aluminum plate used for the anodic reaction was 450 C/dm², and the electrolytic treatment was performed four times at energization intervals of 4 seconds for each of the electric quantity of 112.5 C/dm². A carbon electrode was used as a counter electrode of the aluminum plate.

(H-d) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray at a temperature of 45° C. The dissolved aluminum amount of the surface to be subjected to an electrochemical roughening treatment was 0.2 g/m².

(H-e) Desmutting Treatment Using Acidic Aqueous Solution

A desmutting treatment was performed by spraying, as an acidic aqueous solution, an aqueous solution with a sulfuric acid concentration of 170 g/L and an aluminum ion concentration of 5 g/L at a solution temperature of 35° C. to the aluminum plate for 3 seconds.

(H-f) First Step of Anodizing Treatment

A first step of an anodizing treatment was performed with an anodizing device using DC electrolysis having the structure shown in FIG. 3. The aluminum plate was subjected to an anodizing treatment at a solution temperature of 35° C. and a current density of 4.5A/dm² using a 150 g/L of phosphoric acid aqueous solution as an electrolyte, thereby forming an anodized film having a coating amount of 1 g/m².

(H-g) Second Step of Anodizing Treatment

The aluminum plate was subjected to an anodizing treatment at a solution temperature of 35° C. and a current density of 4.5A/dm² using a 150 g/L of phosphoric acid aqueous solution as an electrolyte, thereby forming an anodized film having a coating amount of 1.2 g/m². Thereafter, washing with water by spraying was performed. The average diameter of micropores of a surface on the printing surface side of the support 9 was 40 nm.

<Production of Support 10>

An aluminum plate (aluminum alloy plate) of a material 1S, having a thickness of 0.3 mm, was subjected to the following treatments (I-a) to (I-h), thereby producing a support 10. Moreover, during all treatment steps, a water washing treatment was performed, and liquid cutting was performed using a nip roller after the water washing treatment.

(I-a) Alkali Etching Treatment

The aluminum plate was subjected to an etching treatment by spraying a caustic soda aqueous solution in which the concentration of caustic soda was 26% by mass and the concentration of aluminum ions was 6.5% by mass using a spray at a temperature of 70° C. The dissolved aluminum amount of the surface to be subjected to an electrochemical roughening treatment was 5 g/m².

(I-b) Desmutting Treatment Using Acidic Aqueous Solution

A desmutting treatment was performed by spraying, as an acidic aqueous solution, an aqueous solution at a solution temperature of 30° C. with a sulfuric acid concentration of 150 g/L to the aluminum plate for 3 seconds.

(I-c) Electrochemical Roughening Treatment

An electrochemical roughening treatment was performed using the AC current and an electrolyte having a hydrochloric acid concentration of 14 g/L, an aluminum ion concentration of 13 g/L, and a sulfuric acid concentration of 3 g/L. The solution temperature of the electrolyte was 30° C. The aluminum ion concentration was adjusted by adding aluminum chloride.

The waveform of the AC current was a sine wave in which the positive and negative waveforms were symmetrical, the frequency was 50 Hz, the ratio between the anodic reaction time and the cathodic reaction time in one cycle of the AC current was 1:1, and the current density was 75 A/dm$^2$ in terms of the peak current value of the AC current waveform. Further, the sum total of electric quantity of the aluminum plate used for the anodic reaction was 450 C/dm$^2$, and the electrolytic treatment was performed four times at energization intervals of 4 seconds for each of the electric quantity of 112.5 C/dm$^2$. A carbon electrode was used as a counter electrode of the aluminum plate.

(I-d) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray at a temperature of 45° C. The dissolved aluminum amount of the surface to be subjected to an electrochemical roughening treatment was 0.2 g/m$^2$.

(I-e) Desmutting Treatment Using Acidic Aqueous Solution

A desmutting treatment was performed by spraying, as an acidic aqueous solution, an aqueous solution with a sulfuric acid concentration of 170 g/L and an aluminum ion concentration of 5 g/L at a solution temperature of 35° C. to the aluminum plate for 3 seconds.

(I-f) First Step of Anodizing Treatment

A first step of an anodizing treatment was performed with an anodizing device using DC electrolysis having the structure shown in FIG. 3. The aluminum plate was subjected to an anodizing treatment at a solution temperature of 35° C. and a current density of 4.5A/dm$^2$ using a 150 g/L of phosphoric acid aqueous solution as an electrolyte, thereby forming an anodized film having a coating amount of 1 g/m$^2$.

(I-g) Pore Widening Treatment

The aluminum plate after being subjected to the anodizing treatment was subjected to a pore widening treatment by being immersed in a caustic soda aqueous solution in which the concentration of caustic soda was 5% by mass and the concentration of aluminum ions was 0.5% by mass at a temperature of 40° C. for 8 seconds.

(I-h) Second Step of Anodizing Treatment

A second step of an anodizing treatment was performed with an anodizing device using DC electrolysis having the structure shown in FIG. 3. The aluminum plate was subjected to an anodizing treatment at a solution temperature of 35° C. and a current density of 4.5A/dm$^2$ using a 150 g/L of phosphoric acid aqueous solution as an electrolyte, thereby forming an anodized film having a coating amount of 2.1 g/m$^2$. Thereafter, washing with water by spraying was performed. The average diameter of micropores of a surface on the printing surface side of the support 10 was 148 nm.

<Production of Support 11>

An aluminum plate (aluminum alloy plate) of a material 1S, having a thickness of 0.3 mm, was subjected to the following treatments (A-a) to (A-g), thereby producing a support 11. Moreover, during all treatment steps, a water washing treatment was performed, and liquid cutting was performed using a nip roller after the water washing treatment.

(A-a) Alkali Etching Treatment

The aluminum plate was subjected to an etching treatment by spraying a caustic soda aqueous solution in which the concentration of caustic soda was 26% by mass and the concentration of aluminum ions was 6.5% by mass using a spray at a temperature of 70° C. The dissolved aluminum amount of the surface to be subjected to an electrochemical roughening treatment was 5 g/m$^2$.

(A-b) Desmutting Treatment Using Acidic Aqueous Solution

A desmutting treatment was performed by spraying, as an acidic aqueous solution, an aqueous solution at a solution temperature of 30° C. with a sulfuric acid concentration of 150 g/L to the aluminum plate for 3 seconds.

(A-c) Electrochemical Roughening Treatment Using Hydrochloric Acid Aqueous Solution An electrochemical roughening treatment was performed using the AC current and an electrolyte having a hydrochloric acid concentration of 14 g/L, an aluminum ion concentration of 13 g/L, and a sulfuric acid concentration of 3 g/L. The solution temperature of the electrolyte was 30° C. The aluminum ion concentration was adjusted by adding aluminum chloride.

The waveform of the AC current was a sine wave in which the positive and negative waveforms were symmetrical, the frequency was 50 Hz, the ratio between the anodic reaction time and the cathodic reaction time in one cycle of the AC current was 1:1, and the current density was 75 A/dm$^2$ in terms of the peak current value of the AC current waveform. Further, the sum total of electric quantity of the aluminum plate used for the anodic reaction was 450 C/dm$^2$, and the electrolytic treatment was performed four times at energization intervals of 4 seconds for each of the electric quantity of 112.5 C/dm$^2$. A carbon electrode was used as a counter electrode of the aluminum plate.

(A-d) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray at a temperature of 45° C. The dissolved aluminum amount of the surface to be subjected to an electrochemical roughening treatment was 0.2 g/m$^2$.

(A-e) Desmutting Treatment Using Acidic Aqueous Solution

A desmutting treatment was performed by spraying, as an acidic aqueous solution, a waste liquid at a solution temperature of 30° C. (aqueous solution with a sulfuric acid concentration of 170 g/L and an aluminum ion concentration of 5 g/L), which was generated in the anodizing treatment step, to the aluminum plate for 3 seconds.

(A-f) Anodizing Treatment

An anodizing treatment was performed with an anodizing device using DC electrolysis having the structure shown in FIG. 3. The aluminum plate was subjected to an anodizing treatment at a solution temperature of 50° C. and a current density of 30A/dm$^2$ using a 170 g/L of sulfuric acid aqueous solution as an electrolyte, thereby forming an anodized film having a coating amount of 2.4 g/m$^2$.

An aluminum plate 416 in an anodizing device 410 illustrated in FIG. 3 is transported as indicated by the arrow in FIG. 3. The aluminum plate 416 is positively (+) charged by a power supply electrode 420 in a power supply tank 412 in which an electrolyte 418 is stored. Further, the aluminum plate 416 is transported upward by a roller 422 in the power supply tank 412, redirected downward by a nip roller 424, transported toward an electrolytic treatment tank 414 in which an electrolyte 426 was stored, and redirected to the horizontal direction by a roller 428. Next, the aluminum plate 416 is negatively (−) charged by an electrolytic electrode 430 so that an anodized film is formed on the surface thereof, and the aluminum plate 416 coming out of the electrolytic treatment tank 414 is transported to the next step. In the anodizing device 410, direction changing unit is formed of the roller 422, the nip roller 424, and the roller 428. The aluminum plate 416 is transported in a mountain shape and an inverted U shape by the roller 422, the nip roller 424, and the roller 428 in an inter-tank portion between the power supply tank 412 and the electrolytic treatment tank 414. The power supply electrode 420 and the electrolytic electrode 430 are connected to a DC power source 434.

(A-g) Pore Widening Treatment

The aluminum plate after being subjected to the anodizing treatment was subjected to a pore widening treatment by being immersed in a caustic soda aqueous solution in which the concentration of caustic soda was 5% by mass and the concentration of aluminum ions was 0.5% by mass at a temperature of 40° C. for 3 seconds. Thereafter, washing with water by spraying was performed. The average diameter of micropores of a surface on the printing surface side of the support 11 was 30 nm.

<Production of Support 12>

An aluminum alloy plate having a thickness of 0.3 mm and having a composition listed in Table 1 was subjected to the following treatments (a) to (m), thereby producing a support 12. Moreover, during all treatment steps, a water washing treatment was performed, and liquid cutting was performed using a nip roller after the water washing treatment.

TABLE 1

| Composition (% by mass) | | | | | | | |
|---|---|---|---|---|---|---|---|
| Si | Fe | Cu | Mn | Mg | Zn | Ti | Al |
| 0.085 | 0.303 | 0.037 | 0 | 0 | 0 | 0.018 | Remainder |

(a) Mechanical Roughening Treatment (Brush Grain Method)

While supplying a suspension of pumice (specific gravity of 1.1 g/cm$^3$) to the surface of an aluminum plate as a polishing slurry liquid, a mechanical roughening treatment was performed using rotating bundle bristle brushes.

The mechanical roughening treatment was performed under conditions in which the median diameter of a polishing material pumice was 30 μm, the number of the bundle bristle brushes was four, and the rotation speed of the bundle bristle brushes was set to 250 rpm. The material of the bundle bristle brushes was nylon 6·10, the diameter of the brush bristles was 0.3 mm, and the bristle length was 50 mm. The bundle bristle brushes were produced by implanting bristles densely into holes in a stainless steel cylinder having a diameter of φ300 mm. The distance between two support rollers (φ200 mm) of the lower portion of the bundle bristle brushes was 300 mm. The bundle bristle brushes were pressed until the load of a driving motor for rotating the brushes became 10 kW plus with respect to the load before the bundle bristle brushes were pressed against the aluminum plate. The rotation direction of the bundle bristle brushes was the same as the moving direction of the aluminum plate.

(b) Alkali Etching Treatment

The aluminum plate was subjected to an etching treatment by spraying a caustic soda aqueous solution in which the concentration of caustic soda was 26% by mass and the concentration of aluminum ions was 6.5% by mass using a spray tube at a temperature of 70° C. The amount of aluminum dissolved was 10 g/m$^2$.

(c) Desmutting Treatment in Acidic Aqueous Solution

A desmutting treatment was performed in a nitric acid aqueous solution. As the nitric acid aqueous solution used in the desmutting treatment, a nitric acid electrolyte used in electrochemical roughening of the subsequent step was used. The solution temperature was 35° C. The desmutting treatment was performed for 3 seconds by spraying the desmutting liquid using a spray.

(d) Electrochemical Roughening Treatment

An electrochemical roughening treatment was continuously performed using an AC voltage of 60 Hz. An electrolyte which had been adjusted to have a concentration of aluminum ions of 4.5 g/L by adding aluminum nitrate to a nitric acid aqueous solution having a concentration of 10.4 g/L at a temperature of 35° C. was used. Using a trapezoidal rectangular waveform AC having a time tp, until the current value reached a peak from zero, of 0.8 msec and the duty ratio of 1:1 as the AC power source waveform, the electrochemical roughening treatment was performed using a carbon electrode as a counter electrode. As an auxiliary anode, ferrite was used. The current density was 30 A/dm$^2$ as the peak current value, and 5% of the current from the power source was separately flowed to the auxiliary anode. The electric quantity was 185 C/dm$^2$ as the sum total of electric quantity in a case of anodization of the aluminum plate.

(e) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray tube at a temperature of 50° C. The amount of aluminum dissolved was 0.5 g/m$^2$.

(f) Desmutting Treatment in Acidic Aqueous Solution

A desmutting treatment was performed by spraying, as an acidic aqueous solution, a sulfuric acid aqueous solution with a sulfuric acid concentration of 170 g/L and an aluminum ion concentration of 5 g/L at a solution temperature of 60° C. to the aluminum plate for 3 seconds.

(g) Electrochemical Roughening Treatment

An electrochemical roughening treatment was continuously performed using an AC voltage of 60 Hz. An electrolyte which had been adjusted to have a concentration of aluminum ions of 4.5 g/L by adding aluminum chloride to a hydrochloric acid aqueous solution having a concentration of 6.2 g/L at a solution temperature of 35° C. was used. Using a trapezoidal rectangular waveform AC having a time tp, until the current value reached a peak from zero, of 0.8 msec and the duty ratio of 1:1 as the AC power source waveform, the electrochemical roughening treatment was performed using a carbon electrode as a counter electrode. As an auxiliary anode, ferrite was used. The current density was 25 A/dm$^2$ as the peak current value, and the electric quantity in the hydrochloric acid electrolysis was 63 C/dm$^2$ as the sum total of electric quantity in a case of anodization of the aluminum plate.

(h) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray tube at a temperature of 50° C. The amount of aluminum dissolved was 0.1 g/m².

(i) Desmutting Treatment in Acidic Aqueous Solution

A desmutting treatment was performed by spraying, as an acidic aqueous solution, a sulfuric acid aqueous solution at a solution temperature of 35° C. (containing 5 g/L of aluminum ions in an aqueous solution of 170 g/L of sulfuric acid), which was generated in the anodizing treatment step, to the aluminum plate for 3 seconds.

(j) First Anodizing Treatment

A first step of an anodizing treatment was performed with an anodizing device using DC electrolysis. An anodized film having a predetermined film thickness was formed by performing an anodizing treatment under conditions listed in Table 2. An aqueous solution containing components listed in Table 2 was used as the electrolyte. In Tables 2 to 4, the "component concentration" indicates the concentration (g/L) of each component described in the column of "solution component".

TABLE 2

| | | First anodizing treatment | | | | |
|---|---|---|---|---|---|---|
| Solution type | Solution component | Component concentration (g/L) | Temperature (° C.) | Current density (A/dm²) | Time (s) | Film thickness (nm) |
| Sulfuric acid | $H_2SO_4$/Al | 170/5 | 55 | 90 | 0.40 | 110 |

(k) Second Anodizing Treatment

A second step of an anodizing treatment was performed with an anodizing device using DC electrolysis. An anodized film having a predetermined film thickness was formed by performing an anodizing treatment under conditions listed in Table 3. An aqueous solution containing components listed in Table 3 was used as the electrolyte.

TABLE 3

| | | Second anodizing treatment | | | | |
|---|---|---|---|---|---|---|
| Solution type | Solution component | Component concentration (g/L) | Temperature (° C.) | Current density (A/dm²) | Time (s) | Film thickness (nm) |
| Sulfuric acid | $H_2SO_4$/Al | 170/5 | 54 | 15 | 13 | 900 |

(l) Third Anodizing Treatment

A third step of an anodizing treatment was performed with an anodizing device using DC electrolysis. An anodized film having a predetermined film thickness was formed by performing an anodizing treatment under conditions listed in Table 4. An aqueous solution containing components listed in Table 4 was used as the electrolyte.

TABLE 4

| | | Third anodizing treatment | | | | |
|---|---|---|---|---|---|---|
| Solution type | Solution component | Component concentration (g/L) | Temperature (° C.) | Current density (A/dm²) | Time (s) | Film thickness (nm) |
| Sulfuric acid | $H_2SO_4$/Al | 170/5 | 54 | 50 | 0.4 | 100 |

(m) Hydrophilization treatment

In order to ensure hydrophilicity of a non-image area, the non-image area was subjected to a silicate treatment by being dipped in a 2.5% by mass of No. 3 sodium silicate aqueous solution at 50° C. for 7 seconds. Thereafter, washing with water by spraying was performed. The adhesion amount of Si was 8.5 mg/m².

The average diameter (average diameter of surface layer) of a large-diameter hole portion on the surface of the anodized film having micropores obtained in the above-described manner, the average diameter (average diameter of bottom portion) of the large-diameter hole portion in a communicating position, the average diameter (diameter of small-diameter hole portion) of a small-diameter hole portion in the communicating position, the average depth of the large-diameter hole portion and the small-diameter hole portion, the thickness (thickness of barrier layer) of the anodized film from the bottom portion of the small-diameter hole portion to the surface of the aluminum plate, the density of the small-diameter hole portion, and the like are listed in Tables 5 and 6. The small-diameter hole portion includes a first small-diameter hole portion and a second small-diameter hole portion with depths different from each other and a small-diameter hole portion which is deeper than the other is referred to as the first small-diameter hole portion.

TABLE 5

| Micropores | | | | | |
|---|---|---|---|---|---|
| Large-diameter hole portion | | | | | |
| Average diameter of surface layer (nm) | Average diameter of bottom portion (nm) | Average depth (nm) | Average depth/ Average diameter of surface layer | Average diameter/ Average depth/ of bottom portion | Shape |
| 12 | 25 | 98 | 8.2 | 3.9 | Reversed tapered shape |

TABLE 6

| | | Micropores | | | | | |
|---|---|---|---|---|---|---|---|
| | | Small-diameter hole portion | | | | | Ratio (average |
| Average diameter (nm) | Average depth (nm) | Density of communication portion (particles/um2) | Average thickness of barrier layer (nm) | Minimum thickness of barrier layer (nm) | Density of micropores (particles/um2) | Increase magnification of surface area | diameter of surface layer/diameter of small-diameter hole portion) |
| 9.8 | 888, 968 | 800 (650) | 17 | 16 | 500 | 4.0 | 1.22 |

In Table 6, the average value and the minimum value of the barrier layer thickness are shown. The average value is obtained by measuring 50 thicknesses of the anodized film from the bottom portion of the first small-diameter hole portion to the surface of the aluminum plate and arithmetically averaging the values.

The average diameter of micropores (average diameter of large-diameter hole portion and small-diameter hole portion) is a value obtained by observing four sheets (N=4) of the surfaces of the large-diameter hole portion and the surfaces of the small-diameter hole portion using a field emission scanning electron microscope (FE-SEM) at a magnification of 150,000 times, measuring the diameters of micropores (the large-diameter hole portion and the small-diameter hole portion) present in a range of 400×600 nm² in the obtained images of four sheets, and averaging the values. Further, in a case where the depth of the large-diameter hole portion is deep and the diameter of the small-diameter hole portion is unlikely to be measured, the upper portion of the anodized film is cut and then various kinds of diameters are acquired.

The average depth of the large-diameter hole portion is a value obtained by observing the cross section of the support (anodized film) using FE-TEM at a magnification of 500,000, measuring 60 cases (N=60) of distances from the surface of an arbitrary micropore to the communicating position in the obtained image, and averaging the values. Further, the average depth of the small-diameter hole portion is a value obtained by observing the cross section of the support (anodized film) using FE-SEM (at a magnification of 50,000), measuring 25 depths of arbitrary micropores in the obtained image, and averaging the values.

The "density of the communication portion" indicates the density of the small-diameter hole portion of the cross section of the anodized film in the communicating position. The "increase magnification of the surface area" indicates the value calculated based on the following Equation (A).

Increase magnification of surface area=1+pore density×((πx(average diameter of surface layer/2+ average diameter of bottom portion/2)×((average diameter of bottom portion/2−average diameter of surface layer/2)²+depth $A^2$)$^{1/2}$+πx(average diameter of bottom portion/2)²−πx(average diameter of surface layer/2)²))  Equation (A)

In the column of the "average depth (nm)" of the small-diameter hole portion, the average depth of the second small-diameter hole portion is shown on the left side and the average depth of the first small-diameter hole portion is shown on the right side. In the column of the "density of communication portion" of the small-diameter hole portion, the density of the first small-diameter hole portion is shown in parentheses together with the density of the communication portion of the small-diameter hole portion.

Further, the average diameter of the first small-diameter hole portion positioning from the bottom portion of the second small-diameter hole portion to the bottom portion of the first small-diameter hole portion was 12 nm.

<Production of Support 13>

An aluminum plate (aluminum alloy plate) of a material 1S, having a thickness of 0.3 mm, was subjected to the following treatments (J-a) to (J-m), thereby producing a support 13. Moreover, during all treatment steps, a water washing treatment was performed, and liquid cutting was performed using a nip roller after the water washing treatment.

(J-a) Mechanical Roughening Treatment (Brush Grain Method)

Using the device having a structure shown in FIG. 5, while supplying a suspension of pumice (specific gravity of 1.1 g/cm³) to the surface of an aluminum plate as a polishing slurry liquid, a mechanical roughening treatment was performed using rotating bundle bristle brushes.

The mechanical roughening treatment is performed under conditions in which the median diameter (μm) of a polishing material was 30 μm, the number of the brushes was four, and the rotation speed (rpm) of the brushes was set to 250 rpm. The material of the bundle bristle brushes was nylon 6·10, the diameter of the brush bristles was 0.3 mm, and the bristle length was 50 mm. The brushes were produced by implanting bristles densely into holes in a stainless steel cylinder having a diameter of φ300 mm. The distance between two support rollers (φ200 mm) of the lower portion of the bundle bristle brushes was 300 mm. The bundle bristle brushes were pressed until the load of a driving motor for rotating the brushes became 10 kW plus with respect to the load before the bundle bristle brushes were pressed against the aluminum plate. The rotation direction of the brush was the same as the moving direction of the aluminum plate.

(J-b) Alkali Etching Treatment

The aluminum plate was subjected to an etching treatment by spraying a caustic soda aqueous solution in which the concentration of caustic soda was 26% by mass and the concentration of aluminum ions was 6.5% by mass using a spray at a temperature of 70° C. The dissolved aluminum amount of the surface to be subjected to an electrochemical roughening treatment was 10 g/m².

(J-c) Desmutting Treatment Using Acidic Aqueous Solution

A desmutting treatment was performed by spraying, as an acidic aqueous solution, a waste liquid of nitric acid at a solution temperature of 35° C., to be used for the electrochemical roughening treatment in the next step, to the aluminum plate for 3 seconds.

(J-d) Electrochemical Roughening Treatment Using Nitric Acid Aqueous Solution

An electrochemical roughening treatment was continuously performed using an AC voltage of 60 Hz. An electrolyte which had been adjusted to have a concentration of aluminum ions of 4.5 g/L by adding aluminum nitrate to a nitric acid aqueous solution having a concentration of 10.4 g/L at a solution temperature of 35° C. was used. Using a trapezoidal rectangular waveform AC having a time tp, until the current value reached a peak from zero, of 0.8 msec and the duty ratio of 1:1 as an AC power source waveform which is a waveform shown in FIG. 1, the electrochemical roughening treatment was performed using a carbon electrode as a counter electrode. As an auxiliary anode, ferrite was used. As an electrolytic cell, the electrolytic cell having a structure shown in FIG. 2 was used. The current density was 30 A/dm$^2$ as the peak current value, and 5% of the current from the power source was separately flowed to the auxiliary anode. The electric quantity (C/dm$^2$) was 185 C/dm$^2$ as the sum total of electric quantity in a case of anodization of the aluminum plate.

(J-e) Alkali Etching Treatment

The aluminum plate was subjected to an etching treatment by spraying a caustic soda aqueous solution in which the concentration of caustic soda was 27% by mass and the concentration of aluminum ions was 2.5% by mass using a spray at a temperature of 50° C. The amount of aluminum dissolved was 3.5 g/m$^2$.

(J-f) Desmutting Treatment Using Acidic Aqueous Solution

A desmutting treatment was performed by spraying, as an acidic aqueous solution, an aqueous solution with a sulfuric acid concentration of 170 g/L and an aluminum ion concentration of 5 g/L at a solution temperature of 30° C. to the aluminum plate for 3 seconds.

(J-g) Electrochemical Roughening Treatment Using Hydrochloric Acid Aqueous Solution An electrochemical roughening treatment was continuously performed using an AC voltage of 60 Hz. An electrolyte which had been adjusted to have a concentration of aluminum ions of 4.5 g/L by adding aluminum chloride to a hydrochloric acid aqueous solution having a concentration of 6.2 g/L, and of which the solution temperature was 35° C. was used. Using a trapezoidal rectangular waveform AC having a time tp, until the current value reached a peak from zero, of 0.8 msec and the duty ratio of 1:1 as an AC power source waveform which is a waveform shown in FIG. 1, the electrochemical roughening treatment was performed using a carbon electrode as a counter electrode. As an auxiliary anode, ferrite was used. As an electrolytic cell, the electrolytic cell having a structure shown in FIG. 2 was used. The current density was 25 A/dm$^2$ as the peak current value, and the electric quantity (C/dm$^2$) in the hydrochloric acid electrolysis was 63 C/dm$^2$ as the sum total of electric quantity in a case of anodization of the aluminum plate.

(J-h) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray at a temperature of 60° C. The amount of aluminum dissolved was 0.2 g/m$^2$.

(J-i) Desmutting Treatment Using Acidic Aqueous Solution

A desmutting treatment was performed by spraying, as an acidic aqueous solution, a waste liquid at a solution temperature of 35° C. (aqueous solution with a sulfuric acid concentration of 170 g/L and an aluminum ion concentration of 5 g/L), which was generated in the anodizing treatment step, to the aluminum plate for 4 seconds.

(J-j) First Step of Anodizing Treatment

A first step of an anodizing treatment was performed with an anodizing device using DC electrolysis having the structure shown in FIG. 3. The aluminum plate was subjected to an anodizing treatment at a solution temperature of 50° C. and a current density of 30A/dm$^2$ using a 170 g/L of sulfuric acid aqueous solution as an electrolyte, thereby forming an anodized film having a coating amount of 0.3 g/m$^2$.

(J-k) Pore Widening Treatment

The aluminum plate after being subjected to the anodizing treatment was subjected to a pore widening treatment by being immersed in a caustic soda aqueous solution in which the concentration of caustic soda was 5% by mass and the concentration of aluminum ions was 0.5% by mass at a temperature of 40° C. for 3 seconds.

(J-l) Second Step of Anodizing Treatment

A second step of an anodizing treatment was performed with an anodizing device using DC electrolysis having the structure shown in FIG. 3. The aluminum plate was subjected to an anodizing treatment at a solution temperature of 50° C. and a current density of 13A/dm$^2$ using a 170 g/L of sulfuric acid aqueous solution as an electrolyte, thereby forming an anodized film having a coating amount of 2.1 g/m$^2$.

(J-m) Hydrophilization Treatment

In order to ensure hydrophilicity of a non-image area, the aluminum plate area was subjected to a silicate treatment by being immersed in a 2.5% by mass of No. 3 sodium silicate aqueous solution at 50° C. for 7 seconds. The adhesion amount of Si was 8.5 mg/m$^2$. Thereafter, washing with water by spraying was performed. The average diameter of micropores of a surface on the printing surface side of the support 13 was 30 nm.

<Production of Support 14>

A molten metal was prepared using an aluminum alloy containing 0.06% by mass of Si, 0.30% by mass of Fe, 0.005% by mass of Cu, 0.001% by mass of Mn, 0.001% by mass of Mg, 0.001% by mass of Zn, and 0.03% by mass of Ti and, as the remainder, aluminum and unavoidable impurities, a molten metal treatment and filtration were performed, and an ingot having a thickness of 500 mm and a width of 1200 mm was produced according to a DC casting method. The surface was scraped off using a surface grinder having an average thickness of 10 mm and heated at 550° C. and maintained the state for approximately 5 hours. After the temperature was decreased to 400° C., a rolled sheet having a thickness of 2.7 mm was obtained using a hot rolling mill. Furthermore, a heat treatment was performed thereon at 500° C. using a continuous annealing machine, and a cold rolling was performed so that the thickness of the rolled sheet was finished to 0.24 mm, thereby producing an aluminum plate (width: 1,030 mm) formed of JIS 1050 material.

This aluminum plate was subjected to the following surface treatments (b) to (j) continuously, thereby producing a support 14. Moreover, during all treatment steps, a water washing treatment was performed, and liquid cutting was performed using a nip roller after the water washing treatment.

(b) Alkali Etching Treatment

The aluminum plate was subjected to an etching treatment by spraying an aqueous solution in which the concentration of caustic soda was 2.6% by mass and the concentration of aluminum ions was 6.5% by mass at a temperature of 70° C. so that 6 g/m$^2$ of the aluminum plate was dissolved.

(c) Desmutting Treatment

A desmutting treatment was performed by spraying an aqueous solution (containing 0.5% by mass of aluminum ions) having a nitric acid concentration of 1% by mass at a temperature of 30° C. As the nitric acid aqueous solution used for the desmutting treatment, a waste liquid used for the step of performing the electrochemical roughening treatment using the alternating current in a nitric acid aqueous solution was used.

(d) Electrochemical Roughening Treatment

An electrochemical roughening treatment was continuously performed using an AC voltage of 60 Hz. As an electrolyte, an aqueous solution containing 10.5 g/L of nitric acid (containing 5 g/L of aluminum ions and 0.007% by mass of ammonium ions) was used, and the solution temperature was 50° C. Using a trapezoidal rectangular waveform AC having a time tp, until the current value reached a peak from zero, of 0.8 msec and the duty ratio of 1:1 as an AC power source waveform which is a waveform shown in FIG. 1, the electrochemical roughening treatment was performed using a carbon electrode as a counter electrode. As an auxiliary anode, ferrite was used. As an electrolytic cell used, the electrolytic cell having a structure shown in FIG. 2 was used. The current density was 30 A/dm$^2$ as the peak current value, and the electric quantity was 220 C/dm$^2$ as the sum total of electric quantity in a case of anodization of the aluminum plate. 5% of the current from the power source was separately flowed to the auxiliary anode.

(e) Alkali Etching Treatment

The aluminum plate was subjected to an etching treatment by spraying an aqueous solution in which the concentration of caustic soda was 26% by mass and the concentration of aluminum ions was 6.5% by mass at a temperature of 32° C. so that 0.25 g/m$^2$ of the aluminum plate was dissolved. Further, a smut component mainly containing aluminum hydroxide generated in a case of the electrochemical roughening treatment using the alternating current at the former step was removed, an edge portion of a generated pit was dissolved to smooth the edge portion.

(f) Desmutting Treatment

A desmutting treatment was performed by spraying an aqueous solution (containing 4.5% by mass of aluminum ions) having a sulfuric acid concentration of 15% by mass at a temperature of 30° C. As the nitric acid aqueous solution used for the desmutting treatment, a waste liquid used for the step of performing the electrochemical roughening treatment using the alternating current in a nitric acid aqueous solution was used.

(g) Electrochemical Roughening Treatment

An electrochemical roughening treatment was continuously performed using an AC voltage of 60 Hz. As an electrolyte, an aqueous solution containing 2.5 g/L of hydrochloric acid (containing 5 g/L of aluminum ions) was used, and the temperature was 35° C. Using a trapezoidal rectangular waveform AC having a time tp, until the current value reached a peak from zero, of 0.8 msec and the duty ratio of 1:1 as an AC power source waveform which is a waveform shown in FIG. 1, the electrochemical roughening treatment was performed using a carbon electrode as a counter electrode. As an auxiliary anode, ferrite was used. As an electrolytic cell used, the electrolytic cell having a structure shown in FIG. 2 was used. The current density was 25 A/dm$^2$ as the peak current value, and the electric quantity was 50 C/dm$^2$ as the sum total of electric quantity in a case of anodization of the aluminum plate.

(h) Alkali Etching Treatment

The aluminum plate was subjected to an etching treatment by spraying an aqueous solution in which the concentration of caustic soda was 26% by mass and the concentration of aluminum ions was 6.5% by mass at a temperature of 32° C. so that 0.1 g/m$^2$ of the aluminum plate was dissolved. Further, a smut component mainly containing aluminum hydroxide generated in a case of the electrochemical roughening treatment using the alternating current at the former step was removed, an edge portion of a generated pit was dissolved to smooth the edge portion.

(i) Desmutting Treatment

A desmutting treatment was performed by spraying an aqueous solution (containing 0.5% by mass of aluminum ions) having a sulfuric acid concentration of 25% by mass at a temperature of 60° C.

(j) Anodizing Treatment

An anodizing treatment was performed with an anodizing device using DC electrolysis having the structure shown in FIG. 3. The aluminum plate was subjected to an anodizing treatment at a solution temperature of 38° C. and a current density of 30A/dm$^2$ using an aqueous solution having a sulfuric acid concentration of 170 g/L (containing 0.5% by mass of aluminum ions) as an electrolyte, thereby forming an anodized film having a coating amount of 2.7 g/m$^2$. Thereafter, washing with water by spraying was performed. The average diameter of micropores of a surface on the printing surface side of the support 14 was 7 nm.

<Production of Support 15>

An aluminum plate (aluminum alloy plate) of a material 1S, having a thickness of 0.19 mm, was immersed in a 40 g/L sodium hydroxide aqueous solution at 60° C. for 8 seconds so as to be degreased and then washed with demineralized water for 2 seconds. The aluminum plate was subjected to an electrochemical roughening treatment in an aqueous solution containing 12 g/L of hydrochloric acid and 38 g/L of aluminum sulfate (18 hydrates) at a temperature of 33° C. and at a current density of 130 A/dm$^2$ using an AC for 15 seconds. Next, the aluminum plate was washed with demineralized water for 2 seconds, subjected to a desmutting treatment by being etched using 155 g/L of a sulfuric acid aqueous solution at 70° C. for 4 seconds, and washed with demineralized water at 25° C. for 2 seconds. The aluminum plate was subjected to an anodizing treatment in 155 g/L of a sulfuric acid aqueous solution for 13 seconds at a temperature of 45° C. and at a current density of 22 A/dm$^2$ and washed with demineralized water for 2 seconds. Furthermore, the aluminum plate was treated at 40° C. for 10 seconds using 4 g/L of a polyvinyl phosphonic acid aqueous solution, washed with demineralized water at 20° C. for 2 seconds, and then dried, thereby producing a support 15. The surface roughness $R^a$ of the support 15 was 0.21 µm and the coating amount of the anodized film was 4 g/m$^2$. The average diameter of micropores of a surface on the printing surface side of the support 15 was 7 nm.

<Production of Support 16>

An aluminum plate (aluminum alloy plate) of a material 1S, having a thickness of 0.3 mm, was subjected to the following treatments (K-a) to (K-k), thereby producing a support 16. Moreover, during all treatment steps, a water washing treatment was performed, and liquid cutting was performed using a nip roller after the water washing treatment.

(K-a) Mechanical Roughening Treatment (Brush Grain Method)

Using the device having a structure shown in FIG. 5, while supplying a suspension of pumice (specific gravity of 1.1 g/cm$^3$) to the surface of an aluminum plate as a polishing slurry liquid, a mechanical roughening treatment was performed using rotating bundle bristle brushes.

The mechanical roughening treatment is performed under conditions in which the median diameter (µm) of a polishing material was 30 µm, the number of the brushes was four, and the rotation speed (rpm) of the brushes was set to 250 rpm. The material of the bundle bristle brushes was nylon 6·10, the diameter of the brush bristles was 0.3 mm, and the bristle length was 50 mm. The brushes were produced by implanting bristles densely into holes in a stainless steel cylinder having a diameter of φ300 mm. The distance between two support rollers ((φ200 mm) of the lower portion of the bundle bristle brushes was 300 mm. The bundle bristle brushes were pressed until the load of a driving motor for rotating the brushes became 10 kW plus with respect to the load before the bundle bristle brushes were pressed against the aluminum plate. The rotation direction of the brush was the same as the moving direction of the aluminum plate.

(K-b) Alkali Etching Treatment

The aluminum plate was subjected to an etching treatment by spraying a caustic soda aqueous solution in which the concentration of caustic soda was 26% by mass and the concentration of aluminum ions was 6.5% by mass using a spray at a temperature of 70° C. The dissolved aluminum amount of the surface to be subjected to an electrochemical roughening treatment was 10 g/m$^2$.

(K-c) Desmutting Treatment Using Acidic Aqueous Solution

A desmutting treatment was performed by spraying, as an acidic aqueous solution, a waste liquid of nitric acid at a solution temperature of 35° C., to be used for the electrochemical roughening treatment in the next step, to the aluminum plate for 3 seconds.

(K-d) Electrochemical Roughening Treatment Using Nitric Acid Aqueous Solution

An electrochemical roughening treatment was continuously performed using an AC voltage of 60 Hz. An electrolyte which had been adjusted to have a concentration of aluminum ions of 4.5 g/L by adding aluminum nitrate to a nitric acid aqueous solution having a concentration of 10.4 g/L at a solution temperature of 35° C. was used. Using a trapezoidal rectangular waveform AC having a time tp, until the current value reached a peak from zero, of 0.8 msec and the duty ratio of 1:1 as an AC power source waveform which is a waveform shown in FIG. 1, the electrochemical roughening treatment was performed using a carbon electrode as a counter electrode. As an auxiliary anode, ferrite was used. As an electrolytic cell, the electrolytic cell having a structure shown in FIG. 2 was used. The current density was 30 A/dm$^2$ as the peak current value, and 5% of the current from the power source was separately flowed to the auxiliary anode. The electric quantity (C/dm$^2$) was 185 C/dm$^2$ as the sum total of electric quantity in a case of anodization of the aluminum plate.

(K-e) Alkali Etching Treatment

The aluminum plate was subjected to an etching treatment by spraying a caustic soda aqueous solution in which the concentration of caustic soda was 27% by mass and the concentration of aluminum ions was 2.5% by mass using a spray at a temperature of 50° C. The amount of aluminum dissolved was 0.5 g/m$^2$.

(K-f) Desmutting Treatment Using Acidic Aqueous Solution

A desmutting treatment was performed by spraying, as an acidic aqueous solution, an aqueous solution with a sulfuric acid concentration of 170 g/L and an aluminum ion concentration of 5 g/L at a solution temperature of 30° C. to the aluminum plate for 3 seconds.

(K-g) Electrochemical Roughening Treatment Using Hydrochloric Acid Aqueous Solution An electrochemical roughening treatment was continuously performed using an AC voltage of 60 Hz. An electrolyte which had been adjusted to have a concentration of aluminum ions of 4.5 g/L by adding aluminum chloride to a hydrochloric acid aqueous solution having a concentration of 6.2 g/L, and of which the solution temperature was 35° C.

was used. Using a trapezoidal rectangular waveform AC having a time tp, until the current value reached a peak from zero, of 0.8 msec and the duty ratio of 1:1 as an AC power source waveform which is a waveform shown in FIG. 1, the electrochemical roughening treatment was performed using a carbon electrode as a counter electrode. As an auxiliary anode, ferrite was used. As an electrolytic cell, the electrolytic cell having a structure shown in FIG. 2 was used. The current density was 25 A/dm$^2$ as the peak current value, and the electric quantity (C/dm$^2$) in the hydrochloric acid electrolysis was 63 C/dm$^2$ as the sum total of electric quantity in a case of anodization of the aluminum plate.

(K-h) Alkali Etching Treatment

The aluminum plate was subjected to an etching treatment by spraying a caustic soda aqueous solution in which the concentration of caustic soda was 5% by mass and the concentration of aluminum ions was 0.5% by mass using a spray at a temperature of 60° C. The amount of aluminum dissolved was 0.1 g/m$^2$.

(K-i) Desmutting Treatment Using Acidic Aqueous Solution

A desmutting treatment was performed by spraying, as an acidic aqueous solution, a waste liquid at a solution temperature of 35° C. (aqueous solution with a sulfuric acid concentration of 170 g/L and an aluminum ion concentration of 5 g/L), which was generated in the anodizing treatment step, to the aluminum plate for 4 seconds.

(K-j) Anodizing Treatment

An anodizing treatment was performed with an anodizing device using DC electrolysis having the structure shown in FIG. 3. The aluminum plate was subjected to an anodizing treatment at a solution temperature of 50° C. and a current density of 30A/dm$^2$ using a 170 g/L of sulfuric acid aqueous solution as an electrolyte, thereby forming an anodized film having a coating amount of 2.4 g/m$^2$.

(K-k) Hydrophilization Treatment

In order to ensure hydrophilicity of a non-image area, the aluminum plate area was subjected to a silicate treatment by being immersed in a 2.5% by mass of No. 3 sodium silicate aqueous solution at 50° C. for 7 seconds. The adhesion amount of Si was 8.5 mg/m$^2$. Thereafter, washing with water by spraying was performed. The average diameter of micropores of a surface on the printing surface side of the support 16 was 7 nm.

<Production of Support 17>

For an aluminum plate (material: JIS A 1050) having a thickness of 0.3 mm, a surface of the aluminum plate was grained using three nylon brushes having a bundle of bristles with a bristle diameter of 0.3 mm and a pumice-water suspension (specific gravity of 1.1 g/cm$^3$) having a median diameter of 25 μm and washed with water thoroughly. The aluminum plate was immersed in a 25% by mass of sodium hydroxide aqueous solution at 70° C. for 10 seconds so as to be etched, washed with water, further immersed in a 1% by mass of nitric acid aqueous solution at 30° C. for 10 seconds, and washed with water. The etching amount of the surface was approximately 5 g/m$^2$.

Next, an electrochemical roughening treatment was continuously performed using an AC voltage of 60 Hz. A 1% by mass of nitric acid aqueous solution (containing 0.5% by mass of aluminum ions) was used as an electrolyte, and the solution temperature was 50° C. Using a trapezoidal rectangular waveform AC having a time TP, until the current value reached a peak from zero, of 0.8 msec and the duty ratio of 1:1 as the AC power source waveform, the electrochemical roughening treatment was performed using a carbon electrode as a counter electrode. As an auxiliary anode, ferrite was used. The current density was 30 A/dm$^2$ as the peak current value, and 5% of the current from the power source was separately flowed to the auxiliary anode. The electric quantity in nitric acid electrolysis was 165 C/dm² as the electric quantity in a case of anodization of the aluminum plate. Thereafter, washing with water by spraying was performed.

Subsequently, the aluminum plate was immersed in a 25% by mass of sodium hydroxide aqueous solution at 50° C. for 8 seconds so as to be etched, washed with water, further immersed in a 17% by mass of sulfuric acid aqueous solution at 30° C. for 10 seconds, and washed with water. The etching amount of the surface was approximately 2.0 g/m².

Next, an electrochemical roughening treatment was performed according to the same method as that for the nitric acid electrolysis using a 0.6% by mass of hydrochloric acid aqueous solution (containing 0.5% by mass of aluminum ions) and an electrolyte having a solution temperature of 35° C. under a condition of an electric quantity of 63 C/dm² in a case of anodization of the aluminum plate, and washing with water was performed using a spray.

Subsequently, the aluminum plate was immersed in a 5% by mass of sodium hydroxide aqueous solution at 35° C. for 10 seconds so as to be etched, washed with water, further immersed in a 17% by mass of sulfuric acid aqueous solution at 30° C. for 10 seconds, and washed with water. The etching amount of the surface was approximately 0.1 g/m².

On the aluminum plate, a DC anodized film with a coating amount of 0.3 g/m² was formed at an average current density of 30 A/dm² using a 17% by mass of sulfuric acid aqueous solution (containing 0.5% by mass of aluminum ions) as an electrolyte, and washed with water. Subsequently, the aluminum plate was immersed in a 5% by mass of sodium hydroxide aqueous solution at 38° C. for 3 seconds so as to be etched to widen the diameter of micropores formed by anodic oxidation, and further washed with water. Thereafter, a DC anodized film with a coating amount of 2.25 g/m² was formed at an average current density of 20 A/dm² using a 17% by mass of sulfuric acid aqueous solution (containing 0.5% by mass of aluminum ions) as an electrolyte, washed with water, and dried, thereby producing a support 17. The average diameter of micropores of a surface on the printing surface side of the support 17 was 35 nm.

<Production of Support 18>

For an aluminum plate (material: JIS A 1050) having a thickness of 0.3 mm, a surface of the aluminum plate was grained using three nylon brushes having a bundle of bristles with a bristle diameter of 0.3 mm and a pumice-water suspension (specific gravity of 1.1 g/cm³) having a median diameter of 25 μm and washed with water thoroughly. The aluminum plate was immersed in a 25% by mass of sodium hydroxide aqueous solution at 70° C. for 10 seconds so as to be etched, washed with water, further immersed in a 1% by mass of nitric acid aqueous solution at 30° C. for 10 seconds, and washed with water. The etching amount of the surface was approximately 5 g/m².

Next, an electrochemical roughening treatment was continuously performed using an AC voltage of 60 Hz. A 1% by mass of nitric acid aqueous solution (containing 0.5% by mass of aluminum ions) was used as an electrolyte, and the solution temperature was 39° C. Using a trapezoidal rectangular waveform AC having a time TP, until the current value reached a peak from zero, of 0.8 msec and the duty ratio of 1:1 as the AC power source waveform, the electrochemical roughening treatment was performed using a carbon electrode as a counter electrode. As an auxiliary anode, ferrite was used. The current density was 30 A/dm² as the peak current value, and 5% of the current from the power source was separately flowed to the auxiliary anode. The electric quantity in nitric acid electrolysis was 165 C/dm² as the electric quantity in a case of anodization of the aluminum plate. Thereafter, washing with water by spraying was performed.

Subsequently, the aluminum plate was immersed in a 25% by mass of sodium hydroxide aqueous solution at 40° C. for 3 seconds so as to be etched, washed with water, further immersed in a 17% by mass of sulfuric acid aqueous solution at 30° C. for 10 seconds, and washed with water. The etching amount of the surface was approximately 0.5 g/m².

Next, an electrochemical roughening treatment was performed according to the same method as that for the nitric acid electrolysis using a 0.7% by mass of hydrochloric acid aqueous solution (containing 0.5% by mass of aluminum ions) and an electrolyte having a solution temperature of 42° C. under a condition of an electric quantity of 73 C/dm² in a case of anodization of the aluminum plate, and washing with water was performed using a spray.

Subsequently, the aluminum plate was immersed in a 5% by mass of sodium hydroxide aqueous solution at 35° C. for 10 seconds so as to be etched, washed with water, further immersed in a 17% by mass of sulfuric acid aqueous solution at 30° C. for 10 seconds, and washed with water. The etching amount of the surface was approximately 0.1 g/m².

On the aluminum plate, a DC anodized film with a coating amount of 2.5 g/m² was formed at an average current density of 20 A/dm² using a 17% by mass of sulfuric acid aqueous solution (containing 0.5% by mass of aluminum ions) as an electrolyte, washed with water, and dried, thereby producing a support 18. The average diameter of micropores of a surface on the printing surface side of the support 18 was 12 nm.

<Formation of Undercoat Layer 1>

The support (on the printing surface side) was coated with an undercoat layer coating solution (1) with the following composition such that the drying coating amount thereof reached 20 mg/m², thereby forming an undercoat layer 1.

(Undercoat Layer Coating Solution (1))

Compound for undercoat layer (UC-2) (the following structure)

0.18 parts

Hydroxyethyl imino diacetic acid 0.05 parts

Surfactant (EMALEX 710, manufactured by Nihon Emulsion Co., Ltd.)

0.03 parts

Water 28.0 parts

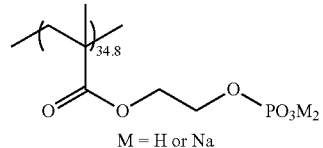

M = H or Na

-continued

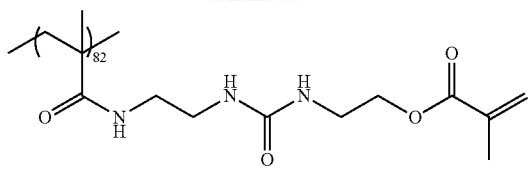
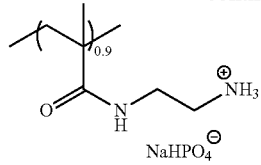

<Formation of Undercoat Layer 2>
The support (on the printing surface side) was coated with an undercoat layer coating solution (2) with the following composition such that the drying coating amount thereof reached 26 mg/m², thereby forming an undercoat layer 2.
(Undercoat Layer Coating Solution (2))
Compound for undercoat layer (2) (the following structure) 0.13 parts
Hydroxyethyl imino diacetic acid 0.05 parts
Tetrasodium ethylenediaminetetraacetate 0.05 parts
Polyoxyethylene lauryl ether 0.03 parts
Water 61.39 parts Compound for undercoat layer (2)

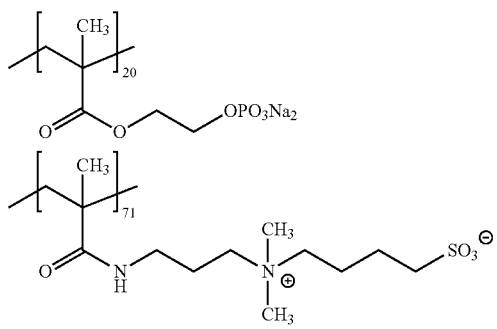

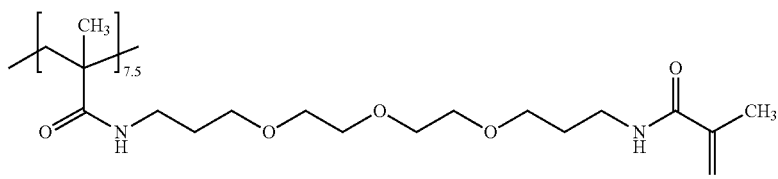

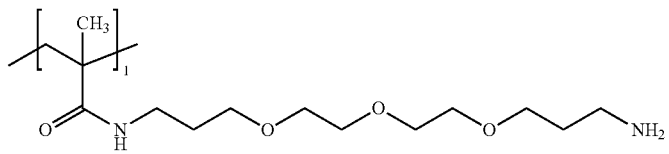

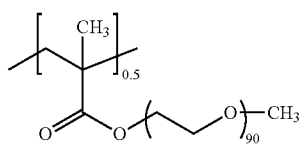

Mw 100,000

The numerical values on the lower right side of the parentheses of each constitutional unit in the above-described compound (2) for an undercoat layer indicate the mass ratios, and the numerical values on the lower right side of the parentheses of each ethyleneoxy unit indicate the repetition numbers.

<Formation of Undercoat Layer 3>

The support (on the printing surface side) was coated with an undercoat layer coating solution (3) with the following composition such that the drying coating amount thereof reached 20 mg/m², thereby forming an undercoat layer 3.

(Undercoat Layer Coating Solution (3))
Compound for undercoat layer (2) (the following structure) 0.18 parts
Tetrasodium ethylenediaminetetraacetate 0.10 parts
Polyoxyethylene lauryl ether 0.03 parts
Water 61.39 parts Compound for undercoat layer (2)

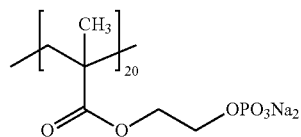

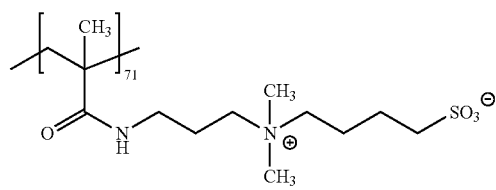

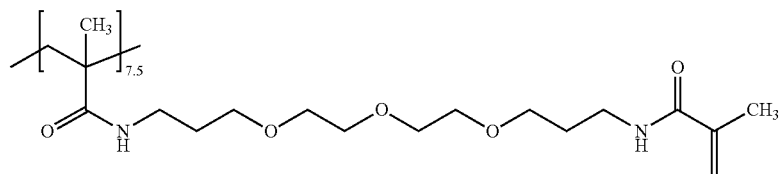

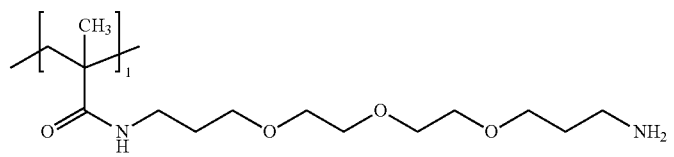

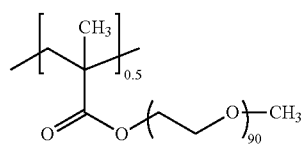

Mw 100,000

The numerical values on the lower right side of the parentheses of each constitutional unit in the above-described compound (2) for an undercoat layer indicate the mass ratios, and the numerical values on the lower right side of the parentheses of each ethyleneoxy unit indicate the repetition numbers.

<Formation of Undercoat Layer 4>

The support (on the printing surface side) was coated with an undercoat layer coating solution (4) with the following composition such that the drying coating amount thereof reached 0.5 mg/m², thereby forming an undercoat layer 4.

(Undercoat Layer Coating Solution (4))
  Polymer compound A (the following structure) (mass average molecular weight: 30,000) 0.0049 g
  Methanol 55.19 g
  1-methoxy-2-propanol 0.0154 g
  Water 6.1432 g Polymer Compund A

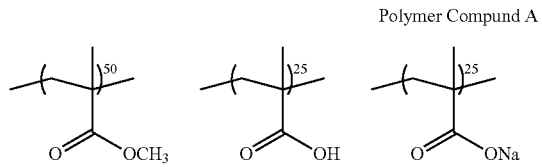

<Formation of Undercoat Layer 5>

The support (on the printing surface side) was coated with an undercoat layer coating solution (5) with the following composition such that the drying coating amount thereof reached 18 mg/m², thereby forming an undercoat layer 5.

<Undercoat Layer Coating Solution (5)>
  Polymer U (the following structure) 0.3 parts by mass
  Pure water 60.0 parts by mass
  Methanol 939.7 parts by mass Polymer U

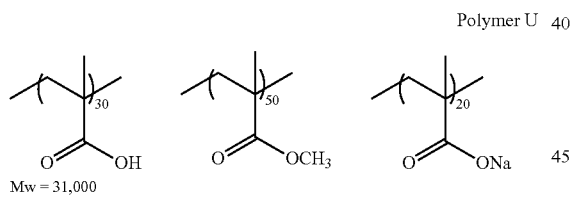

Mw = 31,000

<Formation of Undercoat Layer 6>

The support (on the printing surface side) was coated with an undercoat layer coating solution (6) with the following composition such that the drying coating amount thereof reached 52 mg/m², thereby forming an undercoat layer 6.

<Undercoat Layer Coating Solution (6)>
  Compound for undercoat layer (2) (described above) 0.1052 g
  Hydroxyethyl imino diacetic acid 0.00810 g
  Tetrasodium ethylenediaminetetraacetate tetrahydrate 0.0362 g
  Surfactant (EMALEX 710, manufactured by Nihon Emulsion Co., Ltd.) 0.00159 g
  Preservative (Biohope L, manufactured by K I Chemical Industry Co., LTD.) 0.00149 g
  Water 2.82 g <Formation of Undercoat Layer 7>

The support (on the printing surface side) was coated with an undercoat layer coating solution (7) with the following composition such that the drying coating amount thereof reached 82.3 mg/m², thereby forming an undercoat layer 7.

<Undercoat Layer Coating Solution (6)>
  Compound for undercoat layer (2) (described above) 0.132 g
  Hydroxyethyl imino diacetic acid 0.0135 g
  Tetrasodium ethylenediaminetetraacetate/tetrahydrate 0.0600 g
  Surfactant (EMALEX 710, manufactured by Nihon Emulsion Co., Ltd.) 0.00401 g
  Water 7.25 g <Formation of Image Recording Layer 1>

The support (on the printing surface side) was bar-coated with an image recording layer coating solution (1) with the following composition and dried in an oven at 70° C. for 60 seconds, thereby forming an image recording layer 1 having a thickness of 0.6 μm.

(Image Recording Layer Coating Solution (1))
  Polymerizable compound 1*1 0.15 parts
  Polymerizable compound 2*2 0.1 parts
  Graft copolymer 2*3 0.825 parts
  Klucel M*4 0.020 parts
  Irgacure 250*5 0.032 parts
  Infrared absorbent 1 (the following structure) 0.02 parts
  Sodium tetraphenylborate 0.03 parts
  Byk 336*6 0.015 parts
  Black-XV*7 0.04 parts
  n-propanol 7.470 parts
  Water 1.868 parts

*1: UA510H (manufactured by Kyoeisha Chemical Co., Ltd; reaction product of dipentaerythritol pentaacrylate and hexamethylene diisocyanate)

*2: ATM-4E (manufactured by Shin-Nakamura Chemical Co., Ltd.; ethoxylated pentaerythritol tetraacrylate)

*3: graft copolymer 2 is a polymer particle of a graft copolymer of poly(ethylene glycol)methyl ether methacrylate, styrene, and acrylonitrile at a mixing ratio of 10:9:81, and a dispersion containing 24% by mass of the polymer particles in a solvent containing n-propanol and water at a mass ratio of 80:20 is used. Further, the volume average particle diameter is 193 nm.

*4: Klucel M means hydroxypropyl cellulose available from Hercules.

*5: Irgacure 250 has, as a 75% propylene carbonate solution, iodonium, (4-methylphenyl)[4-(2-methylpropyl)phenyl],-hexafluorophosphate which is an iodonium salt that can be procured from Ciba specialty Chemicals Inc.

*6: Byk 336 is a modified dimethyl polysiloxane copolymer which is commercially available from BYK-Chemie Japan K. K., in a 25% xylene/methoxypropyl acetate solution.

*7: Black-XV (the following compound, manufactured by Yamamoto Chemicals Inc.)

Infrared absorbent 1

<Formation of Image Recording Layer 2>

The support (on the printing surface side) was bar-coated with an image recording layer coating solution (2) with the following composition and dried in an oven at 100° C. for 60 seconds, thereby forming an image recording layer 2 having a thickness of 0.6 μm.

(Image Recording Layer Coating Solution (2))

Infrared absorbent 4 (the following structure) 0.030 parts

Polymerization initiator I (the following structure) 0.032 parts

Polymerizable compound (1) A-9300 (manufactured by Shin-Nakamura Chemical Co., Ltd.) (the following structure) 0.05 parts Polymerizable compound (2) A-DPH (manufactured by Shin-Nakamura Chemical Co., Ltd.) (the following structure) 0.05 parts Binder polymer 3 (described below) 0.825 parts Surfactant Byk306 (manufactured by BYK Chemie GmbH) 0.008 parts 1-methoxy-2-propanol 8.609 parts Methyl ethyl ketone 1.091 parts Infrared absorbent 4

Polymerization initiator I

Polymerizable compound (1)

Polymerizable compound (2)

(Synthesis of Binder Polymer 3)

300 g of methyl ethyl ketone was placed in a three-neck flask and heated to 80° C. under a nitrogen stream. A mixed solution consisting of 50.0 g of the following compound 1, 50.0 g of the following compound 2, 0.7 g of azobisisobutyronitrile (AIBN), and 100 g of methyl ethyl ketone was added dropwise to this reaction container over 30 minutes. After the dropwise addition, the reaction was continued for another 7.5 hours. Thereafter, 0.3 g of AIBN was added thereto, and the reaction was continued for another 12 hours. After completion of the reaction, the reaction solution was cooled to room temperature, thereby obtaining a binder polymer 3. The mass average molecular weight of the binder polymer 3 was 75,000. The compositional ratio of constitutional units in the binder polymer 3 was 50:50 on a mass basis.

Compound 1

Compound 2

<Formation of Image Recording Layer 3>

The undercoat layer was bar-coated with an image recording layer coating solution (3) with the following composition and dried in an oven at 100° C. for 60 seconds, thereby forming an image recording layer 3 having a thickness of 1.1 μm.

The image recording layer coating solution (3) was obtained by mixing a photosensitive solution (3) and a microgel solution (3) described below immediately before the coating and then stirring the solution.

| (Photosensitive solution (3)) | |
| --- | --- |
| Binder polymer (2) 23% by mass of 1-methoxy-2-propanol solution (the following structure) | 0.7510 parts |
| Infrared absorbent (1) (the following structure) | 0.0278 parts |
| Borate compound (1) (Sodium tetraphenylborate) | 0.009 parts |
| Polymerization initiator (1) (the following structure) | 0.2348 parts |
| Polymerizable compound (1) (tris(acryloyloxyethyl) isocyanurate, NK ESTER A-9300 40% by mass of 2-butanone solution, manufactured by Shin-Nakamura Chemical Co., Ltd.) | 0.2875 parts |
| Low-molecular weight hydrophilic compound (1) (tris(2-hydroxyethyl)isocyanurate) | 0.0287 parts |
| Low-molecular weight hydrophilic compound (2) (trimethylglycine) | 0.0147 parts |
| Anionic surfactant 1 30% by mass of aqueous solution (the following structure) | 0.167 parts |
| Ultraviolet absorbent (1) (TINUVIN 405, manufactured by BASF SE) (the following structure) | 0.04 parts |
| Fluorine-based surfactant (1) (the following structure) | 0.004 parts |
| 2-butanone | 2.464 parts |
| 1-methoxy-2-propanol | 5.976 parts |
| Methanol | 1.415 parts |
| Pure water | 0.036 parts |

(Synthesis of Binder Polymer (2))

78.0 g of 1-methoxy-2-propanol was weighed in a three-neck flask and heated to 70° C. in a nitrogen stream. A mixed solution consisting of 52.1 g of BLEMMER PME-100 (methoxy diethylene glycol monomethacrylate, manufactured by NOF Corporation), 21.8 g of methyl methacrylate, 14.2 g of methacrylic acid, 2.15 g of hexakis(3-mercaptopropionic acid) dipentaerythritol, 0.38 g of V-601 (2,2'-azobis(isobutyric acid) dimethyl, manufactured by Wako Pure Chemical Industries, Ltd.), and 54 g of 1-methoxy-2-propanol was added dropwise to this reaction container over 2 hours and 30 minutes. After the dropwise addition, the solution was heated to 80° C., and the reaction was continued for another 2 hours. A mixed solution consisting of 0.04 g of V-601 and 4 g of 1-methoxy-2-propanol was added thereto, the solution was heated to 90° C., and the reaction was continued for 2.5 hours. After completion of the reaction, the reaction solution was cooled to room temperature.

137.2 g of 1-methoxy-2-propanol, 0.24 g of 4-hydroxytetramethylpiperidine-N-oxide, 26.0 g of glycidyl methacrylate, and 3.0 g of tetraethylammonium bromide were added to the reaction solution, and the resulting solution was stirred thoroughly and heated to 90° C.

After 18 hours, the reaction solution was cooled to room temperature (25° C.) and diluted by adding 99.4 g of 1-methoxy-2-propanol thereto.

The concentration of solid contents in a binder polymer (2) obtained in the above-described manner was 23% by mass, and the mass average molecular weight thereof in terms of polystyrene which was measured by GPC was 35,000.

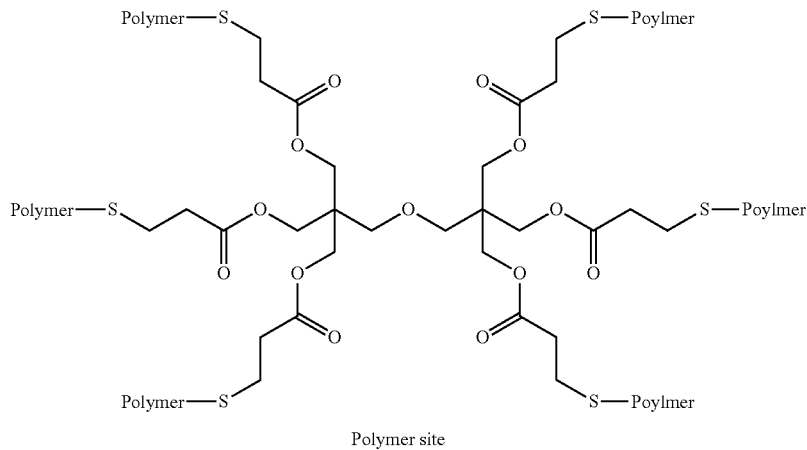

Polymer site

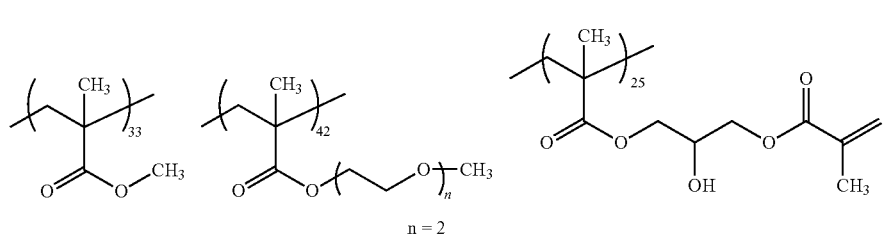

Binder polymer (2)

-continued
Infrared absorbent (1)
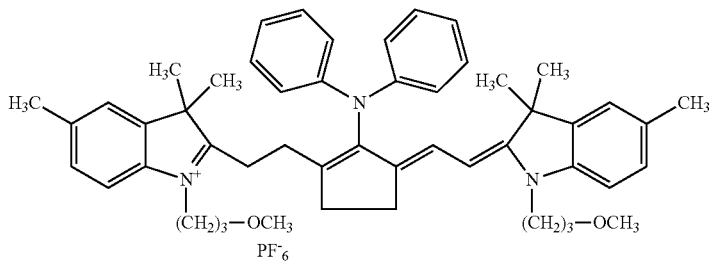
Polymerization initiator (1)
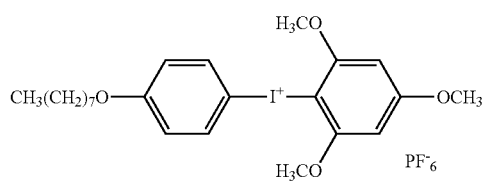
Fluorine-based surfactant (1)
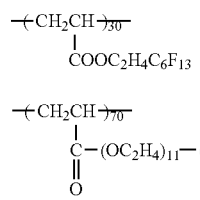
(Mw13.000)
Ultraviolet absorbent (1)
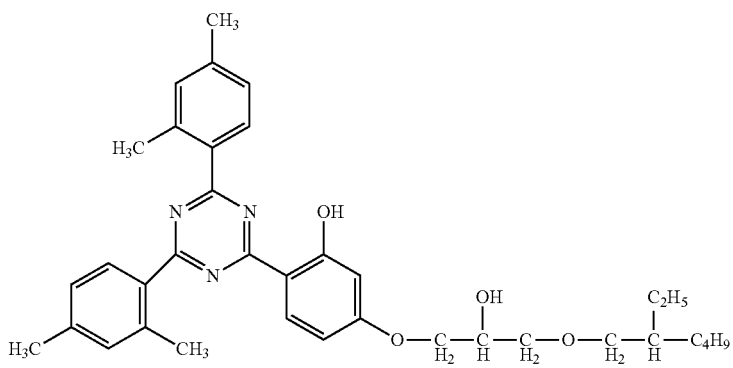
Anionic surfactant 1
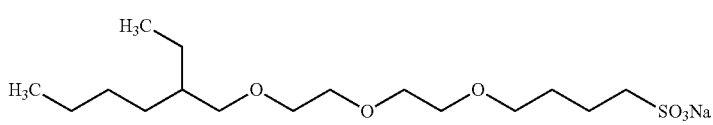
Low-molecular weight hydrophilic compound (1)
Low-molecular weight hydrophilic compound (2)
$(CH_3)_3N^+CH_2COO^-$
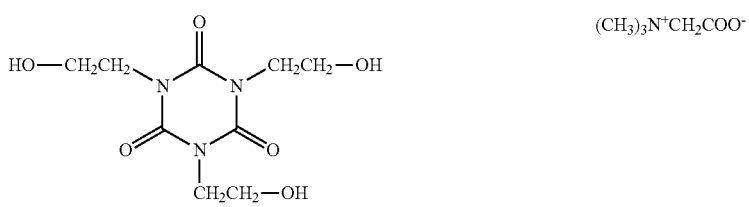
Borate compound (1)
Polymerizable compound (1)
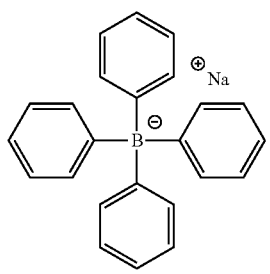
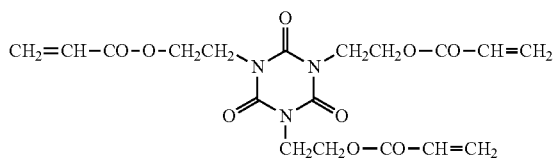

(Microgel Solution (3))
　Microgel (3) (concentration of solid contents: 21.8% by mass) (described below) 1.979 parts
　1-methoxy-2-propanol 0.529 parts
(Production of Microgel (3))
A method of preparing a microgel (3) will be described below.
<Preparation of Polyvalent Isocyanate Compound (1)>
0.043 parts of bismuth tris(2-ethylhexanoate) (NEO-STANN U-600, manufactured by NITTO KASEI CO., LTD.) was added to an ethyl acetate (25.31 parts) suspension solution of 17.78 parts (80 molar equivalent) of isophorone diisocyanate and 7.35 parts (20 molar equivalent) of the following polyhydric phenol compound (1), and the solution was stirred. The reaction temperature was set to 50° C. immediately before a timing of heat generation being subsided, and the solution was stirred for 3 hours, thereby obtaining an ethyl acetate solution (50% by mass) of a polyvalent isocyanate compound (1).

Polyhydric phenol compound (1)

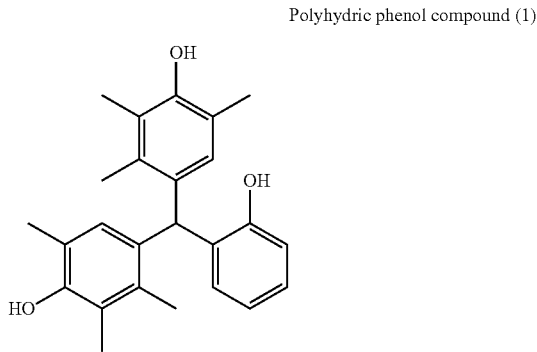 [SMILES: Cc1cc(C(c2ccccc2O)c2cc(C)c(O)c(C)c2C)c(C)c(C)c1O]

<Preparation of Microgel (3)>
The following oil phase components and the water phase component were mixed with each other and emulsified at 12,000 rpm for 10 minutes using a homogenizer. The obtained emulsion was stirred at 45° C. for 4 hours, 5.20 parts of a 10% by mass of aqueous solution of 1,8-diazabicyclo[5.4.0]undeca-7-ene-octylate (U-CAT SA102, manufactured by San-Apro Ltd.) was added thereto, and the solution was stirred at room temperature for 30 minutes and allowed to stand at 45° C. for 24 hours. The concentration of solid contents was adjusted to 21.8% by mass using distilled water, thereby obtaining an aqueous dispersion liquid of the microgel (3). The volume average particle diameter was measured using a dynamic light scattering type particle size distribution measuring device LB-500 (manufactured by Horiba Ltd.) according to a light scattering method, and the value was 0.28 μm.
(Oil Phase Components)
　(Component 1) ethyl acetate 12.0 parts
　(Component 2) adduct (50% by mass of ethyl acetate solution, manufactured by Mitsui Chemicals, Inc.) obtained by adding trimethylolpropane (6 mol) and xylene diisocyanate (18 mol) and adding methyl one-terminal polyoxyethylene (1 mol, repetition number of oxyethylene units: 90) thereto 3.76 parts
　(Component 3) polyvalent isocyanate compound (1) (as 50% by mass of ethyl acetate solution) 15.0 parts
　(Component 4) 65% by mass of solution of dipentaerythritol pentaacrylate (SR-399, manufactured by Sartomer Japan Inc.) in ethyl acetate 11.54 parts
　(Component 5) 10% solution of sulfonate type surfactant (PIONINE A-41-C, manufactured by TAKEMOTO OIL & FAT Co., Ltd.) in ethyl acetate 4.42 parts
(Water Phase Component)
　Distilled water 46.87 parts
<Formation of Image Recording Layer 4>
The undercoat layer was bar-coated with an image recording layer coating solution (4) with the following composition and dried in an oven at 100° C. for 60 seconds, thereby forming an image recording layer 4 having a thickness of 1.2 μm.
The image recording layer coating solution (4) was obtained by mixing a photosensitive solution (4) and a microgel solution (4) described below immediately before the coating and then stirring the solution.
(Photosensitive Solution (4))
　Binder polymer (6) 23% by mass of 1-methoxy-2-propanol solution (the following structure) 0.3755 parts
　Binder polymer (7) 23% by mass of 1-methoxy-2-propanol solution (the following structure) 0.3755 parts
　Infrared absorbent (1) (the following structure) 0.0278 parts
　Borate compound (1) (Sodium tetraphenylborate) 0.015 parts
　Polymerization initiator (1) (the following structure) 0.2348 parts
　Polymerizable compound (1) (tris(acryloyloxyethyl) isocyanurate, NK ESTE®A-9300 40% by mass of 2-butanone solution, manufactured by Shin-Nakamura Chemical Co., Ltd.) 0.2875 parts
　　Low-molecular weight hydrophilic compound (1) (tris (2-hydroxyethyl)isocyanurate) 0.0287 parts
　Low-molecular weight hydrophilic compound (2) (trimethylglycine) 0.0147 parts
　Anionic surfactant 1 30% by mass of aqueous solution (the following structure) 0.25 parts
　Ultraviolet absorbent (1) (TINUVIN 405, manufactured by BASF SE) (the following structure) 0.04 parts
　Fluorine-based surfactant (1) (the following structure) 0.004 parts
　Phosphonium compound (1) (the following structure) 0.020 parts
　2-butanone 5.346 parts
　1-methoxy-2-propanol 3.128 parts
　Methanol 0.964 parts
　Pure water 0.036 parts
(Microgel Solution (4))
　Microgel (4) (concentration of solid contents: 21.8% by mass) 2.243 parts
　1-methoxy-2-propanol 0.600 parts
(Production of Microgel (4))
A method of preparing a microgel (4) used for the microgel solution will be described below.
<Preparation of Polyvalent Isocyanate Compound (1)>
0.043 parts of bismuth tris(2-ethylhexanoate) (NEO-STANN U-600, manufactured by NITTO KASEI CO., LTD.) was added to an ethyl acetate (25.31 parts) suspension solution of 17.78 parts (80 molar equivalent) of isophorone diisocyanate and 7.35 parts (20 molar equivalent) of the following polyhydric phenol compound (1), and the solution was stirred. The reaction temperature was set to 50° C. immediately before a timing of heat generation being subsided, and the solution was stirred for 3 hours, thereby obtaining an ethyl acetate solution (50% by mass) of a polyvalent isocyanate compound (1).

Polyhydric phenol compound (1)

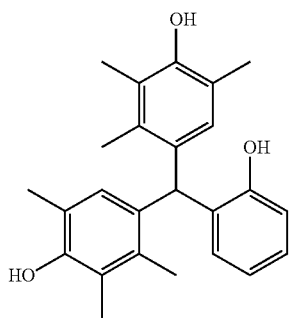

<Preparation of Microgel (4)>

The following oil phase components and the water phase component were mixed with each other and emulsified at 12,000 rpm for 10 minutes using a homogenizer. The obtained emulsion was stirred at 45° C. for 4 hours, 5.20 parts of a 10% by mass of aqueous solution of 1,8-diazabi-cyclo[5.4.0]undeca-7-ene-octylate (U-CAT SA102, manufactured by San-Apro Ltd.) was added thereto, and the solution was stirred at room temperature for 30 minutes and allowed to stand at 45° C. for 24 hours. The concentration of solid contents was adjusted to 21.8% by mass using distilled water, thereby obtaining an aqueous dispersion liquid of the microgel (4). The volume average particle diameter was measured using a dynamic light scattering type particle size distribution measuring device LB-500 (manufactured by Horiba Ltd.) according to a light scattering method, and the value was 0.28 μm.

(Oil Phase Components)
(Component 1) ethyl acetate 12.0 parts
(Component 2) adduct (50% by mass of ethyl acetate solution, manufactured by Mitsui Chemicals, Inc.) obtained by adding trimethylolpropane (6 mol) and xylene diisocyanate (18 mol) and adding methyl one-terminal polyoxyethylene (1 mol, repetition number of oxyethylene units: 90) thereto 3.76 parts
(Component 3) polyvalent isocyanate compound (1) (as 50% by mass of ethyl acetate solution) 15.0 parts
(Component 4) 65% by mass of solution of dipentaerythritol pentaacrylate (SR-399, manufactured by Sartomer Japan Inc.) in ethyl acetate 11.54 parts
(Component 5) 10% solution of sulfonate type surfactant (PIONINE A-41-C, manufactured by TAKEMOTO OIL & FAT Co., Ltd.) in ethyl acetate 4.42 parts (Water Phase Component)
Distilled water 46.87 parts <Synthesis of Binder Polymer (6)>

78.0 g of 1-methoxy-2-propanol was weighed in a three-neck flask and heated to 70° C. in a nitrogen stream. A mixed solution consisting of 52.1 g of BLEMMER PME-100 (methoxy diethylene glycol monomethacrylate, manufactured by NOF Corporation), 21.8 g of methyl methacrylate, 14.2 g of methacrylic acid, 2.15 g of hexakis(3-mercapto-propionic acid) dipentaerythritol, 0.38 g of V-601 (2,2'-azobis(isobutyric acid) dimethyl, manufactured by Wako Pure Chemical Industries, Ltd.), and 54 g of 1-methoxy-2-propanol was added dropwise to this reaction container over 2 hours and 30 minutes. After the dropwise addition, the solution was heated to 80° C., and the reaction was continued for another 2 hours. A mixed solution consisting of 0.04 g of V-601 and 4 g of 1-methoxy-2-propanol was added thereto, the solution was heated to 90° C., and the reaction was continued for 2.5 hours. After completion of the reaction, the reaction solution was cooled to room temperature. 137.2 g of 1-methoxy-2-propanol, 0.24 g of 4-hydroxyte-tramethylpiperidine-N-oxide, 26.0 g of glycidyl methacrylate, and 3.0 g of tetraethylammonium bromide were added to the reaction solution, and the resulting solution was stirred thoroughly and heated to 90° C.

After 18 hours, the reaction solution was cooled to room temperature (25° C.) and diluted by adding 99.4 g of 1-methoxy-2-propanol thereto.

The concentration of solid contents in a binder polymer (6) obtained in the above-described manner was 23% by mass, and the weight-average molecular weight thereof in terms of polystyrene which was measured by GPC was 35,000.

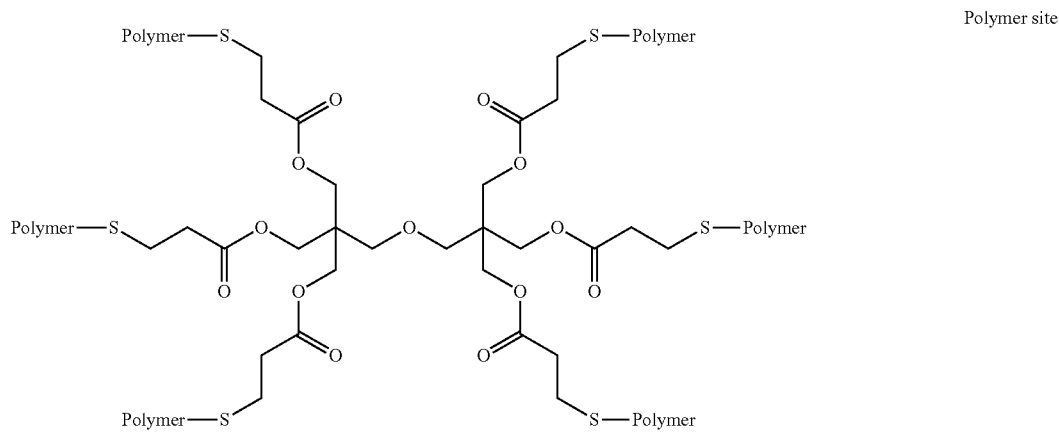

Polymer site

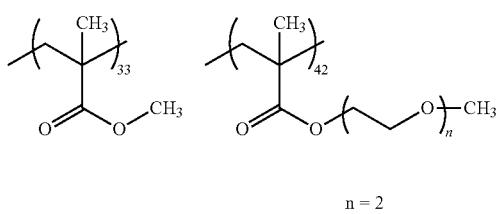
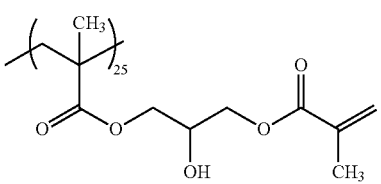

Binder polymer (6)

n = 2

<Synthesis of Binder Polymer (7)>

78.00 g of 1-methoxy-2-propanol was weighed in a three-neck flask and heated to 70° C. in a nitrogen stream. A mixed solution consisting of 52.8 g of BLEMMER PME-100 (methoxy diethylene glycol monomethacrylate, manufactured by NOF Corporation), 2.8 g of methyl methacrylate, 25.0 g of methacrylic acid, 6.4 g of hexakis(3-mercaptopropionic acid) dipentaerythritol, 1.1 g of V-601 (2,2'-azobis (isobutyric acid) dimethyl, manufactured by Wako Pure Chemical Industries, Ltd.), and 55 g of 1-methoxy-2-propanol was added dropwise to the reaction container for 2 hours and 30 minutes. After the dropwise addition, the solution was heated to 80° C., and the reaction was continued for another 2 hours. After 2 hours, a mixed solution consisting of 0.11 g of V-601 and 1 g of 1-methoxy-2-propanol was added thereto, the solution was heated to 90° C., and the reaction was continued for 2.5 hours. After completion of the reaction, the reaction solution was cooled to room temperature.

177.2 g of 1-methoxy-2-propanol, 0.28 g of 4-hydroxytetramethylpiperidine-N-oxide, 46.0 g of glycidyl methacrylate, and 3.4 g of tetraethylammonium bromide were added to the reaction solution, and the resulting solution was stirred thoroughly and heated to 90° C.

After 18 hours, the reaction solution was cooled to room temperature (25° C.) and diluted by adding 0.06 g of 4-methoxyphenol and 114.5 g of 1-methoxy-2-propanol thereto.

The concentration of solid contents in a binder polymer (7) obtained in the above-described manner was 23% by mass, and the weight-average molecular weight thereof in terms of polystyrene which was measured by GPC was 15,000.

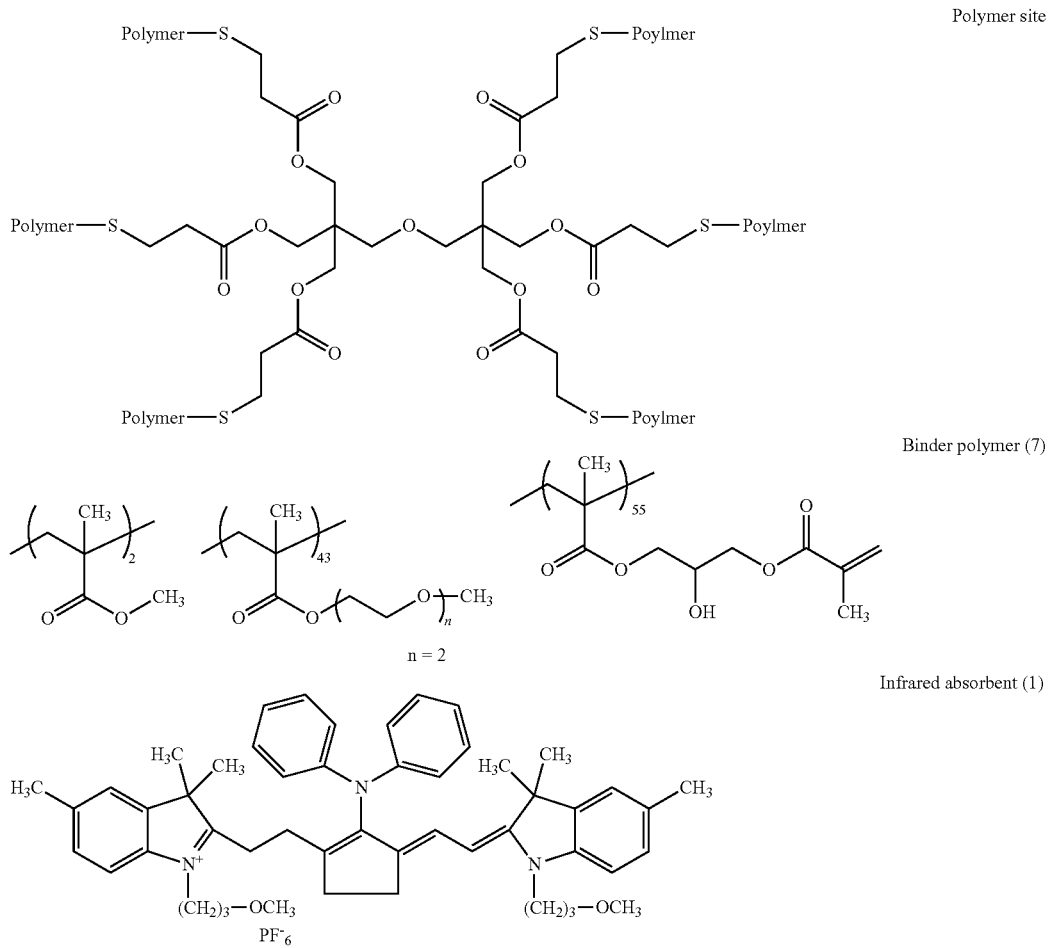

Polymer site

Binder polymer (7)

Infrared absorbent (1)

Fluorine-based surfactant (1)
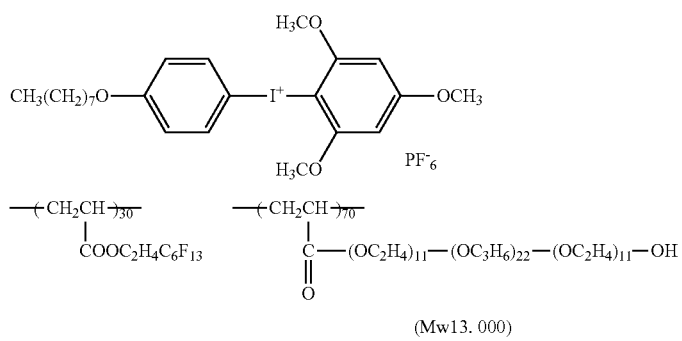
(Mw13.000)
Polymerization initiator (1)
Phosphonium compound (1)
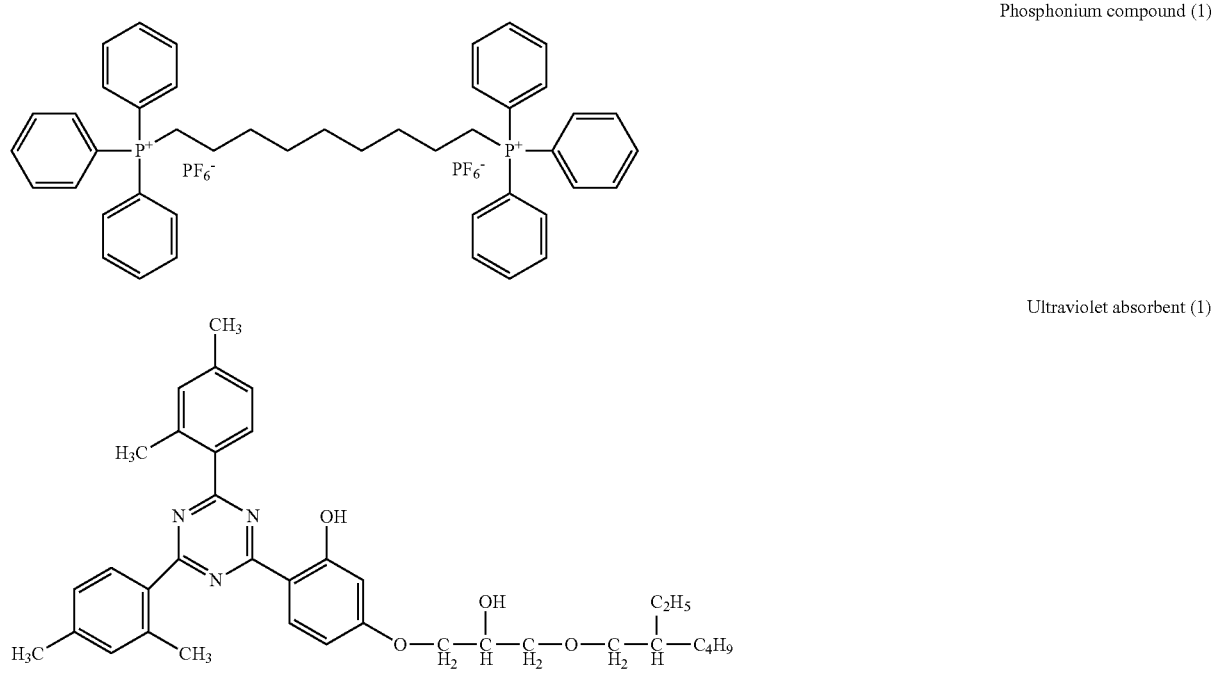
Ultraviolet absorbent (1)
Anionic surfactant 1
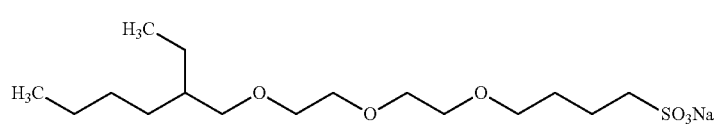
Low-molecular weight hydrophilie compound (1)
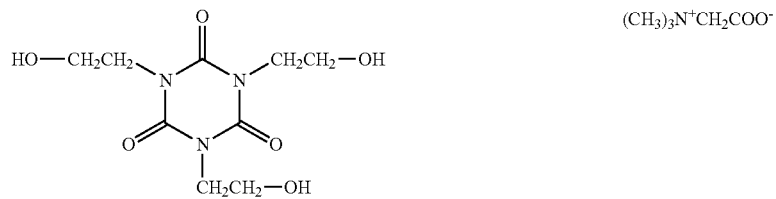
Low-molecular weight hydrophilie compound (2)
$(CH_3)_3N^+CH_2COO^-$ Borate compound (1)

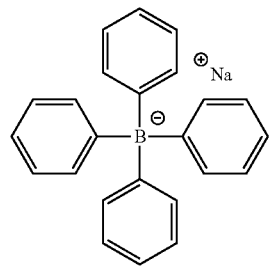

Polymerizable compound (1)

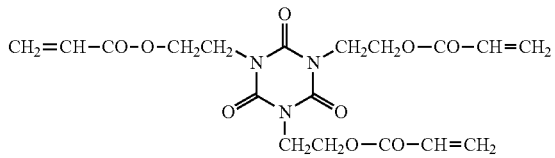

<Formation of Image Recording Layer 5>

An image recording layer 5 having a thickness of 1.2 μm was formed in the same manner as in the formation of the image recording layer 4, except that the amounts of the binder polymer (6) and binder polymer (7) of the image recording layer coating solution (4) in the formation of the image recording layer 4 were respectively changed to 0.2891 parts and 0.4574 parts.

<Formation of Image Recording Layer 6>

The undercoat layer was bar-coated with an image recording layer coating solution (6) with the following composition and dried in an oven at 100° C. for 60 seconds, thereby forming an image recording layer 6 having a thickness of 1.1 μm.

The image recording layer coating solution (6) was obtained by mixing a photosensitive solution (6) and a microgel solution (6) described below immediately before the coating and then stirring the solution.

<Photosensitive Solution (6)>

- Binder polymer (2) (the following structure; Mw: 50,000, n (number of ethylene oxide (EO) repeating units: 4)) 0.480 parts
- Infrared absorbent (1) (described above) 0.030 parts
- Borate compound (Sodium tetraphenylborate) 0.014 parts
- Polymerization initiator (1) (described above) 0.234 parts
- Polymerizable compound (tris(acryloyloxyethyl) isocyanurate, NK ESTER A-9300, manufactured by Shin-Nakamura Chemical Co., Ltd.) 0.192 parts
  - Low-molecular weight hydrophilic compound (1) (tris (2-hydroxyethyl)isocyanurate) 0.052 parts
- Anionic surfactant 1 (described above) 0.099 parts
- Oil sensitizing agent phosphonium compound (1) (the following structure)
  - 0.12 parts
- Oil sensitizing agent ammonium group-containing polymer (the following structure, reduced specific viscosity: 44 ml/g) 0.035 parts
- Oil sensitizing agent benzyldimethyloctyl ammonium·PF$_6$ salt 0.032 parts
- Colorant ethyl violet (the following structure) 0.030 parts
- Fluorine-based surfactant (1) (described above) 0.02 parts
- 2-butanone 1.091 parts
- 1-methoxy-2-propanol 8.609 parts

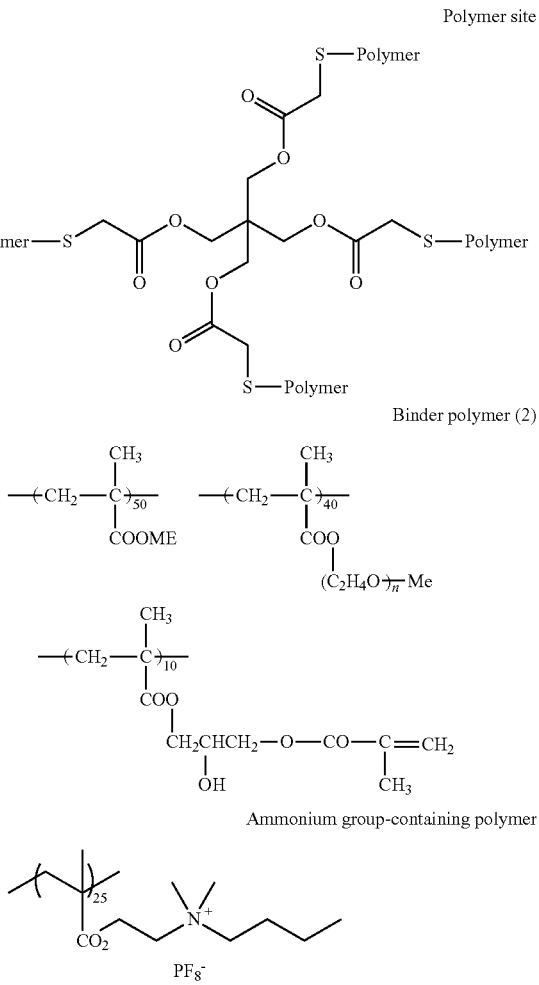

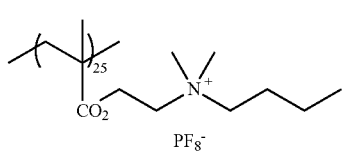

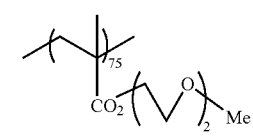

The numerical values on the lower right side of the parentheses of each constitutional unit of the binder polymer (2) and the ammonium group-containing polymer indicate the molar ratios. Me represents a methyl group.

Ethyl violet

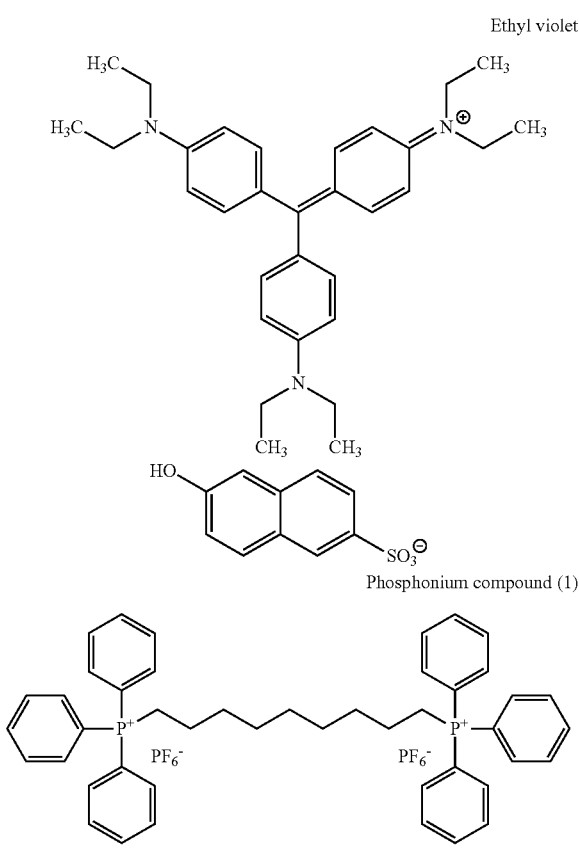

Phosphonium compound (1)

<Microgel Solution (6)>
Microgel (6) 1.580 parts
Distilled water 1.455 parts
(Preparation of Microgel (6))

A method of preparing a microgel (6) used for the microgel solution (6) will be described below.

10 parts of an adduct (TAKENATE D-110N, manufactured by Mitsui Chemicals Polyurethanes, Inc.) of trimethylolpropane and xylene diisocyanate, 5.54 parts of dipentaerythritol pentaacrylate (SR399, manufactured by Sartomer Japan Inc.), and 0.1 parts of PIONINE A-41C (manufactured by TAKEMOTO OIL & FAT Co., Ltd.), as oil phase components, were dissolved in 17 parts of ethyl acetate. As a water phase component, 40 parts of a 4% by mass of aqueous solution of PVA-205 was prepared. The oil phase components and the water phase components were mixed with each other and emulsified at 12,000 rpm for 10 minutes using a homogenizer. 25 parts of distilled water were added to the obtained emulsion, and the solution was stirred at room temperature (25° C., the same applies hereinafter) for 30 minutes and further stirred at 50° C. for 3 hours. The microgel solution obtained in this manner was diluted with distilled water such that the concentration of solid contents was set to 15% by mass, thereby preparing the microgel (6). The average particle diameter of the microgel measured by a light scattering method was 0.2 μm.

<Formation of Image Recording Layer 7>

An image recording layer aqueous coating solution containing thermoplastic polymer particles, an infrared absorbent, and polyacrylic acid described below was prepared, the pH thereof was adjusted to 3.6, and the support (on the printing surface side) was coated with the coating solution and dried at 50° C. for 1 minute, thereby forming an image recording layer 7. The coating amount after the drying of each component is shown below.

Thermoplastic polymer particles 0.7 g/m$^2$
Infrared absorbent IR-01 $1.20 \times 10^{-4}$ g/m$^2$
Polyacrylic acid 0.09 g/m$^2$ The thermoplastic polymer particles, the infrared absorbent IR-01, and the polyacrylic acid used for the image recording layer coating solution are as follows.

Thermoplastic polymer particles: styrene-acrylonitrile copolymer (molar ratio of 50:50), Tg: 99° C., volume average particle diameter: 60 nm Infrared absorbent IR-01: infrared absorbent having the following structure

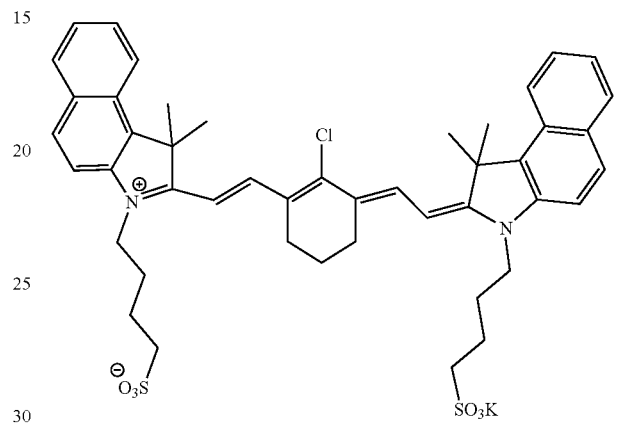

Polyacrylic acid Mw: 250,000

<Formation of Image Recording Layer 8>

The undercoat layer was bar-coated with an image recording layer coating solution (8) with the following composition and dried in a hot air dryer at 115° C. for 34 seconds, thereby forming an image recording layer 8 having a thickness of 1 μm.

(Image Recording Layer Coating Solution (8))
Methyl ethyl ketone 2.887 g
1-methoxy-2-propanol 3.275 g
Methanol 1.176 g
Binder polymer 1 (the following structure) 0.066 g
Binder polymer 2 (the following structure) 0.079 g
Binder polymer 3 (the following structure, 30% by mass of solution of methyl ethyl ketone) 0.350 g
Binder polymer 4 (the following structure, 9.5% by mass of solution of methyl ethyl ketone/cyclohexanone) 0.350 g
Polymerizable compound (the following structure, 85% by mass of solution of 1-methoxy-2-propanol) 0.463 g
Infrared absorbent (the following structure) 0.024 g
Polymerization initiator 1 (the following structure) 0.090 g
Polymerization initiator 2 (the following structure) 0.064 g
Sensitization assistant (the following structure) 0.074 g
Polymerization inhibitor (the following structure) 0.001 g
Mercapto compound (the following structure) 0.023 g
Additive 1 (the following structure) 0.025 g
Fluorine-based surfactant (the following structure) 0.010 g
(MEGAFACE F-780-F, manufactured by DIC Corporation, 10% by mass of solution of methyl ethyl ketone)
Pigment dispersion (the following structure; 22.5% by mass of concentration of solid contents, 31% by mass of methyl ethyl ketone, 31% by mass of 1-methoxy-2-propanol, and 15.5% by mass of methanol) 0.490 g Binder polymer 1
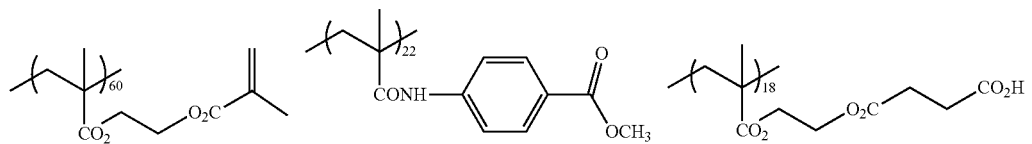
Binder polymer 2
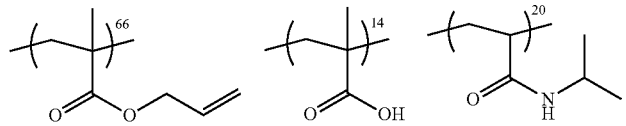
Binder polymer 3
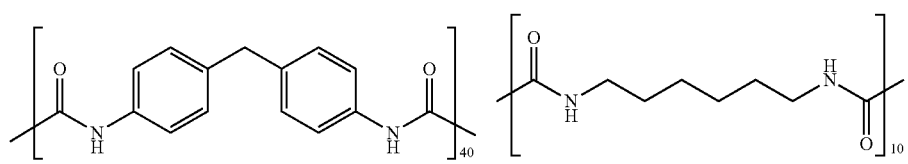
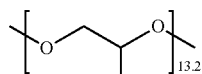
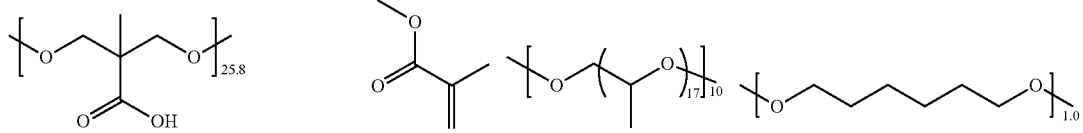
Binder polymer 4
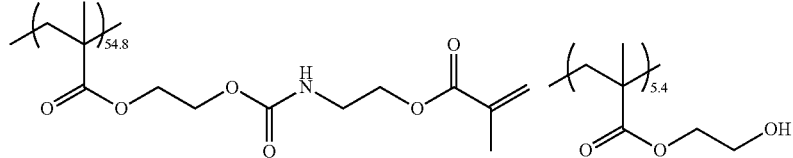
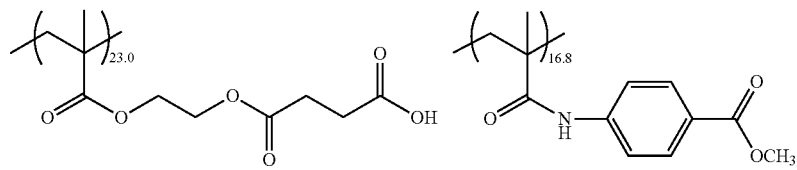
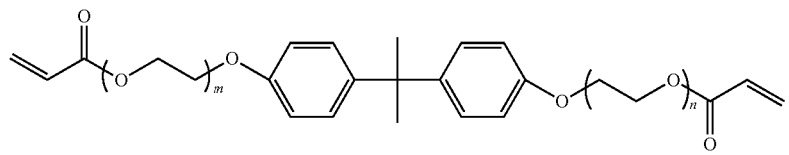
Polymerizable compound
Infrared absorbent
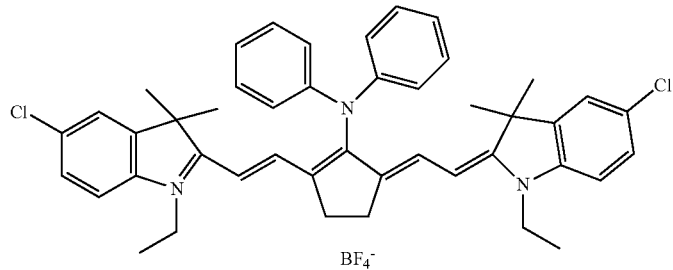

-continued
Polymerization initiator 1
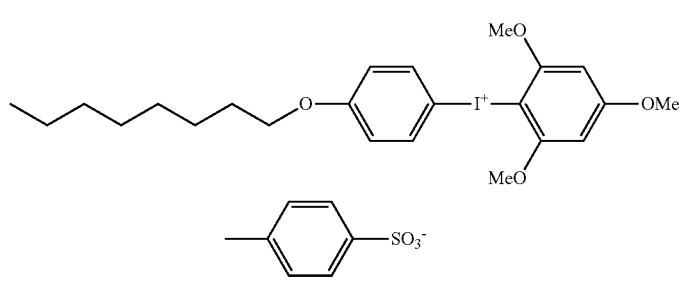
Polymerization initiator 2
Sensitization assistant
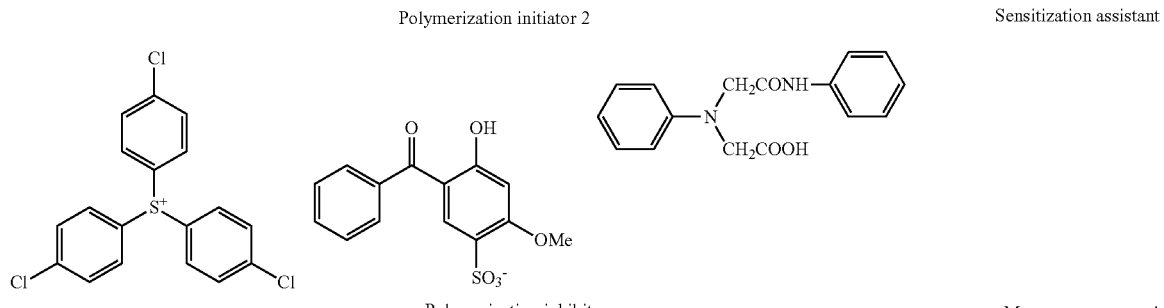
Polymerization inhibitor
Mercpato compound
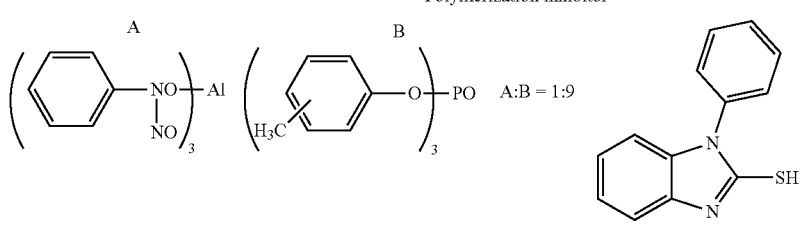
A:B = 1:9
Additive 1
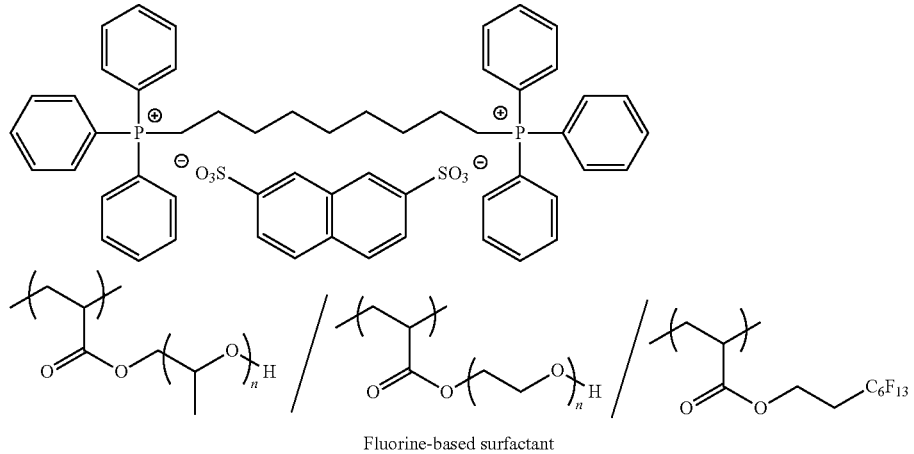
Fluorine-based surfactant
Pimgent dispersion
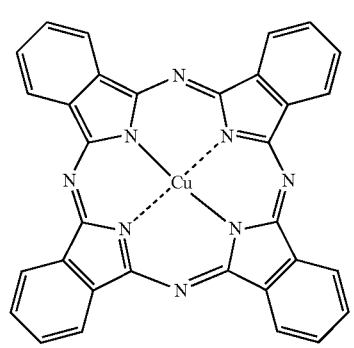
C. I. Pigment Blue 15:6
15wt %

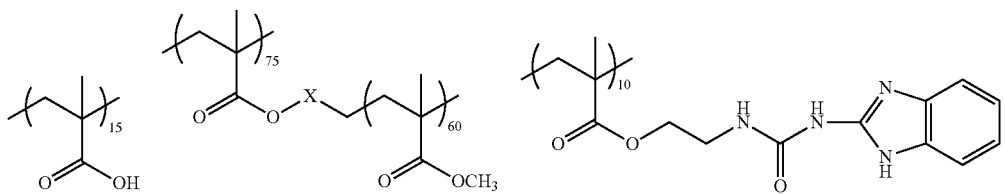
Dispersant A 6.75wt %

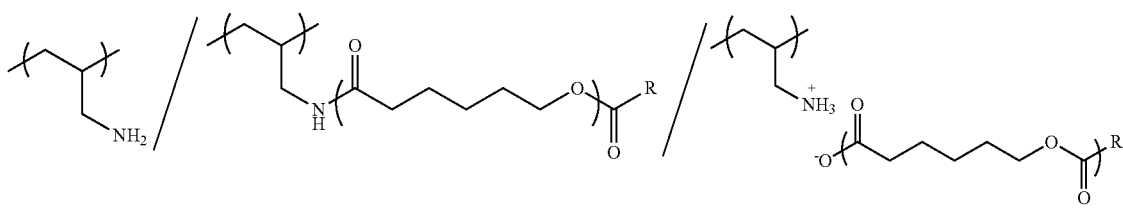
Dispersant B 0.75wt %

<Formation of Image Recording Layer 9>

The undercoat layer was bar-coated with an image recording layer coating solution (9) with the following composition and dried in an oven at 120° C. for 40 seconds, thereby forming an image recording layer 9 having a drying coating amount of 0.820 g/m².

(Image Recording Layer Coating Solution (9))

Infrared absorbent (A) (the following structure) 0.0300 g

Printing-out agent (the following structure) 0.0700 g

Polymerization initiator (A) (the following structure) 0.113 g

Borate compound (1) (Sodium tetraphenylborate) 0.0300 g

Polymerizable compound 0.311 g (mixture of 70 wt % of U-15HA (manufactured by Shin-Nakamura Chemical Co., Ltd.) and 30 wt % of diethylene glycol ethyl methyl ether)

Anionic surfactant 1 (described above) 0.00600 g

Fluorine-based surfactant (1) (described above) 0.00416 g 2-butanone 4.98 g 1-methoxy-2-propanol 3.10 g Methanol 3.02 g Microgel solution (3) (described above) 2.10 g Infrared absorbent (A)

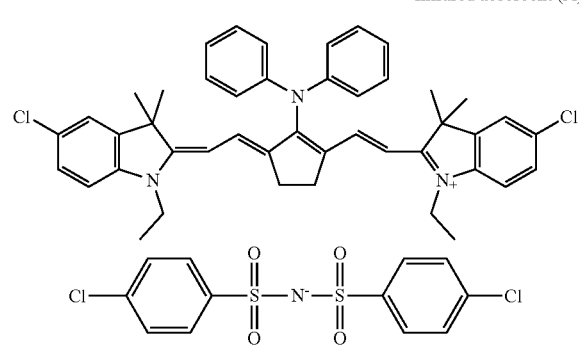

Polymerization initiator (A)

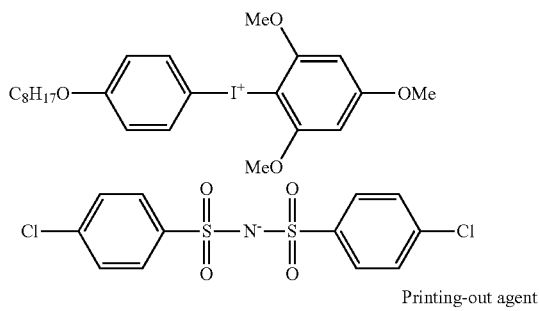

Printing-out agent

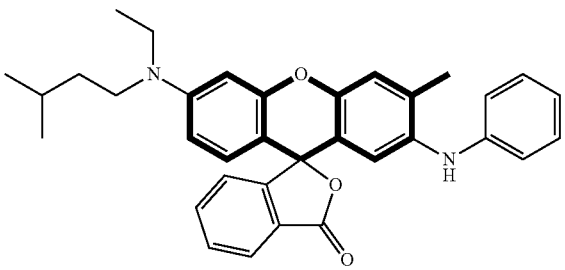

<Formation of Image Recording Layer 10>

The undercoat layer was bar-coated with an image recording layer coating solution (10) with the following composition and dried in an oven at 120° C. for 40 seconds, thereby forming an image recording layer 10 having a drying coating amount of 0.970 g/m².

(Image Recording Layer Coating Solution (10))

Infrared absorbent (A) (described above) 0.0225 g

Printing-out agent (described above) 0.0500 g

Polymerization initiator (A) (described above) 0.145 g

Borate compound (1) (Sodium tetraphenylborate) 0.0250 g

Polymerizable compound 0.381 g (mixture of 70 wt % of U-15HA (manufactured by Shin-Nakamura Chemical Co., Ltd.) and 30 wt % of diethylene glycol ethyl methyl ether)

Anionic surfactant 1 (described above) 0.00600 g
Fluorine-based surfactant (1) (described above) 0.00416 g
2-butanone 4.98 g
1-methoxy-2-propanol 3.10 g
Methanol 3.02 g
Microgel solution (3) (described above) 2.56 g <Formation of Non-Photosensitive Resin Layer 1>

The undercoat layer was bar-coated with a non-photosensitive resin layer coating solution (1) with the following composition and dried at 100° C. for 60 seconds, thereby forming a non-photosensitive resin layer 1 having a thickness of 0.5 μm.

(Non-Photosensitive Layer Coating Solution (1))
  Binder polymer A (described below) 2.465 parts by mass
  Phosphoric acid (85% by mass of aqueous solution 0.08 parts by mass
  Sulfophthalic acid (50% by mass of aqueous solution) 0.017 parts by mass
  Tricarballylic acid 0.017 parts by mass
  Colorant (VPB-Naps (naphthalene sulfonate of Victoria Pure Blue, manufactured by Hodogaya Chemical Co., Ltd.) 0.0014 parts by mass
  Fluorine-based surfactant (MEGAFACE F-780-F, manufactured by DIC Corporation, 30% by mass of solution of MEK) 0.009 parts by mass
  Methyl ethyl ketone (MEK) 7.93 parts by mass
  Methanol 6.28 parts by mass
  1-methoxy-2-propanol (MFG) 2.01 parts by mass The binder polymer A is a 16% by mass of solution having MFG and MEK at a mixing ratio of 1:1 for a condensation reaction product (mass average molecular weight: 85,000, acid content: 1.64 meq/g) of four types of monomers (1) to (4) described below.
  (1) 4,4-diphenylmethane diisocyanate 37.5 mol %
  (2) hexamethylene diisocyanate 12.5 mol %
  (3) 2,2-bis(hydroxymethyl)propionic acid 32.5 mol %
  (4) tetraethylene glycol 17.5 mol %

<Formation of Non-Photosensitive Resin Layer 2>

The undercoat layer was bar-coated with the following non-photosensitive resin layer coating solution (2) and dried in an oven at 100° C. for 60 seconds, thereby forming a non-photosensitive resin layer 2 having a thickness of 1 μm.

The non-photosensitive resin layer coating solution (2) was prepared in the same manner as in the photosensitive solution (3) of the image recording layer coating solution (3), except that the infrared absorbent (1), polymerization initiator (1), borate compound (1), and ultraviolet absorbent (1) were removed from the photosensitive solution (3) in the image recording layer coating solution (3).

<Formation of Protective Layer 1>

The image recording layer was bar-coated with a protective layer coating solution (1) with the following composition and dried in an oven at 120° C. for 60 seconds, thereby forming a protective layer 1 having a thickness of 0.18 μm.

(Protective Layer Coating Solution (1))
  Polyvinyl alcohol (Poval PVA105, saponification degree: 98 to 99 mol %, manufactured by KURARAY CO., LTD.) 1.00 part by mass
  Polyethylene glycol (PEG4000, manufactured by Tokyo Chemical Industry Co., Ltd.) 0.39 parts by mass
  Surfactant (RAPISOL A-80 (described below), manufactured by NOF Corporation) 0.01 parts by mass
  Water amount such that the total amount is 10 parts by mass

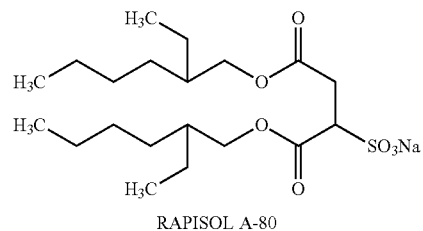

RAPISOL A-80

<Formation of Protective Layer 2>

The image recording layer or the non-photosensitive resin layer was bar-coated with a protective layer coating solution (2) with the following composition and dried in an oven at 120° C. for 60 seconds, thereby forming a protective layer 2 having a thickness of 0.18 μm.

(Protective Layer Coating Solution (2))
  Inorganic layered compound dispersion liquid (1) (described below) 3.2% by mass of aqueous solution 2.219 g
  Hydrophilic polymer (1) (the following structure, Mw: 30,000) 20% by mass of solution (64% by mass of methanol and 16% by mass of water) 0.3254 g
  Polyvinyl alcohol (CKS50 manufactured by Nippon Synthetic Chemical Industry Co., Ltd., sulfonic acid-modified, saponification degree: 99 mol % or more, degree of polymerization: 300) 6% by mass of aqueous solution 0.2465 g
  Polyvinyl alcohol (PVA-405 manufactured by KURARAY CO., LTD., saponification degree: 81.5 mol %, degree of polymerization: 500), 6% by mass of aqueous solution 0.0179 g
  Surfactant (RAPISOL A-80 (described above), manufactured by NOF Corporation) 80% by mass of aqueous solution 0.0143 g
  Silica particles (SNOWTEX MP-1040 manufactured by Nissan Chemical Corporation) 40% by mass of aqueous solution 0.0372 g
  Ion exchange water 4.699 g

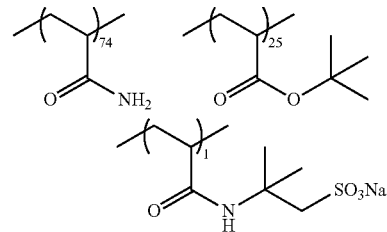

Hydrophilic polymer (1)

(Preparation of Inorganic Layered Compound Dispersion Liquid (1))

6.4 parts of synthetic mica Somasif ME-100 (manufactured by CO-OP CHEMICAL CO., LTD.) was added to 193.6 parts of ion exchange water and dispersed such that the volume average particle diameter (laser scattering method) was set to 3 μm using a homogenizer, thereby preparing an inorganic layered compound dispersion liquid (1). The aspect ratio of the dispersed particles was 100 or more.

<Formation of Protective Layer 3>

The image recording layer was bar-coated with a protective layer coating solution (3) with the following composition and dried in an oven at 120° C. for 60 seconds, thereby forming a protective layer 3 having a thickness of 0.18 μm.

(Protective Layer Coating Solution (3))

Inorganic layered compound dispersion liquid (1) (described above) 2.290 parts
Polyvinyl alcohol (CKS50 manufactured by Nippon Synthetic Chemical Industry Co., Ltd., sulfonic acid-modified, saponification degree: 99 mol % or more, degree of polymerization: 300) 6% by mass of aqueous solution 1.083 parts
Surfactant (RAPISOL A-80 (described above), manufactured by NOF Corporation) 80% by mass of aqueous solution 0.015 parts
Phosphoric acid (85% by mass of aqueous solution) 0.032 parts
Diammonium hydrogen phosphate 0.044 parts
Pure water 4.517 parts <Formation of Protective Layer 4>

The image recording layer was bar-coated with a protective layer coating solution (4) with the following composition and dried in an oven at 120° C. for 60 seconds, thereby forming a protective layer 4 having a thickness of 0.18 μm.

(Protective Layer Coating Solution (4))

Inorganic layered compound dispersion liquid (1) (described above) 2.212 parts
Polyvinyl alcohol (Gohseran L-3266, manufactured by The Nippon Synthetic Chemical Industry Co., Ltd., sulfonic acid-modified, saponification degree: 85 mol %) 6% by mass of aqueous solution 1.440 parts
Surfactant (PIONINE A-32-B (the following structure), manufactured by TAKEMOTO OIL & FAT Co., Ltd., 40% by mass of aqueous solution) 0.014 parts
Surfactant (SURFYNOL 465 (the following structure), manufactured by Nissin Chemical Co., Ltd.) 0.006 parts
Phosphoric acid (85% by mass of aqueous solution) 0.023 parts

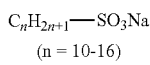

PIONINE A-32-B

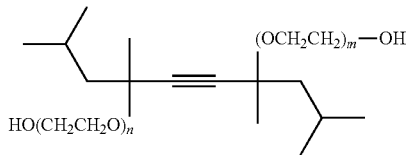

SURFYNOL 465

<Formation of Protective Layer 5>

The image recording layer was bar-coated with a protective layer coating solution (5) with the following composition and dried in an oven at 120° C. for 60 seconds, thereby forming a protective layer 5 having a thickness of 0.18 μm.

(Protective Layer Coating Solution (5))

Inorganic layered compound dispersion liquid (1) (described above) 1.5 parts
Hydrophilic polymer (2) (solid content) (the following structure, Mw: 30,000) 0.55 parts
Polyvinyl alcohol (CKS50 manufactured by Nippon Synthetic Chemical Industry Co., Ltd., sulfonic acid-modified, saponification degree: 99 mol % or more, degree of polymerization: 300) 6% by mass of aqueous solution 0.10 parts
Polyvinyl alcohol (PVA-405 manufactured by KURARAY CO., LTD., saponification degree: 81.5 mol %, degree of polymerization: 500), 6% by mass of aqueous solution 0.03 parts
Surfactant (RAPISOL A-80 (described above), manufactured by NOF Corporation) 80% by mass of aqueous solution 0.011 parts
Ion exchange water 6.0 parts Hydrophilic polymer (2)

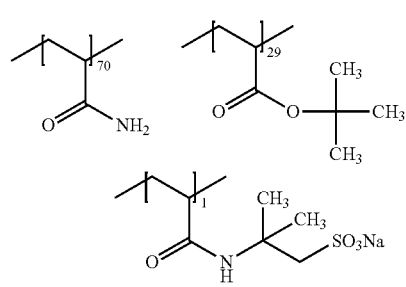

<Formation of Protective Layer 6>

The non-photosensitive resin layer was bar-coated with a protective layer coating solution (6) with the following composition and dried in an oven at 120° C. for 60 seconds, thereby forming a protective layer 6 having a thickness of 0.18 μm.

(Protective Layer Coating Solution (6))

Synthetic mica (SOMASIF ME-100, manufactured by CO-OP CHEMICAL CO., LTD., 8% aqueous dispersion liquid) 94 parts by mass
Polyvinyl alcohol (CKS-50, manufactured by Nippon Synthetic Chemical Industry Co, Ltd., degree of saponification: 99 mol %, degree of polymerization: 300) 58 parts by mass
Carboxy methyl cellulose (CELOGEN PR, manufactured by DKS Co., Ltd.) 24 parts by mass
Surfactant-1 (PLURONIC P-84, manufactured by BASF SE) 2.5 parts by mass
Surfactant-2 (EMALEX 710, manufactured by Nihon Emulsion Co., Ltd.) 5 parts by mass
Pure water 1,364 parts by mass PLURONIC P-84 described above is an ethylene oxide-propylene oxide block copolymer and EMALEX 710 is a polyoxyethylene lauryl ether.

<Formation of Back Coat Layer 1>

The support on the side opposite to the printing surface side was bar-coated with a back coat layer coating solution (1) with the following composition and dried at 100° C. for 30 seconds, thereby forming a back coat layer 1 having a thickness of 1.0 μm.

(Back Coat Layer Coating Solution (1))

Poly(methyl methacrylate) (Mw: 120,000, manufactured by Sigma-Aldrich) 10.0 parts by mass Fluorine-based surfactant (1) (described above) 0.05 parts by mass
Methyl ethyl ketone 90.0 parts by mass
Particles listed in Table A
    amount in which in-plane density is the value listed in Table A <Formation of Back Coat Layer 2>

The support on the side opposite to the printing surface side was bar-coated with the following back coat layer coating solution (2) and dried at 100° C. for 120 seconds, thereby forming a back coat layer 2 having a thickness of 0.3 μm.

(Preparation of Back Coat Layer Coating Solution (2))
Tetraethyl silicate (metal oxide) 50 parts by mass
Water 20 parts by mass
Methanol 15 parts by mass
Phosphoric acid 0.05 parts by mass After the above-described components were mixed and stirred, heat generation was started in approximately 5 minutes. The mixture was reacted for 60 minutes, and the following mixed solution was added thereto, thereby preparing a back coat layer coating solution (2).

Pyrogallol-formaldehyde condensation resin (Mw: 2000) 4 parts by mass
Dimethyl phthalate 5 parts by mass
    Fluorine-based surfactant (N-butyl perfluorooctane sulfonamide ethyl acrylate/polyoxyethylene acrylate copolymer (Mw: 20,000)) 0.7 parts by mass
Methanol 800 parts by mass
Particles listed in Table A
    amount in which in-plane density is the value listed in Table A <Formation of Back Coat Layer 3>

The support on the side opposite to the printing surface side was bar-coated with a back coat layer coating solution (3) with the following composition and dried at 100° C. for 120 seconds, thereby forming a back coat layer 3 having a thickness of 0.3 μm.

(Preparation of Back Coat Layer Coating Solution (3))
Tetraethyl silicate (metal oxide) 50 parts by mass
Water 20 parts by mass
Methanol 15 parts by mass
Phosphoric acid 0.05 parts by mass After the above-described components were mixed and stirred, heat generation was started in approximately 5 minutes. The mixture was reacted for 60 minutes, and the following mixed solution was added thereto, thereby preparing a back coat layer coating solution (3).

Pyrogallol-formaldehyde condensation resin (Mw: 2000) 4 parts by mass
Dimethyl phthalate 5 parts by mass
    Fluorine-based surfactant (N-butyl perfluorooctane sulfonamide ethyl acrylate/polyoxyethylene acrylate copolymer (Mw: 20,000)) 0.7 parts by mass
Methanol 800 parts by mass <Production of Printing Plate Precursor>

The above-described support, undercoat layer, image recording layer, non-photosensitive resin layer, protective layer, and back coat layer were combined as shown in Table A to produce a printing plate precursor.

That is, the support, the undercoat layer, the image recording layer or the non-photosensitive resin layer, and the protective layer described above were combined as shown in Table A to produce planographic printing plate precursors of Examples 1 to 30 and 33 to 35, printing key plate precursors of Examples 31 and 32, and planographic printing plate precursors of Comparative Examples 1 to 6.

TABLE A

| | | | Printing surface side | | | | Non-printing surface side Back coat layer |
|---|---|---|---|---|---|---|---|
| | Support | Undercoat layer | Image recording layer/ Non-photosensitive resin layer | Protective layer | Bekk smoothness (second) | Arithmetic average height (μm) | |
| Example 1 | 1 | — | Image recording layer 1 | — | 1100 | 0.1 | 1 |
| Example 2 | 1 | — | Image recording layer 1 | — | 1100 | 0.1 | 1 |
| Example 3 | 1 | — | Image recording layer 1 | — | 1100 | 0.1 | 1 |
| Example 4 | 1 | — | Image recording layer 1 | — | 1100 | 0.1 | 1 |
| Example 5 | 1 | — | Image recording layer 1 | — | 1100 | 0.1 | 1 |
| Example 6 | 1 | — | Image recording layer 1 | — | 1100 | 0.1 | 1 |
| Example 7 | 1 | — | Image recording layer 1 | — | 1100 | 0.1 | 1 |
| Example 8 | 1 | — | Image recording layer 1 | — | 1100 | 0.1 | 1 |
| Example 9 | 1 | — | Image recording layer 1 | — | 1100 | 0.1 | 1 |
| Example 10 | 1 | — | Image recording layer 1 | — | 1100 | 0.1 | 1 |
| Example 11 | 1 | — | Image recording layer 1 | — | 1100 | 0.1 | 1 |
| Example 12 | 1 | — | Image recording layer 1 | — | 1100 | 0.1 | 1 |
| Example 13 | 1 | — | Image recording layer 1 | — | 1100 | 0.1 | 1 |
| Example 14 | 1 | — | Image recording layer 1 | — | 1100 | 0.1 | 1 |

TABLE A-continued

| | | | | | | | |
|---|---|---|---|---|---|---|---|
| Example 15 | 2 | — | Image recording layer 1 | — | 1100 | 0.1 | 1 |
| Example 16 | 3 | — | Image recording layer 1 | — | 1100 | 0.1 | 1 |
| Example 17 | 4 | — | Image recording layer 1 | — | 1100 | 0.1 | 1 |
| Example 18 | 5 | — | Image recording layer 1 | — | 1100 | 0.1 | 1 |
| Example 19 | 6 | — | Image recording layer 1 | — | 950 | 0.2 | 1 |
| Example 20 | 7 | — | Image recording layer 1 | — | 1100 | 0.1 | 1 |
| Example 21 | 8 | — | Image recording layer 1 | — | 1100 | 0.1 | 1 |
| Example 22 | 9 | — | Image recording layer 1 | — | 1100 | 0.1 | 1 |
| Example 23 | 10 | — | Image recording layer 1 | — | 1100 | 0.1 | 1 |
| Example 24 | 11 | — | Image recording layer 2 | 1 | 1100 | 0.1 | 1 |
| Example 25 | 12 | 1 | Image recording layer 3 | 2 | 950 | 0.2 | 1 |
| Example 26 | 13 | 2 | Image recording layer 4 | 3 | 950 | 0.2 | 2 |
| Example 27 | 13 | 2 | Image recording layer 5 | 4 | 950 | 0.2 | 2 |
| Example 28 | 14 | 3 | Image recording layer 6 | 5 | 1100 | 0.1 | 1 |
| Example 29 | 15 | — | Image recording layer 7 | — | 1100 | 0.1 | 1 |
| Example 30 | 16 | 4 | Image recording layer 8 | 6 | 1100 | 0.1 | 1 |
| Example 31 | 16 | 5 | Non-photosensitive resin layer 1 | 6 | 1100 | 0.1 | 1 |
| Example 32 | 12 | 1 | Non-photosensitive resin layer 1 | 2 | 950 | 0.2 | 1 |
| Example 33 | 1 | — | Image recording layer 1 | — | 186 | 0.5 | 1 |
| Example 34 | 17 | 6 | Image recording layer 9 | — | 1040 | 0.1 | 2 |
| Example 35 | 18 | 7 | Image recording layer 10 | — | 1060 | 0.1 | 2 |
| Comparative Example 1 | 1 | — | Image recording layer 1 | — | 1100 | 0.1 | 1 |
| Comparative Example 2 | 1 | — | Image recording layer 1 | — | 1100 | 0.1 | 1 |
| Comparative Example 3 | 1 | — | Image recording layer 1 | — | 10 | 4.2 | 1 |
| Comparative Example 4 | 12 | 1 | Image recording layer 3 | 2 | 950 | 0.2 | 1 |
| Comparative Example 5 | 17 | 6 | Image recording layer 9 | — | 1040 | 0.1 | 3 |
| Comparative Example 6 | 18 | 7 | Image recording layer 10 | — | 1060 | 0.1 | 1 |

| | Non-printing surface side | | | | | |
|---|---|---|---|---|---|---|
| | Type of particles | Modulus of elasticity of particles | In-plane density of particles (particle/m²) | Bekk smoothness (second) | Arithmetic average height (μm) | Sum of reciprocals of Bekk smoothness | Sum of arithmetic average heights (μm) |
| Example 1 | Particle 1 | 0.55 | 1000 | 200 | 0.4 | 0.00591 | 0.5 |
| Example 2 | Particle 2 | 0.55 | 1000 | 85 | 1.0 | 0.01267 | 1.1 |
| Example 3 | Particle 3 | 0.55 | 1000 | 20 | 2.5 | 0.05091 | 2.6 |
| Example 4 | Particle 4 | 1.4 | 1000 | 270 | 0.3 | 0.00461 | 0.4 |
| Example 5 | Particle 5 | 1.4 | 1000 | 175 | 0.5 | 0.00662 | 0.6 |
| Example 6 | Particle 6 | 1.4 | 1000 | 25 | 1.8 | 0.04091 | 1.9 |
| Example 7 | Particle 7 | 1.4 | 1000 | 12 | 4.0 | 0.08424 | 4.1 |
| Example 8 | Particle 8 | 1.11 | 1000 | 201 | 0.5 | 0.00588 | 0.6 |
| Example 9 | Particle 9 | 1.11 | 1000 | 120 | 1.1 | 0.00924 | 1.2 |
| Example 10 | Particle 10 | 1.11 | 1000 | 25 | 2.0 | 0.04091 | 2.1 |
| Example 11 | Particle 11 | 1.11 | 1000 | 11 | 4.0 | 0.09182 | 4.1 |
| Example 12 | Particle 6 | 1.4 | 100 | 150 | 1.7 | 0.00758 | 1.8 |
| Example 13 | Particle 6 | 1.4 | 500 | 82 | 1.9 | 0.01310 | 2.0 |
| Example 14 | Particle 6 | 1.4 | 5000 | 17 | 2.4 | 0.05973 | 2.5 |
| Example 15 | Particle 6 | 1.4 | 1000 | 25 | 1.8 | 0.04901 | 1.9 |
| Example 16 | Particle 6 | 1.4 | 1000 | 25 | 1.8 | 0.04091 | 1.9 |
| Example 17 | Particle 6 | 1.4 | 1000 | 25 | 1.8 | 0.04901 | 1.9 |
| Example 18 | Particle 6 | 1.4 | 1000 | 25 | 1.8 | 0.04091 | 1.9 |

TABLE A-continued

| | | | | | | | |
|---|---|---|---|---|---|---|---|
| Example 19 | Particle 6 | 1.4 | 1000 | 25 | 1.8 | 0.04105 | 2.0 |
| Example 20 | Particle 6 | 1.4 | 1000 | 25 | 1.8 | 0.04901 | 1.9 |
| Example 21 | Particle 6 | 1.4 | 1000 | 25 | 1.8 | 0.04091 | 1.9 |
| Example 22 | Particle 6 | 1.4 | 1000 | 25 | 1.8 | 0.04091 | 1.9 |
| Example 23 | Particle 6 | 1.4 | 1000 | 25 | 1.8 | 0.04091 | 1.9 |
| Example 24 | Particle 6 | 1.4 | 1000 | 25 | 2.3 | 0.04091 | 2.4 |
| Example 25 | Particle 6 | 1.4 | 1000 | 25 | 1.5 | 0.04105 | 1.7 |
| Example 26 | Particle 6 | 1.4 | 1000 | 25 | 1.5 | 0.04105 | 1.7 |
| Example 27 | Particle 6 | 1.4 | 1000 | 25 | 1.5 | 0.04105 | 1.7 |
| Example 28 | Particle 6 | 1.4 | 1000 | 25 | 2.4 | 0.04901 | 2.5 |
| Example 29 | Particle 6 | 1.4 | 1000 | 25 | 1.6 | 0.04901 | 1.7 |
| Example 30 | Particle 6 | 1.4 | 1000 | 25 | 0.9 | 0.04901 | 1.0 |
| Example 31 | Particle 6 | 1.4 | 1000 | 25 | 0.9 | 0.04091 | 1.0 |
| Example 32 | Particle 6 | 1.4 | 1000 | 25 | 2.4 | 0.04105 | 2.6 |
| Example 33 | Particle 6 | 1.4 | 1000 | 25 | 1.8 | 0.04538 | 2.3 |
| Example 34 | Particle 6 | 1.4 | 1000 | 25 | 1.5 | 0.04105 | 1.6 |
| Example 35 | Particle 6 | 1.4 | 1000 | 25 | 1.5 | 0.04105 | 1.6 |
| Comparative Example 1 | — | — | — | 1200 | 0.1 | 0.00174 | 0.2 |
| Comparative Example 2 | Particle 6 | 1.4 | 10 | 1200 | 0.1 | 0.00174 | 0.2 |
| Comparative Example 3 | Particle 12 | 0.03 | 1000 | 15 | 4.2 | 0.16667 | 8.4 |
| Comparative Example 4 | — | — | — | 1200 | 1.5 | 0.00189 | 1.7 |
| Comparative Example 5 | — | — | — | 1200 | 0.1 | 0.00189 | 0.2 |
| Comparative Example 6 | — | — | — | 1200 | 0.1 | 0.00189 | 0.2 |

In Table A, the particles listed in the column of type of particles are as follows.
- Particle 1: ART PEARL J-4P (average particle diameter: 1.9 μm)
- Particle 2: ART PEARL J-5P (average particle diameter: 3.2 μm)
- Particle 3: ART PEARL J-6P (average particle diameter: 5.3 μm)
- Particle 4: ART PEARL J-3PY (average particle diameter: 1.2 μm)
- Particle 5: ART PEARL J-4PY (average particle diameter: 2.2 μm)
- Particle 6: ART PEARL J-6PF (average particle diameter: 4 μm)
- Particle 7: ART PEARL J-7PY (average particle diameter: 6 μm)
- Particle 8: Tospearl 120 (average particle diameter: 2 μm)
- Particle 9: Tospearl 130 (average particle diameter: 3 μm)
- Particle 10: Tospearl 145 (average particle diameter: 4.5 μm)
- Particle 11: Tospearl 2000B (average particle diameter: 6 μm)
- Particle 12: ART PEARL C-800 transparent (average particle diameter: 6 μm)

The following evaluations were performed on the obtained printing plate precursor. The evaluation results are shown in Table B.

<Development Delay-Preventing Property>

(1) Printing Plate Precursor for On-Press Development (Planographic Printing Plate Precursors of Examples 1 to 27 and 33 to 35 and Comparative Examples 1 to 6, and Printing Key Plate Precursor of Example 32)

A total of 50 sheets were laminated by directly contacting the surface of the printing plate precursor on the printing surface side and the surface of the printing plate precursor on the side opposite to the printing surface side, and then the laminate was pressure-bonded at a pressure of 35 kgf/cm² for 8 days. In the printing plate precursor which had undergone this operation, the planographic printing plate precursor was set in Trendsetter 3244 manufactured by Creo, and was image-wise exposed under conditions of a resolution of 2,400 dpi, an output of 7 W, an outer drum rotation speed of 150 rpm, and a plate surface energy of 110 mJ/cm². The planographic printing plate precursor after image exposure and the printing key plate precursor not subjected to image exposure were mounted on an offset rotary printing machine manufactured by TOKYO KIKAI SEISAKUSHO, LTD., and using SOIBI KKST-S(red) manufactured by InkTec Corporation as printing ink for newspaper and ECO SEVEN N-1 manufactured by SAKATA INX CORPORATION as dampening water, printing was performed on newsprint paper at a speed of 100,000 sheets/hour. The number of sheets by the on-press development was measured based on the number of sheets of printing paper required until the on-press development of an unexposed area of the image recording layer on the printing machine was completed and the ink was not transferred to the non-image area. Thereafter, development delay-preventing property was evaluated according to the following standard. 5 to 3 is the allowable range.

5: number of sheets by the on-press development, which is equal to or less than the sum of the number of sheets by the on-press development of the printing plate precursor not pressure-bonded and 3 sheets 4: number of sheets by the on-press development, which is equal to or more than the sum of the number of sheets by the on-press development of the printing plate precursor not pressure-bonded and 4 sheets, and is equal to or less than the sum of the number of sheets by the on-press development of the printing plate precursor not pressure-bonded and 5 sheets 3: number of sheets by the on-press development, which is equal to or more than the sum of the number of sheets by the on-press development of the printing plate precursor not pressure-bonded and 6 sheets, and is equal to or less than the sum of the number of sheets by the on-press development of the printing plate precursor not pressure-bonded and 10 sheets 2: number of sheets by the on-press development, which is equal to or more than the sum of the number of sheets by the on-press development of the printing plate precursor not pressure-bonded and 11 sheets, and is equal to or less than the sum of the number of sheets by the on-press development of the printing plate precursor not pressure-bonded and 15 sheets 1: number of sheets by the on-press development, which is equal to or more than the sum of the number of sheets by the on-press development of the printing plate precursor not pressure-bonded and 16 sheets (2) Printing Plate Precursor for Development with Developer (Planographic Printing Plate Precursor of Example 28)

A total of 50 sheets were laminated by directly contacting the surface of the printing plate precursor on the printing surface side and the surface of the printing plate precursor on the side opposite to the printing surface side, and then the laminate was pressure-bonded at a pressure of 35 kgf/cm$^2$ for 8 days. The printing plate precursor which had undergone this operation was exposed using Luxel PLATESETTER T-6000III (manufactured by Fujifilm Corporation) equipped with an infrared semiconductor laser under conditions of an external surface drum rotation speed of 1,000 rpm (resolution per minute), a laser output of 70%, and a resolution of 2,400 dpi (dot per inch). The exposed image had a solid image and a 50% halftone dot chart.

Figure 4:
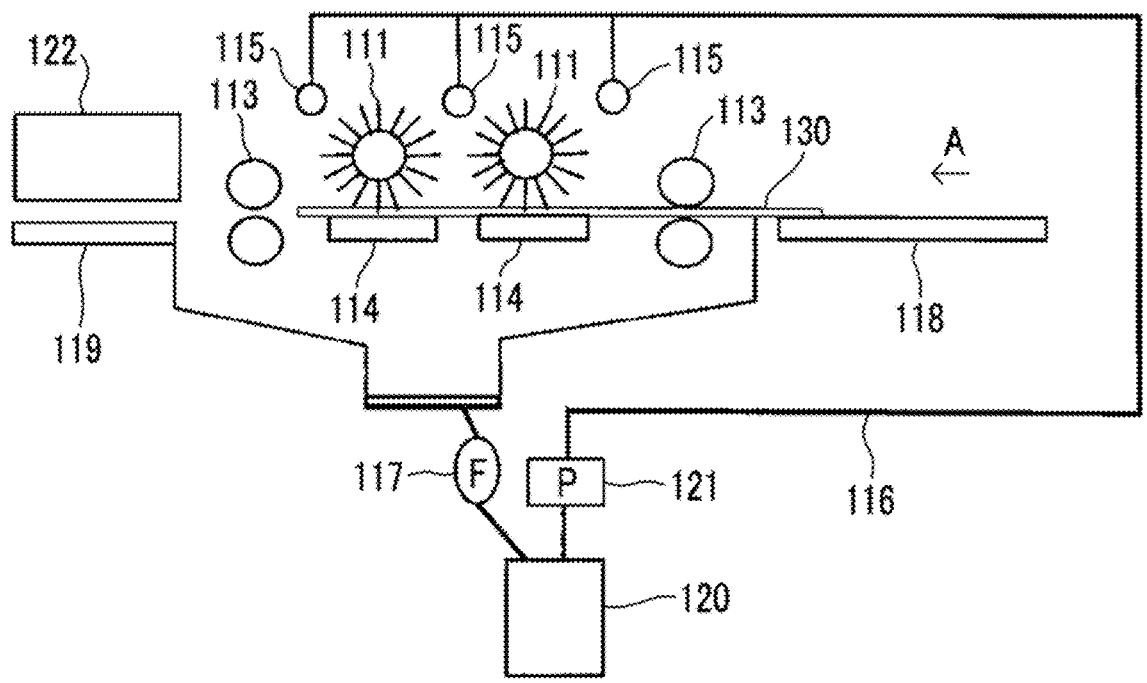
FIG. 4 is a schematic view illustrating a structure of an example of a development treatment device which can be suitably used in the present invention.

Next, using a developer 1 with the following composition, a development treatment was performed using an automatic development treatment machine having the structure shown in FIG. 4 to obtain a planographic printing plate.

The development treatment device shown in FIG. 4 is an automatic development treatment machine having two rotating brush rolls 111. As the rotating brush roll 111, a brush roll having an outer diameter of 55 mm, in which fibers made of polybutylene terephthalate (diameter: 200 μm, bristle length: 7 mm) were implanted was used, and the rotating brush roll 111 was rotated 120 rotation per minute (circumferential speed of the tip of the brush: 0.94 m/s) in the same direction as the transport direction.

The exposed printing plate precursor 130 was transported from a plate supply stand 118 to a plate discharge stand 119 on a transport guide plate 114 at a transport speed of 60 cm/min in the illustrated transport direction between two pairs of transport rolls 113, such that the printing plate precursor 130 passed between the rotating brush roll 111 and the transport guide plate 114 facing the rotating brush roll 111.

Three spray pipes 115 supplied a developer stored in a developer tank 120 from a circulation pump 121 through a pipe line 116 and a filter 117, and the developer was supplied by showering from each spray pipe 115 to the plate surface. The capacity of the developer tank 120 was 20 liters, and the developer was used by being circulated. The printing plate discharged from the developing machine was dried by a dryer 122 without washing with water.

<Developer 1>
Following surfactant-1 (PELEX NBL manufactured by Kao Corporation) 7.43 g
Following surfactant-2 (Newcol B13 manufactured by NIPPON NYUKAZAI CO., LTD.) 1.45 g
Following surfactant-3 (SURFYNOL 2502 manufactured by Air Products and Chemicals, Inc.) 0.4 g
Benzyl alcohol 0.6 g
Sodium gluconate 2.77 g
Disodium hydrogenphosphate 0.3 g
Sodium hydrogen carbonate 0.22 g
Anti-foaming agent (SILCOLAPSE432 manufactured by Bluester Silicones USA Corp.) 0.005 g
Water 86.83 g (pH: 8.5)

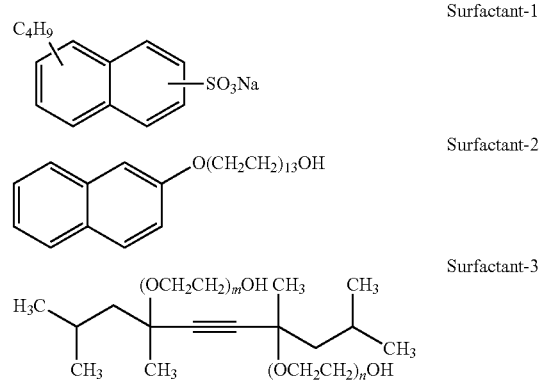

The obtained 5 cm×5 cm of planographic printing plate was observed with a loupe having a magnification of 25 times, and the number of residual films was counted. Thereafter, development delay-preventing property was evaluated according to the following standard. 5 to 3 is the allowable range.

5: the number of residual films was 0.
4: the number of residual films was 1 or 2.
3: the number of residual films was in a range of 3 to 10.
2: the number of residual films was in a range of 11 to 50.
1: the number of residual films was 51 or more.

(3) Printing Plate Precursor for Development with Developer (Planographic Printing Plate Precursor of Example 29)

A total of 50 sheets were laminated by directly contacting the surface of the printing plate precursor on the printing surface side and the surface of the printing plate precursor on the side opposite to the printing surface side, and then the laminate was pressure-bonded at a pressure of 35 kgf/cm$^2$ for 8 days. The printing plate precursor which had undergone this operation was subjected to image exposure and development treatment in the same manner as in the above-described (2) Printing plate precursor for development with developer to obtain a printing plate. However, the following developer 2 was used as the developer. With regard to the obtained printing plate, the development delay-preventing property was evaluated in the same manner as in the above-described (2) Printing plate precursor for development with developer.

<Developer 2>
Surfactant 4 (DOW FAX3B2 manufactured by Dow Chemical) (described below) 0.7 parts by mass
Ethylene glycol 0.7 parts by mass
Dextrin (AMYCOL Nol manufactured by NIPPON STARCH CHEMICAL CO., LTD.) 3.9 parts by mass
Monopotassium dihydrogenphosphate 2.7 parts by mass
Potassium hydroxide 0.7 parts by mass Anti-foaming agent (SILCOLAPSE432 manufactured by Bluester Silicones USA Corp.) 0.005 parts by mass
Water 91.30 parts by mass (pH: 7.0)

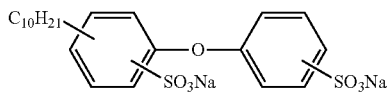
Surfactant-4

(4) Printing Plate Precursor for Development with Developer (Planographic Printing Plate Precursor of Example 30 and Printing Key Plate Precursor of Example 31)

A total of 50 sheets were laminated by directly contacting the surface of the printing plate precursor on the printing surface side and the surface of the printing plate precursor on the side opposite to the printing surface side, and then the laminate was pressure-bonded at a pressure of 35 kgf/cm² for 8 days. The planographic printing plate precursor of Example 30, which had undergone this operation, was set in Trendsetter 3244 manufactured by Creo, and was image-wise exposed under conditions of a resolution of 2,400 dpi, an output of 5 W, an outer drum rotation speed of 185 rpm, and a plate surface energy of 65 mJ/cm². The printing key plate precursor of Example 31 was not image-wise exposed to light.

Next, using an automatic developing machine LP-1310 News II manufactured by FUJIFILM Corporation, a development treatment was performed at a transport speed (line speed) of 2 m/min and a development temperature of 30° C. As a developer, a 1:4 water diluent of HN-D manufactured by FUJIFILM Corporation was used, as a development replenisher, a 1:1.4 water diluent of FCT-421 was used, and as a finisher, a 1:1 water diluent of HN-GV manufactured by FUJIFILM Corporation was used. With regard to the obtained printing plate, the development delay-preventing property was evaluated in the same manner as in the above-described (2) Printing plate precursor for development with developer.

<Multiple-Plate Feeding Preventing Property>

A laminate in which 100 printing plate precursors were laminated in the same orientation without using interleaving paper was set in a CTP plate setter "AMZI setter" manufactured by NEC Engineering, and an operation of taking out the plates one by one from the top of the laminate was performed 100 times in a row. Plate handling property in this case was evaluated according to the following standard. As multiple-plate feeding preventing property, 5 to 3 is the allowable range.
  5: phenomenon in which the next plate did not lift in a case of lifting the plate was 100%.
  4: phenomenon in which the next plate was lifted in a case of lifting the plate and did not drop immediately was 1% or less of the total.
  3: phenomenon in which the next plate was lifted in a case of lifting the plate and was not peeled off by a first handling operation was 1% or less of the total.
  2: phenomenon in which the next plate was lifted in a case of lifting the plate and was not peeled off by a first handling operation was more than 1% and 5% or less of the total.
  1: phenomenon in which the next plate was lifted in a case of lifting the plate and was not peeled off by a first handling operation was more than 5% of the total.

<Falling-Preventing Property of Convex Portion>

After the humidity of the printing plate precursor was adjusted in an environment of 25° C. at 60% RH for 2 hours, the printing plate precursor was punched into a size of 2.5 cm×2.5 cm and attached to a continuous load type scratch resistance strength tester TYPE-18 (manufactured by Shinto Scientific Co., Ltd.), the punched printing plate precursor was set on a printing plate precursor which had not been punched such that surface on the side opposite to the printing surface side of the punched printing plate precursor was brought into contact with the surface on the printing surface side of printing plate precursor which had not been punched, and several sites of the printing plate precursor were rubbed at a load of 0 to 1,500 gf. The surface on the printing surface side, which had been rubbed, was observed visually and with a scanning electron microscope (SEM), and falling level of the convex portion of the outermost layer surface on the printing surface side was evaluated according to the following standard. 5 to 3 is the allowable range.
  5: No falling at all
  4: Out of 100 convex portions, 1 or more and less than 5 of falling
  3: Out of 100 convex portions, 5 or more and less than 10 of falling
  2: Out of 100 convex portions, 10 or more and less than 50 of falling
  1: Out of 100 convex portions, 50 or more of falling <Scratch-Preventing Property>

(1) Printing Plate Precursor for On-Press Development

After the humidity of the printing plate precursor was adjusted in an environment of 25° C. at 60% RH for 2 hours, the printing plate precursor was punched into a size of 2.5 cm×2.5 cm and attached to a continuous load type scratch resistance strength tester TYPE-18 (manufactured by Shinto Scientific Co., Ltd.), the punched printing plate precursor was set on a printing plate precursor which had not been punched such that surface on the side opposite to the printing surface side of the punched printing plate precursor was brought into contact with the surface on the printing surface side of printing plate precursor which had not been punched, and several sites of the printing plate precursor were damaged at a load of 0 to 1,500 gf. In the scratched printing plate precursor, the planographic printing plate precursor was set in Trendsetter 3244 manufactured by Creo, and was image-wise exposed under conditions of a resolution of 2,400 dpi, an output of 7 W, an outer drum rotation speed of 150 rpm, and a plate surface energy of 110 mJ/cm². The planographic printing plate precursor after image exposure and the printing key plate precursor not subjected to image exposure were mounted on an offset rotary printing machine manufactured by TOKYO KIKAI SEISAKUSHO, LTD., and using SOIBI KKST-S(red) manufactured by InkTec Corporation as printing ink for newspaper and ECO SEVEN N-1 manufactured by SAKATA INX CORPORATION as dampening water, printing was performed on newsprint paper at a speed of 100,000 sheets/hour. In the printing process, the 1,000th printed article was sampled, the degree of scratches and stains due to scratch was observed visually and with a loupe having a magnification of 6 times, and scratch-preventing property was evaluated according to the following standard. 5 to 3 is the allowable range.
  5: there were no scratches and stains which can be confirmed with the loupe having a magnification of 6 times.

4: although scratches and stains were not visually confirmed, scratches and stains which can be confirmed with the loupe having a magnification of 6 times was found at one site.

3: although scratches and stains were not visually confirmed, scratches and stains which can be confirmed with the loupe having a magnification of 6 times was found at several sites.

2: scratches and stains which can be confirmed visually was found at several sites.

1: scratches and stains which can be confirmed visually was found on the entire surface.

(2) Printing Plate Precursor for Development with Developer

After the humidity of the printing plate precursor was adjusted in an environment of 25° C. at 60% RH for 2 hours, the printing plate precursor was punched into a size of 2.5 cm×2.5 cm and attached to a continuous load type scratch resistance strength tester TYPE-18 (manufactured by Shinto Scientific Co., Ltd.), the punched printing plate precursor was set on a printing plate precursor which had not been punched such that surface on the side opposite to the printing surface side of the punched printing plate precursor was brought into contact with the surface on the printing surface side of printing plate precursor which had not been punched, and several sites of the printing plate precursor were damaged at a load of 0 to 1,500 gf. In the scratched printing plate precursor, the planographic printing plate precursor was set in Trendsetter 3244 manufactured by Creo, and was imagewise exposed under conditions of a resolution of 2,400 dpi, an output of 7 W, an outer drum rotation speed of 150 rpm, and a plate surface energy of 110 mJ/cm². The planographic printing plate precursor after image exposure and the printing key plate precursor not subjected to image exposure were developed according to the method described for the printing plate precursor for development with a developer in the above-described evaluation of development delay-preventing property to obtain a printing plate.

The obtained printing plate was mounted on an offset rotary printing machine manufactured by TOKYO KIKAI SEISAKUSHO, LTD., and using SOIBI KKST-S(red) manufactured by InkTec Corporation as printing ink for newspaper and ECO SEVEN N-1 manufactured by SAKATA INX CORPORATION as dampening water, printing was performed on newsprint paper at a speed of 100,000 sheets/hour. In the printing process, the 1,000th printed article was sampled, the degree of scratches and stains due to scratch was observed visually and with a loupe having a magnification of 6 times, and scratch-preventing property was evaluated according to the following standard. 5 to 3 is the allowable range.

5: there were no scratches and stains which can be confirmed with the loupe having a magnification of 6 times.

4: although scratches and stains were not visually confirmed, scratches and stains which can be confirmed with the loupe having a magnification of 6 times was found at one site.

3: although scratches and stains were not visually confirmed, scratches and stains which can be confirmed with the loupe having a magnification of 6 times was found at several sites.

2: scratches and stains which can be confirmed visually was found at several sites.

1: scratches and stains which can be confirmed visually was found on the entire surface.

TABLE B

| | Development delay-preventing property | Multiple-plate feeding preventing property | Falling-preventing property of convex portion | Scratch-preventing property |
|---|---|---|---|---|
| Example 1 | 5 | 3 | 5 | 5 |
| Example 2 | 5 | 4 | 5 | 5 |
| Example 3 | 4 | 5 | 4 | 5 |
| Example 4 | 5 | 3 | 5 | 5 |
| Example 5 | 5 | 3 | 5 | 5 |
| Example 6 | 5 | 5 | 4 | 5 |
| Example 7 | 5 | 5 | 3 | 5 |
| Example 8 | 5 | 3 | 5 | 5 |
| Example 9 | 5 | 3 | 5 | 5 |
| Example 10 | 5 | 5 | 5 | 5 |
| Example 11 | 5 | 5 | 4 | 5 |
| Example 12 | 5 | 4 | 4 | 5 |
| Example 13 | 5 | 4 | 4 | 5 |
| Example 14 | 5 | 5 | 4 | 5 |
| Example 15 | 5 | 5 | 4 | 5 |
| Example 16 | 5 | 5 | 4 | 5 |
| Example 17 | 5 | 5 | 4 | 5 |
| Example 18 | 5 | 5 | 4 | 5 |
| Example 19 | 5 | 5 | 4 | 5 |
| Example 20 | 5 | 5 | 4 | 5 |
| Example 21 | 5 | 5 | 4 | 5 |
| Example 22 | 5 | 5 | 4 | 5 |
| Example 23 | 5 | 5 | 4 | 5 |
| Example 24 | 5 | 5 | 4 | 5 |
| Example 25 | 5 | 5 | 5 | 5 |
| Example 26 | 5 | 5 | 5 | 5 |
| Example 27 | 5 | 5 | 5 | 5 |
| Example 28 | 5 | 5 | 5 | 5 |
| Example 29 | 5 | 5 | 4 | 5 |
| Example 30 | 5 | 3 | 5 | 5 |
| Example 31 | 5 | 3 | 4 | 5 |
| Example 32 | 5 | 5 | 5 | 5 |
| Example 33 | 5 | 3 | 5 | 5 |
| Example 34 | 5 | 5 | 5 | 5 |
| Example 35 | 5 | 5 | 5 | 5 |
| Comparative Example 1 | 5 | 1 | 5 | 5 |
| Comparative Example 2 | 5 | 1 | 5 | 5 |
| Comparative Example 3 | 1 | 4 | 1 | 5 |
| Comparative Example 4 | 5 | 1 | 5 | 5 |
| Comparative Example 5 | 5 | 1 | 5 | 5 |
| Comparative Example 6 | 5 | 1 | 5 | 5 |

From the results shown in Table B, it is found that the printing plate precursor according to the embodiment of the present invention is excellent in all of the characteristics of multiple-plate feeding preventing property, falling-preventing property of convex portion, scratch-preventing property, and development delay-preventing property, even in a case of eliminating an interleaving paper. On the other hand, it is found that the planographic printing plate precursor for comparison shows inferior results in one or more of the above-described characteristics. Further, it is found that the prevention of multiple-plate feeding and the prevention of development delay cannot be achieved at the same time.

Particularly, in the printing plate precursor for on-press development according to the present invention, it is possible to effectively prevent delay in on-press development while maintaining excellent multiple-plate feeding preventing property, falling-preventing property of convex portion, and scratch-preventing property.

It is possible to provide a printing plate precursor which have, even in a case of eliminating an interleaving paper, excellent characteristics such as preventing property of multiple-plate feeding in a step of taking out a precursor from a laminate, falling-preventing property of a convex portion provided on an outermost layer surface of the precursor, scratch-preventing property due to the convex portion provided on the outermost layer surface of the precursor, and development delay-preventing property due to the convex portion provided on the outermost layer surface of the precursor; and a printing plate precursor laminate, a method for making a printing plate, and a printing method, in which the printing plate precursor is used.

The present invention has been described with reference to detailed and specific embodiments, but various changes or modifications can be made without departing from the spirit and the scope of the present invention and this is apparent to those skilled in the art.

The present application is based on Japanese Patent Application (JP2018-185921) filed on Sep. 28, 2018, Japanese Patent Application (JP2019-080418) filed on Apr. 19, 2019, and Japanese Patent Application (JP2019-109673) filed on Jun. 12, 2019, and the contents of which are incorporated herein by reference.

EXPLANATION OF REFERENCES

50: Main electrolytic cell
51: AC power source
52: Radial drum roller
53a, 53b: Main pole
54: Electrolyte supply port
55: Electrolyte
56: Slit
57: Electrolyte passage
58: Auxiliary anode
60: Auxiliary anode cell
W: Aluminum plate
410: Anodizing device
412: Power supply tank
414: Electrolytic treatment tank
416: Aluminum plate
418, 426: Electrolyte
420: Power supply electrode
422, 428: Roller
424: Nip roller
430: Electrolytic electrode
432: Tank wall
434: DC power source
111: Rotating brush roll
113: Transport roll
114: Transport guide plate
115: Spray pipe
116: Pipe line
117: Filter
118: Plate supply stand
119: Plate discharge stand
120: Developer tank
121: Circulation pump
122: Dryer
130: Printing plate precursor
1: Aluminum plate
2, 4: Roller-like brush
3: Polishing slurry liquid
5, 6, 7, 8: Support roller

What is claimed is:

1. A printing plate precursor comprising:
a layer which includes a polymer and is provided on a printing surface side of an aluminum support; and
a layer which includes particles and is provided on a side opposite to the printing surface side,
wherein a modulus of elasticity of the particles is 0.1 GPa or more, and
in a case where a Bekk smoothness of an outermost layer surface on the side opposite to the printing surface side is denoted by b second, the following expression (1) is satisfied, $$b \le 1{,}000 \qquad (1).$$

2. The printing plate precursor according to claim 1, wherein the Bekk smoothness b second of the outermost layer surface on the side opposite to the printing surface side satisfies the following expression (2), $$b \le 300 \qquad (2).$$

3. The printing plate precursor according to claim 1, wherein, in a case where a Bekk smoothness of an outermost layer surface on the printing surface side is denoted by a second and the Bekk smoothness of the outermost layer surface on the side opposite to the printing surface side is denoted by b second, the following expressions (1) and (3) are satisfied, $$a \le 1{,}000 \qquad (1)$$

$$1/a + 1/b \ge 0.002 \qquad (3).$$

4. The printing plate precursor according to claim 1, wherein an arithmetic average height Sa of the outermost layer surface on the side opposite to the printing surface side is in a range of 0.3 µm to 20 µm.

5. The printing plate precursor according to claim 1, wherein an arithmetic average height Sa of an outermost layer surface on the printing surface side is in a range of 0.1 µm to 20 µm.

6. The printing plate precursor according to claim 1, wherein a total value of an arithmetic average height Sa of an outermost layer surface on the printing surface side and an arithmetic average height Sa of the outermost layer surface on the side opposite to the printing surface side is more than 0.3 µm and 20 µm or less.

7. The printing plate precursor according to claim 1, wherein an average particle diameter of the particles is in a range of 0.5 µm to 20 µm, and
an in-plane density of the particles is 10,000 particle/mm$^2$ or less.

8. The printing plate precursor according to claim 1, wherein the modulus of elasticity of the particles is 0.7 GPa or more.

9. The printing plate precursor according to claim 1, wherein the layer which includes the polymer is an image recording layer.

10. The printing plate precursor according to claim 9, wherein the image recording layer includes an infrared absorbent, a polymerization initiator, a polymerizable compound, and a polymer compound.

11. The printing plate precursor according to claim 10, wherein the polymer compound is a polymer compound including at least one of styrene and acrylonitrile as a constitutional unit.

12. A method for making a printing plate, comprising:
a step of image-wise exposing the printing plate precursor according to claim 9 to light; and
a step of supplying at least one of printing ink or dampening water to remove an unexposed area of the image recording layer on a printing machine, thereby making a printing plate.

13. A method for making a printing plate, comprising:
a step of image-wise exposing the printing plate precursor according to claim 9 to light; and
a step of supplying a developer having a pH of 2 to 12 to remove an unexposed area of the image recording layer, thereby making a printing plate.

14. The printing plate precursor according to claim 9, wherein a protective layer is provided on the printing surface side.

15. The printing plate precursor according to claim 14, wherein a thickness of the protective layer is less than 0.2 μm.

16. The printing plate precursor according to claim 1, wherein the layer which includes the polymer is a non-photosensitive resin layer.

17. The printing plate precursor according to claim 16, wherein a protective layer is provided on the printing surface side.

18. The printing plate precursor according to claim 17, wherein the protective layer includes a water-soluble polymer.

19. The printing plate precursor according to claim 18, wherein the water-soluble polymer is polyvinyl alcohol having a saponification degree of 50% or more.

20. The printing plate precursor according to claim 17, wherein a thickness of the protective layer is less than 0.2 μm.

* * * * *